(12) United States Patent
Kweon

(10) Patent No.: US 11,486,711 B2
(45) Date of Patent: Nov. 1, 2022

(54) METHODS OF SPECIFYING GLOBAL LOCATIONS INCLUDING INDOOR LOCATIONS AND DATABASE USING THE SAME

(71) Applicant: S360VR CO., LTD., Daejeon (KR)

(72) Inventor: Gyeongil Kweon, Daejeon (KR)

(73) Assignee: S360VR CO., LTD., Daejeon (KR)

( * ) Notice: Subject to any disclaimer, the term of this patent is extended or adjusted under 35 U.S.C. 154(b) by 0 days.

(21) Appl. No.: 17/535,705

(22) Filed: Nov. 26, 2021

(65) Prior Publication Data

US 2022/0159423 A1    May 19, 2022

Related U.S. Application Data

(63) Continuation of application No. PCT/KR2020/013729, filed on Oct. 8, 2020.

(30) Foreign Application Priority Data

Oct. 9, 2019   (KR) .......................... 10-2019-0124958
Sep. 6, 2020   (KR) .......................... 10-2020-0113509
Feb. 26, 2021  (KR) .......................... 10-2021-0026042

(51) Int. Cl.
*H04W 24/00*      (2009.01)
*G01C 21/20*      (2006.01)
(Continued)

(52) U.S. Cl.
CPC .............. *G01C 21/20* (2013.01); *G01S 19/07* (2013.01); *G01S 19/10* (2013.01); *G01S 19/14* (2013.01); *H04W 4/029* (2018.02); *H04W 4/33* (2018.02)

(58) Field of Classification Search
CPC ......... G01C 21/20; G01S 19/07; G01S 19/10; G01S 19/14; H04W 4/029; H04W 4/33; G09B 29/10
(Continued)

(56) References Cited

U.S. PATENT DOCUMENTS 7,428,476 B1 *   9/2008   Toms ...................... G06F 30/20
                                                       703/2
9,291,700 B1 *   3/2016   Rose ..................... H04W 4/025
(Continued)

FOREIGN PATENT DOCUMENTS

AU    2010332260 A1 *   6/2012   ............ E02F 9/2054
CA       2238138 C  * 11/2000   ............... G01S 1/74
(Continued)

OTHER PUBLICATIONS

Equirectangular projection, Wikipedia, Jul. 23, 2020.
(Continued)

*Primary Examiner* — Mahendra R Patel
(74) *Attorney, Agent, or Firm* — Nicholas Park

(57) ABSTRACT

A method is provided for integrally specifying a geographic location and an indoor location within a building. When the coordinates of one point on the Earth are given as a geodetic latitude φ, a longitude λ, and an ellipsoidal height h in a geodetic coordinate system based on the Earth ellipsoid, the location of the point is represented with a new coordinates including a Northing N, an Easting E, and selectively a floor representing integer F. The Northing N is given as a linear function of the distance measured along the prime meridian from the latitude-longitude origin to the waypoint, and the Easting is given as a linear function of the distance measured along the parallel of latitude from the waypoint to the ellipsoidal point.

11 Claims, 34 Drawing Sheets

(51) Int. Cl.
  *H04W 4/33* (2018.01)
  *H04W 4/029* (2018.01)
  *G01S 19/07* (2010.01)
  *G01S 19/10* (2010.01)
  *G01S 19/14* (2010.01)

(58) Field of Classification Search
  USPC .................................................. 455/456.1
  See application file for complete search history.

(56) References Cited

U.S. PATENT DOCUMENTS

| | | | | |
|---|---|---|---|---|
| 9,374,671 | B1* | 6/2016 | Zhyshko | H04W 4/021 |
| 9,668,104 | B1* | 5/2017 | Ching | H04W 4/021 |
| 9,719,790 | B2* | 8/2017 | Agrawal | G06F 16/29 |
| 9,788,158 | B1* | 10/2017 | Rothman | H04W 4/021 |
| 9,883,333 | B2* | 1/2018 | Ganesalingam | H04W 4/021 |
| 2007/0050143 | A1* | 3/2007 | Jones | G01C 15/00 |
| | | | | 342/357.41 |
| 2012/0089333 | A1* | 4/2012 | Yeh | G09B 29/005 |
| | | | | 702/5 |
| 2017/0256097 | A1* | 9/2017 | Finn | G06F 30/20 |
| 2017/0353827 | A1* | 12/2017 | D'Alberto | G06Q 30/0267 |

FOREIGN PATENT DOCUMENTS

| | | | | |
|---|---|---|---|---|
| GB | 2513196 | A * | 10/2014 | ............. G01S 19/14 |
| JP | 2000162315 | A | 6/2000 | |
| JP | 2007034214 | A | 2/2007 | |
| JP | 201061092 | A | 3/2010 | |
| KR | 100845892 | B1 | 7/2008 | |
| KR | 101546676 | B1 | 8/2015 | |
| WO | WO-2007024892 | A2 * | 3/2007 | ............. G01C 15/00 |
| WO | WO-2017137787 | A1 * | 8/2017 | ............. G01C 21/206 |

OTHER PUBLICATIONS

Web Mercator projection, Wikipedia, Jul. 24, 2020.
Sinusoidal projection, Wikipedia, Jul. 25, 2020.
Universal Transverse Mercator coordinate system, Wikipedia, Sep. 2, 2020.
Seong Kon Lee, Summarized Reviews on Geodetic Coordinate System and Map Projection for Practitioners in Exploration Geophysics, Nov. 30, 2016, Korean Society of Earth and Exploration Geophysicists, Republic of Korea.

* cited by examiner

FIG. 13

Zone 28  WGS84 ellipsoid

| id | first_name | last_name | gender | age | phone_no | city |
|---|---|---|---|---|---|---|
| 1 | Gyeongil | Kweon | male | 54 | 010-2411-8664 | Daejeon |
| 2 | Tom | Cruise | male | 55 | 010-1111-1111 | L.A. |
| 3 | Carole | Bouquet | female | 59 | 010-1234-1234 | Paris |
| 4 | Arnold | Schwarzenegger | male | 60 | 010-3333-3333 | |
| 5 | Suji | Bae | female | 30 | 010-9999-8888 | Seoul |
| 6 | Angelina | Jolie | female | 45 | 010-1234-5678 | L.A. |
| 7 | Jennifer | Connelly | female | 50 | 010-7777-7777 | |
| 8 | Elle | Fanning | female | 22 | 010-2222-3333 | |
| 9 | Mark | Wahlberg | male | | 010-3333-4444 | |
| 10 | Julia | Roberts | female | | 010-4444-5555 | L.A. |
| 11 | Tom | Cruise | male | 12 | 010-5555-6666 | New York |

FIG. 15

```
postgres=# select * from customer;
 id | first_name |  last_name   | gender | age |   phone_no    |   city
----+------------+--------------+--------+-----+---------------+---------
  1 | Gyeongil   | Kweon        | male   |  54 | 010-2411-8664 | Daejeon
  2 | Tom        | Cruise       | male   |  55 | 010-1111-1111 | L.A.
  3 | Carole     | Bouquet      | female |  59 | 010-1234-1234 | Paris
  4 | Arnold     | Schwarzenegger| male  |  60 | 010-3333-3333 |
  5 | Suji       | Bae          | female |  30 | 010-9999-8888 | Seoul
  6 | Angelina   | Jolie        | female |  45 | 010-1234-5678 | L.A.
  7 | Jennifer   | Connelly     | female |  50 | 010-7777-7777 |
  8 | Elle       | Fanning      | female |  22 | 010-2222-3333 |
  9 | Mark       | Wahlberg     | male   |     | 010-3333-4444 |
 10 | Julia      | Roberts      | female |     | 010-4444-5555 | L.A.
 11 | Tom        | Cruise       | male   |  12 | 010-5555-6666 | New York
(11 rows)
```

FIG. 16

```
postgres=# select * from customer where first_name = 'Tom';
 id | first_name | last_name | gender | age |   phone_no    |  city
----+------------+-----------+--------+-----+---------------+---------
  2 | Tom        | Cruise    | male   |  55 | 010-1111-1111 | L.A.
 11 | Tom        | Cruise    | male   |  12 | 010-5555-6666 | New York
(2 rows)
```

FIG. 17

```
postgres=# select * from customer where first_name = 'Tom' and city = 'L.A.';
 id | first_name | last_name | gender | age |   phone_no    | city
----+------------+-----------+--------+-----+---------------+------
  2 | Tom        | Cruise    | male   |  55 | 010-1111-1111 | L.A.
(1 row)
```

METHODS OF SPECIFYING GLOBAL LOCATIONS INCLUDING INDOOR LOCATIONS AND DATABASE USING THE SAME

CROSS-REFERENCE TO RELATED APPLICATION

This application is a US Bypass Continuation application of International Application No. PCT/KR2020/013729, filed on Oct. 8, 2020, and designating the United States, the International Application claiming a priority date of Oct. 9, 2019, based on prior Korean Patent Application No. 10-2019-0124958, filed on Oct. 9, 2019, and claiming a priority based on prior Korean Patent Application No. 10-2020-0113509, filed on Sep. 6, 2020, and claiming a priority based on prior Korean Patent Application No. 10-2021-0026042, filed on Feb. 26, 2021. The disclosure of which is incorporated herein by reference in its entirety.

BACKGROUND

Technical Field

The present invention provides a method for integrally specifying geographical locations having latitude and longitude as well as indoor locations in multistory buildings, and a relational database using the location identifier generated by this method as fields.

Discussion of Related Art

When we go to a place, we can use the correct address. In particular, as navigation software becomes more sophisticated and convenient, a friendly guidance to the destination can be enjoyed by simply entering an address. However, in countryside, mountain, desert, or in the middle of the sea, there may be no address at all. Even if there is an address, it may be difficult to specify or find a place because the address represents a vast area.

Independent of the address system, a location on the Earth's surface can be specified using a latitude and a longitude. FIG. 1 is a conceptual diagram of latitude and longitude provided by Wikipedia Commons (author: Djexplo, source: https://commons.wikimedia.org/wiki/File:Latitude_and_Longitude_of_the_Earth.svg), where the shape of the Earth is assumed as a simple sphere.

Referring to FIG. 1, latitude is defined with respect to the Equator, and the Equator corresponds to latitude 0°. The Equator is a line of intersection between the Equatorial plane and the Earth's surface, where the Equatorial plane is a plane cut through the center of the Earth, and perpendicular to the Earth's rotation axis. The latitude of a point is an angle between the Equatorial plane and a line connecting the point with the center of the Earth. With respect to the Equator, latitude ranges from 0° north latitude to 90° north latitude, and 0° south latitude to 90° south latitude. Latitude is usually denoted by the Greek symbol $\varphi$ (phi). If north latitude is regarded as a positive (+) number and south latitude as a negative (−) number, the latitude $\varphi$ ranges from −90° to +90°.

A circle connecting points having the same latitude value is called parallels of latitude (parallels, lines of latitude). Also, a circle whose center coincides with the center of a sphere is called a great circle. Referring to FIG. 1, parallel of 0° latitude is a great circle among the parallels of latitude, which is the Equator. All other parallels are small circles. All parallels of latitude are parallel to the Equator.

Lines of longitude (meridians) are half circles from the North Pole to the South Pole, where the circles are imaginary intersections between the Earth's surface and planes cut through the Earth's center and containing the North and South Poles. A meridian can be thought of as a curve connecting points having the same longitude. The meridian passing through the British Royal Observatory in Greenwich is called the prime meridian.

The longitude of a point is the angle between the meridian passing through that point and the prime meridian. With respect to the prime meridian, longitude ranges from 0° east longitude to 180° east longitude, and from 0° west longitude to 180° west longitude. Longitude is usually denoted by the Greek symbol $\lambda$ (lambda). If east longitude is considered as a positive number and west longitude as a negative number, the range of longitude $\lambda$ is from −180° to +180°.

Parallels of latitude and lines of longitude collectively form a grid called a graticule. And the origin of the graticule, in other words, a point having both 0° latitude and 0° longitude is the point of intersection between the prime meridian and the Equator, and lies on the gulf of Guinea. From now on, for the sake of simplicity, the origin of the graticule will be referred to as the latitude-longitude origin.

A specific point on the Earth's surface may not have an address, but every point can be matched to a unique latitude and longitude pair. Thus, the address of any house, or the location of a traveler stranded in the desert, can be specified by latitude and longitude.

Latitude and longitude can be obtained using a Global Positioning System (GPS). A number of GPS satellites are floating in the sky above the Earth, and it is a system for determining the location on the Earth by calculating the travel time of signals received from at least three satellites. Originally, it was a technology developed in USA for military purposes. Currently, it is open to the public free of charge and is used in various IT devices such as car navigation systems and smartphones.

The location of any point on the Earth can be uniquely specified by latitude, longitude, and height, and if distances from at least three satellites visible from that point are known, then the exact location of the point can be calculated. Distances from the satellites can be determined by calculating the travel time of signals emitted from the satellite. In other words, by analyzing GPS signals arriving from at least three satellites in the field of view, latitude and longitude and even altitude can be accurately specified.

It is said that about 30 GPS satellites are currently in operation so that more than three satellites are always visible from any point on the Earth. Mathematically, only three satellites are needed to accurately calculate the exact location. In practice, however, it is said that the current location is calculated using signals received from four or more satellites considering various sources of error.

Although positional uncertainties of GPS sensors in smartphones and navigation devices are usually more than several meters, it is said that the error can be reduced to less than several centimeters by using DGPS (Differential GPS). That is, if one can afford a higher price, then the location on the Earth's surface can be determined with an error of few centimeters or less.

A location on the Earth's surface or at sea can be specified by latitude and longitude only. For example, if I am standing in front of the statue of King Sejong the Great in Gwanghwamun Plaza, other people will be able to find me with latitude and longitude only without knowing my height above the sea level.

However, if I have traveled to a foreign country or a remote area, I will not be able to find my way without a map, even if I knew the latitude and the longitude of where I am standing. The shape of the Earth is roughly a sphere. Since map is drawn on a flat surface, distortion cannot be avoided in making a map. If distortion cannot be avoided, a map would be preferable having relatively little or no distortion for the specific information I need. For this reason, there are numerous cartographic methods, each using a different map projection. A map with the most appropriate map projection can be made depending on which feature is the most important among distance, direction, or area.

Whichever cartographic method is used, an accurate mathematical model of the Earth is essential to the creation of an accurate map. This mathematical model includes the geoid and the Earth ellipsoid. FIG. 2 is a conceptual diagram of an actual Earth, a geoid, and an Earth ellipsoid (source: https://www.esri.com/news/arcuser/0703/graphics/geoid1_1g.gif). The geoid is defined as the average sea level in the sea. On land, an imaginary waterway is dug up starting from sea, and the water level in the imaginary waterway is defined as the geoid. Geoid is an "equipotential surface" of the Earth's gravitational field that coincides with the global average sea level. This surface becomes the reference plane when measuring the gravitational acceleration, and an object experiences gravitational force in the direction perpendicular to this surface. The geoid is an imaginary surface that is the reference for measuring height (altitude above sea level) on the Earth [non-patent document 1].

Geoid shape is irregular due to differences in subterranean materials. By measuring the local change in the shape of the geoid (that is, variation of the line of action of gravity depending on location), it is possible to determine the existence of materials below the surface of the Earth with a density different from that of its surroundings. The actual geoid surface is highly bumpy and cannot be used for geodetic surveys. Therefore, a rotational ellipsoid (ellipsoid of revolution, spheroid) called the Earth ellipsoid is assumed that best matches the geoid either locally or globally.

The Earth ellipsoid has the shape of a slightly flat oblate spheroid like a mandarin orange due to the rotation of the Earth, and is used as a reference ellipsoid when making a map. In order to model the Earth, not only the shape of this spheroid, but also the location of the origin and the orientation of the spheroid with respect to the actual Earth must be determined. An adaption of the optimal spherical coordinate system to this Earth ellipsoid is called a geodetic datum.

The geographic coordinate system or World Geodetic System (WGS) is the standard for cartography, geodesy, and satellite navigation. The most recent WGS is a system called WGS 84, WGS 1984, or EPSG:4326, and GPS uses this system [non-patent document 2].

FIG. 3 is a conceptual diagram of the Earth ellipsoid created by DMA (Defense Mapping Agency—Section 15 PDF of the DMA TECHNICAL REPORT TR8350.2-b— (Second Printing, 1 Dec. 1987) Supplement to DoD WGS 84 Technical Report Part 2—Parameters, Formulas, and Graphics). The geographic coordinate system and the Earth ellipsoid are set in the ECEF (Earth-Centered, Earth-Fixed) method. That is, the origin of this coordinate system is located at the center of mass of the Earth, and the error is said to be less than 2 cm. Although the center of mass is an accurate expression, the center of gravity is more often used as a common expression.

The Z-axis of this coordinate system coincides with the Earth's axis of rotation. The Earth's axis of rotation passes through the Earth's center of mass, and the direction from the South Pole to the North Pole is the positive (+) direction of the Z-axis, and the X-axis and Y-axis are included in the Equator. As a matter of fact, the two points where the Earth's axis of rotation meet the Earth's surface are the North Pole and the South Pole. These North and South Poles do not exactly match the magnetic northern pole (north magnetic pole) or the magnetic southern pole that the compass points to. The Earth ellipsoid is a flat spheroid, whose semiminor axis coincides with the Z-axis, that is, the Earth's axis of rotation.

Earth-Fixed means that this coordinate system rotates with the rotating Earth. The X-axis of this coordinate system is a straight line through the center of the Earth and passing the intersection point of the prime meridian and the Equator.

If the shape of the Earth is a spheroid, then the meridian can be said to be a great ellipse rather than a great circle. However, in the sense that the center of the ellipse coincides with the center of the Earth, it is usually called as a great circle for the sake of convenience. The prime meridian is a great circle that runs from the North Pole through the Greenwich Observatory to the South Pole. And all the rest of the great circles from the North Pole to the South Pole are meridians, of which the centers are at the origin of this coordinate system, in other words, the center of the Earth.

The precise concept of latitude is much more complicated due to the fact that the Earth's shape is not a perfect sphere [non-patent document 3]. First, there is an issue of whether the center of the Earth should be at the center of mass or at the center of volume. As mentioned above, WGS84 uses the Earth's center of mass. Technically, latitude has at least six different definitions, including geocentric latitude, astronomical latitude and geographic latitude. Geographic latitude is also called geodetic latitude. However, the differences between them are not large.

FIG. 4 is a conceptual diagram provided by the Encyclopæ Britannica (source: https://www.britannica.com/science/latitude#/media/1/331993/161964) showing the difference between the geocentric latitude and the geodetic latitude. As described above, the shape of the Earth is assumed as an oblate spheroid. The center of this oblate spheroid is located at the center of mass of the actual Earth. The Earth's axis of rotation passes through the Earth's center of mass and coincides with the semiminor axis of the oblate spheroid. The North and the South Poles are the points where the Earth's axis of rotation meets the Earth ellipsoid. Also, the plane passing through the Earth's center of mass and perpendicular to the Earth's rotation axis is the Equatorial plane, and the line of intersection between the Equatorial plane and the Earth ellipsoid is the Equator.

In this case, the geocentric latitude of a point on the Earth ellipsoid is the angle subtended by the straight line connecting the center of the Earth to that point with the Equatorial plane. In general, geocentric latitude is used when explaining the concept of latitude. However, when creating maps, geodetic (geographic) latitude is used. If we simply refer to latitude in real life, it is the geodetic latitude. Whether we are looking at a map or checking our current GPS location with smartphone, it all gives us a geodetic latitude.

To find the geodetic latitude φ of a point on the Earth ellipsoid, a tangent plane is drawn at that point on the Earth ellipsoid. Then, the geodetic latitude is defined as the angle subtended by a straight line passing through the point and perpendicular to the tangent plane, with the Equatorial plane. That is, the center of the Earth ellipsoid is at the Earth's center of mass, but the origin for determining (geodetic) latitude is not at the Earth's center of mass.

Also, in WGS84, the meridian passing through a point 102 m east of the Greenwich Observatory is defined as the IERS Reference Meridian with a longitude of 0°. In other coordinate systems, the position of the reference meridian may be slightly different. Thus, we can see that latitude and longitude are actually much more complicated concepts. Therefore, it is necessary to understand and use the correct coordinate system when conducting a precise geoscientific investigation and research such as the continental drift. Of course, there is no need to understand the difference for common uses such as wayfinding.

A quantitative coordinate system of an appropriate dimension for representing the location on the physical Earth is called a geodetic system. There are several types of geodetic systems, from those applied at the national level to those applied to the entire world through international cooperation. Among these, geodetic systems at the national level are usually defined and maintained by the national (government) organization empowered by the law. In addition, geodetic coordinates by geodetic system are the standards for map production, large-scale land construction work, and land use and management (cadastral, real estate taxation, etc.).

Since geodetic system is a mathematical concept, theoretically, there can be several geodetic systems that can be used in a single area. When using a geodetic system to represent a location on the Earth, geodetic coordinates consisting of latitude (geodetic latitude), longitude, and height can be used. Alternatively, plane rectangular coordinates or three-dimensional Cartesian coordinates can be used.

The World geodetic system refers to a location standard that can be commonly used by the entire world. In the field of land survey, a reference coordinate system for measuring the location on the Earth as longitudes and latitudes, as well as the spheroid representing the shape of the Earth, are collectively called a geodetic reference system. In other words, a global geodetic system refers to a geodetic reference system commonly applicable to the entire world.

The world geodetic system is represented using the ellipsoid of the ITRF2000 (International Terrestrial Reference Frame) and GRS80 (Geodetic Reference System 1980).

The ITRF system is a three-dimensional rectangular coordinate system constructed by an international academic institution called IERS (International Earth Rotation and Reference Systems Service). This coordinate system expresses a position in the three-dimensional space as a set of X, Y, and Z coordinates, where the coordinate origin is at the Earth's center of mass and the X-axis runs in the direction of the intersection point of the Greenwich meridian and the Equator, the Y-axis runs in the direction of 90° east longitude, and the Z-axis runs in the direction of the North Pole.

The ITRF system is built through international cooperation and highly precise. It is an inherently open system because it is built in the civilian sector. On the other hand, WGS84 is a world geodetic system built and maintained by the United States. Since GPS was originally developed for military use, it is operated as a WGS system. Through several revisions so far, WGS84 has approached the ITRF world, and it can be safely said that the two systems are practically equal. Therefore, the ITRF system can be considered as a precise WGS84 (precise WGS).

GRS80 was adopted in 1979 by the International Association of Geodesy (IAG) and the International Union of Geodesy and Geophysics (IUGG). The model Earth is geometrically and physically unified in the GRS80 ellipsoid. Therefore, in addition to the two geometric constants of the semimajor axis, that is, the long radius a and the flatness f, the Earth's rotational angular velocity $\omega$, the gravitational constants G and M are used. Here G is the gravitational constant and M is the total mass of the Earth including the atmosphere.

This ellipsoid does not approximate the Earth as a simple geometrical ellipsoid, but also treats the surface of the Earth ellipsoid as an equipotential surface considering the physical point of view. The center of the ellipsoid coincides with the Earth's center of mass, and its minor axis coincides with the Earth's rotational axis.

Currently, our nation has also adopted the GRS80 ellipsoid, because the International Geodetic Society (IAG) and the International Earth Rotation Observation Project (IERS) recommend its use and also it conforms to the international trends because nations using Earth centric coordinate systems are using the GRS80 ellipsoid. Furthermore, the GRS80 ellipsoid is almost identical to the WGS84 ellipsoid. The only significant difference between the GRS80 ellipsoid and the WGS84 ellipsoid is the official party of determining the Earth ellipsoid. The WGS84 ellipsoid was made for military use in the United States and the GRS80 ellipsoid was made by the International Geodetic Association.

The biggest advantage after changing the national geodetic reference system to the GRS80 ellipsoid is that GPS coordinates and map coordinates can be used fully interchangeably in real time. The global geodetic system is used for location identification using real-time satellite surveying (GPS), flight/ship navigation, and mountain tracking.

Whether the shape of the Earth is assumed to be a sphere or a spheroid, the latitude and the longitude of any point on the Earth can be uniquely determined. Not only on the surface of the Earth, but also even in the sky or in the deep sea below the surface, latitude and longitude values are uniquely given.

FIG. 5 is a conceptual diagram showing the average radius of the Earth ellipsoid (author: Cmglee, source: https://commons.wikimedia.org/wiki/File:
WGS84_mean_Earth_radius.svg). If we want to treat the Earth ellipsoid more simply as a sphere, we can see that we can use 6,371,008.8 m as its average radius. However, in practice, R=6,371 km is used more often. This is because the Earth ellipsoid is used when a more accurate Earth model is needed. And there are several ways to calculate the average radius of the Earth. In FIG. 5, the average radius is obtained as an arithmetic average of the long radius (semimajor axis, half the length of the major axis) and the short radius (semiminor axis, half the length of the minor axis) of the Earth ellipsoid. Alternatively, however, the radius at the Equator can be used as an average radius, or the radius of a sphere with the same volume as the Earth ellipsoid can be used as an average radius.

FIG. 6 is an example of a map with the equirectangular projection that we are all familiar with (author: Justin Kunimune, source: https://en.wikipedia.org/wiki/Equirectangular_projection#/media/File:
Plate_Carree_with_Tissot's_Indicatrices_of_Distortion.svg). The equirectangular projection is also called the equidistant cylindrical projection. The equirectangular projection uses a very simple method where the horizontal axis is proportional to the longitude and the vertical axis is proportional to the latitude [non-patent document 4]. The x coordinate in the horizontal axis is simply proportional to the radius R of the globe and the longitude λ.

$$x = R\lambda \quad \text{[Equation 1]}$$

On the other hand, the y coordinate in the vertical axis is also simply proportional to the radius R of the globe and the latitude φ.

$$y = R\phi \quad \text{[Equation 2]}$$

Here, the radius R of the globe does not mean the actual Earth radius of 6,371 km. If we use the real Earth's radius, we'll need a piece of paper larger than the Earth to print out the map. In reality, it means the radius of the model Earth to make the size of the printed map appropriate. For example, if we want to create a map with a horizontal width of H, the radius R of the globe is given by Eq. 3.

$$R = \frac{H}{2\pi} \quad \text{[Equation 3]}$$

If we want the width of the map to be 1 m in the horizontal direction, the radius of the globe should be 15.9 cm.

The equirectangular projection is referred to in the mapping industry by a code number EPSG:4326. For example, when creating, editing, or servicing a map with QGIS or GeoServer, to indicate that the map is in the equirectangular projection, EPSG:4326 is used as a SRID (Spatial Reference System Identifier) to specify a spatial reference system (SRS) or a coordinate reference system (CRS).

Equirectangular projection is hardly used for navigational purposes because neither distance nor direction is accurate. The ellipses shown in FIG. 6 are called Tissot's indicatrix of deformation, and indicate how the area or the shape is distorted depending on the location. If there is no distortion at all, all the Tissot's ellipses in FIG. 6 should be displayed as circles of the same size.

In cartography, map projection refers to an arbitrary mathematical function that projects coordinates on a curved surface onto a plane in a distinct and smooth manner [non-patent document 5]. FIG. 7 is a conceptual diagram of a map projection method posted on Wikipedia's map projection entry (author: cmglee, US government, Clindberg, Palosirkka, source: https://en.wikipedia.org/wiki/Map_projection#/media/File:Comparison_of_cartography_surface_development.svg). Most map projection methods can be thought of as a process of projecting the surface of a sphere onto a cylinder or a cone, and then cutting the cylinder or the cone and spreading it out on a plane. It can also be further classified according to whether the cylinder or the cone is tangent to the Earth (tangent) or cutting through the Earth (secant). However, since there are many map projection methods that cannot be interpreted geometrically, FIG. 7 should be understood only as a simple reference drawing.

Cylindrical projection is one of the most important projection methods. Among them, normal cylindrical projection refers to any projection where equally-spaced vertical lines appear as vertical lines equally-spaced in the horizontal direction on a planar map, and the parallels of latitude appear as horizontal lines parallel to the horizontal axis. Mathematically, it can be written as follows.

$$x = R(\lambda - \lambda_o) \quad \text{[Equation 4]}$$

$$y = RF(\phi) \quad \text{[Equation 5]}$$

Here, $\lambda_o$ is the longitude of the reference point corresponding to the center of the map, and F(φ) is an arbitrary monotonically increasing function of latitude φ.

FIG. 8 is a conceptual diagram illustrating a process of creating a map using the Mercator projection method provided by the Encyclopædia Britannica (source: https://www.britannica.com/science/Mercator-projection#/media/1/375638/231099). The Mercator projection is the most widely known projection method among cylindrical projection methods. In the Mercator projection, first, it is projected from the center of the sphere on to a cylinder which is in contact with the sphere at the Equator. Then, the cylinder is cut and spread out onto a plane to make a map. Therefore, a map in the Mercator projection method cannot display poles. Also, area is more and more exaggerated as the latitude increases.

FIG. 9 is an example of a world map created using the Mercator projection method (author: Justin Kunimune, source: https://en.wikipedia.org/wiki/Mercatorprojection#/media/File:
Mercator_with_Tissot's_Indicatrices_of_Distortion.svg).
Referring to FIG. 9, it can be seen that Tissot's ellipses increase in size as the latitude increases, but still circular shapes are all maintained. That is, the Mercator projection preserves the angle and the shape of a small area. The Mercator projection is a representative example of a conformal projection. The projection method of the Mercator projection can be written as Eqs. 6 and 7 [non-patent document 6].

$$x = R(\lambda - \lambda_o) \quad \text{[Equation 6]}$$

$$y = R\ln\left[\tan\left(\frac{\pi}{4} + \frac{\phi}{2}\right)\right] \quad \text{[Equation 7]}$$

The greatest advantage of the Mercator projection method is that it preserves direction, which has been particularly useful in the past in navigating ships with the help of a compass. However, as described above, the biggest drawback of the Mercator projection method is that the area is greatly distorted and the Polar Regions cannot be displayed. For example, Greenland appears to be the same size as Africa, but in reality the area of Africa is 14 times that of Greenland.

With the advent of internet maps, the Mercator projection method has been revived as a Web Mercator projection method and in wide spread use [non-patent document 7]. FIG. 10 shows a screen capture of OSM (OpenStreetMap) adopting the Web Mercator projection method (source: http://www.openstreetmap.org/#map=3/25.48/-7.65). The Web Mercator projection method is a slightly modified version of the existing Mercator projection method. In the absence of zoom, the coordinate of the top left corner of the web map is (0, 0) and the coordinate of the bottom right corner is (256, 256). Also, longitude covers the range from −180° to +180°, while latitude only covers the range ±85.051129°. In the Web Mercator projection method, map coordinates are given by Eqs. 8 and 9.

$$x = \left[\frac{256}{2\pi}2^{zoom\ level}(\lambda + \pi)\right] \text{pixels} \quad \text{[Equation 8]}$$

$$y = \left[\frac{256}{2\pi}2^{zoom\ level}\left(\pi - \ln\left[\tan\left(\frac{\pi}{4} + \frac{\phi}{2}\right)\right]\right)\right] \text{pixels} \quad \text{[Equation 9]}$$

Web Mercator projection method is the projection method adopted by Google in 2005 and currently adopted by most of the Internet service providers. The SRID is given as EPSG:900913 or EPSG:3857, and the official name of EPSG:3857 is WGS 84/Pseudo Mercator.

Although many map projection methods exist in the world, the projection method most relevant to the present invention is the sinusoidal projection method. The sinusoidal projection method is one of the pseudocylindrical projection methods. FIG. 11 is an example of a world map created by the sinusoidal projection method (author: Justin Kunimune, source: https://en.wikipedia.org/wiki/Sinusoidal_projection#/media/File:
Sinusoidal_with_Tissot's_Indicatrices_of_Distortion.svg).
The map projection of the sinusoidal projection method is defined by Eqs. 10 and 11 [non-patent document 8].

$$x=(\lambda-\lambda_o)\cos\phi \quad \text{[Equation 10]}$$

$$y=\phi \quad \text{[Equation 11]}$$

In the sinusoidal projection method, the North and the South Poles appear as points, and shapes are greatly distorted but areas are preserved. That is, looking at the Tissot's ellipses of FIG. 11, it can be seen that the shape is distorted as the latitude or longitude increases, but the area is the same. And it can be seen that the shape of Africa close to the latitude-longitude origin is relatively accurate, but the shapes of other continents are considerably distorted.

For this reason, the sinusoidal projection method is not suitable as a projection method for maps covering the whole world. Using an interrupted sinusoidal projection method where multiple central meridians are used, shapes and sizes can be accurately represented. In this case, however, it is not easy to read the map.

The problem with the longitude-latitude coordinate system is that it does not corresponds to the intuitive concept of space that people are familiar with. For example, according to the GPS data of the applicant's office, the latitude is 36° 19.7930'N, the longitude is 127° 25.6190'E, and the altitude is 64.9 m above sea level. However, it is difficult to determine with what error range these latitude and longitude coordinates specify the current location. For example, it is not easy to estimate whether the location of my place is specified with an error range of 1 m or 10 m.

Moreover, even the same latitude or longitude intervals correspond to different distances depending on the latitude. For example, 1° latitude interval at the Equator corresponds to 110.574 km and 1° longitude interval to 111.319 km. But at 30° latitude, they correspond to 110.852 km and 96.486 km, respectively, and at 60° latitude, 111.412 km and 55.800 km, respectively [non-patent document 9].

Also, for example, the flight path of an airplane flying from Seoul to New York or the flight trajectory of a stunt drone that showcases complicated flight techniques is extremely difficult to describe using latitude and longitude. And plane rectangular coordinate system cannot be used on a global scale.

FIG. 12 is an example of a world map created in a UTM (Universal Transverse Mercator) coordinate system (author: Jan Krymmel, source: https://commons.wikimedia.org/wiki/File:Utm-zones.jpg). The UTM coordinate system was developed in 1947 by the United States Army as one of the grid coordinate systems for representing positions on the Earth in a unified manner. In the UTM coordinate system, the Earth is divided into vertical bands in 6° longitudinal interval, and each band is drawn in the transverse Mercator projection. Then, position is represented by vertical and horizontal coordinates with respect to an origin set for each vertical zone (band). The origin is at the intersection of the central meridian in each vertical band and the Equator. In the geographic coordinate system, rectangles decrease in size as we move toward Polar Regions. On the other hand, rectangular shape is maintained in the UTM coordinate system and therefore it is very convenient to represent distances, areas, and directions [non-patent document 10, 11].

The UTM coordinate system represents the shape of the Earth with irregular radius of curvature and undulations by modeling it as a reference ellipsoid. At the time of development, the Clark 1866 ellipsoid was used for the Americas and the international ellipsoid for other regions. The current UTM coordinate system uses the WGS84 ellipsoid.

During World War, even before the UTM coordinate system was developed, many European countries were aware of the utility of grid-type conformal coordinate system. Grid system has the advantages of being able to calculate distances using the Pythagoras's theorem relatively easily compared to the longitude and latitude coordinate system. This recognition of the utility of grid coordinate systems led to the development of UTM and UPS coordinate systems after the war has ended.

The UTM projection used in the UTM coordinate system is the Mercator projection, which is developed in 1570 by Belgian geographer and cartographer Gerardus Mercator, applied in the transverse direction.

The UTM coordinate system starts at 180° W (west longitude) and divides the Earth's surface into a total of 60 vertical bands at intervals of 6° longitude, and each vertical band runs from 80° S (south latitude) to 84° N (north latitude) in the north-south direction. Starting from the 180° W-174° W interval and running eastward up to the 174° E-180° E interval, each vertical band is numbered from 1 to 60.

The 60 vertical bands are transferred to the map in the transverse Mercator projection method which has relatively less distortion in the north-south direction. The scale factor at the central meridian of each zone is 0.9996, and at the boundary of the zone it is about 1.0010. The scale factor becomes 1 at 180 km to the east or west from the origin (i.e., the intersection of the central meridian and the Equator). Within this distance, the scale factor is less than 1, and in regions over 180 km from the origin, the scale factor becomes greater than 1.

Each UTM zone is further divided into 20 latitude bands, which is not part of the UTM system but belongs to the Military Grid Reference System (MGRS). Each latitude band spans 8°. However, the northernmost latitude band (72° N-84° N) spans 12°. From the southernmost (80° S-72° S) band to the northernmost (72° N-84° N) band, alphabetical symbols 'C' to 'X' are assigned to distinguish them, with 'I' and 'O' excluded to avoid confusion. This is because 'I' can be confused with the number 1 and 'O' with the number 0. Therefore, the symbol for the northern latitude band (0° N-8° N) contacting the Equator is 'N'.

In each vertical band, or UTM zone, a latitude band is designated by a combination of a number and an alphabetic symbol. For example, the Republic of Korea belongs to zones 51S, 51T, 52S, and 52T in the UTM coordinate system.

FIG. 13 is a conceptual diagram illustrating a UTM zone (author: Javiersanp, source: https://commons.wikimedia.org/wiki/File:Utm-latlon_grid_en.svg), and shows the northern hemisphere of Zone 28. The upper half of the Zone 28 is from 0° latitude to 84° latitude, 18° west longitude to 12° west longitude, and the central meridian of the vertical band is at 15° west longitude. In each UTM zone, the distance measured to the east is called Easting, and the distance measured to the north is called Northing. The unit for Easting and Northing are meters, not degrees.

The origin of the coordinate system for each UTM zone is located at the intersection point of the central meridian of the UTM zone and the Equator, and the Northing and the Easting have default values. In the northern hemisphere, Easting of the origin is 500,000 m, and Northing is 0 m. In the southern hemisphere, Easting of the origin is 500,000 m and Northing is 1,000,000 m.

In the northern or southern hemispherical portion of each vertical band, Easting increases eastward and Northing increases northward. Therefore, starting from the southernmost point of a UTM zone and moving along the central meridian to the north, the Easting remains unchanged from 500,000 m, but the Northing gradually increases and reaches 1,000,000 m at the Equator, and then suddenly resets to 0 m. Starting from 0 m at the Equator, it becomes 8,881,586 m when it reaches 80° north. In each UTM zone, Easting increases from 166,032 m to 833,967 m along the Equator.

In such UTM coordinate system, UTM coordinates are meaningless unless the zone is first designated. If we specify the UTM zone first, then specify the Northing N and the Easting E, we can accurately designate the location on the Earth except for the Polar Regions.

In the UTM coordinate system, if the longitude of the central meridian of some UTM zone, that is, the longitude of the origin, is $\lambda_o$, then Easting E and Northing N of any point in the UTM zone corresponding to the (geodetic) latitude φ and the longitude λ are given by Eqs. 12-34.

First, the long radius (semimajor axis) a of the Earth ellipsoid is given by Eq. 12.

$$a = 6378.137 \text{ km} \quad \text{[Equation 12]}$$

Also, the reciprocal of the Earth's flatness f is given by Eq. 13.

$$\frac{1}{f} = 298.257223563 \quad \text{[Equation 13]}$$

In the northern hemisphere, the Northing $N_o$ of the origin is given by Eq. 14.

$$N_o = 0 \text{ km} \quad \text{[Equation 14]}$$

A scale factor at the central meridian $k_o$ is given by Eq. 15.

$$k_o = 0.9996 \quad \text{[Equation 15]}$$

In addition, Easting $E_o$ of the origin is given by Eq. 16.

$$E_o = 500 \text{ km} \quad \text{[Equation 16]}$$

The Northing and the Easting can be obtained from these constants and through the following series of equations, where the unit of the coordinate system is km.

$$n = \frac{f}{2-f} \quad \text{[Equation 17]}$$

$$A = \frac{a}{1+n}\left(1 + \frac{n^2}{4} + \frac{n^4}{64} + \ldots\right) \quad \text{[Equation 18]}$$

$$\alpha_1 = \frac{1}{2}n - \frac{2}{3}n^2 + \frac{5}{16}n^3 \quad \text{[Equation 19]}$$

$$\alpha_2 = \frac{13}{48}n^2 - \frac{3}{5}n^3 \quad \text{[Equation 20]}$$

$$\alpha_3 = \frac{61}{240}n^3 \quad \text{[Equation 21]}$$

$$\beta_1 = \frac{1}{2}n - \frac{2}{3}n^2 + \frac{37}{96}n^3 \quad \text{[Equation 22]}$$

$$\beta_2 = \frac{1}{48}n^2 + \frac{1}{15}n^3 \quad \text{[Equation 23]}$$

$$\beta_3 = \frac{17}{480}n^3 \quad \text{[Equation 24]}$$

$$\delta_1 = 2n - \frac{2}{3}n^2 - 2n^3 \quad \text{[Equation 25]}$$

$$\delta_2 = \frac{7}{3}n^2 - \frac{8}{5}n^3 \quad \text{[Equation 26]}$$

$$\delta_3 = \frac{56}{15}n^3 \quad \text{[Equation 27]}$$

$$t = \sinh\left(\tanh^{-1}\sin\phi - \frac{2\sqrt{n}}{1+n}\tanh^{-1}\left(\frac{2\sqrt{n}}{1+n}\sin\phi\right)\right) \quad \text{[Equation 28]}$$

$$\xi' = \tan^{-1}\left(\frac{t}{\cos(\lambda - \lambda_o)}\right) \quad \text{[Equation 29]}$$

$$\eta' = \tanh^{-1}\left(\frac{\sin(\lambda - \lambda_o)}{\sqrt{1+t^2}}\right) \quad \text{[Equation 30]}$$

$$\sigma = 1 + \sum_{j=1}^{3} 2j\alpha_j \cos(2j\xi')\cosh(2j\eta') \quad \text{[Equation 31]}$$

$$\tau = \sum_{j=1}^{3} 2j\alpha_j \sin(2j\xi')\sinh(2j\eta') \quad \text{[Equation 32]}$$

$$E = E_o + k_o A\left(\eta' + \sum_{j=1}^{3} \alpha_j \cos(2j\xi')\sinh(2j\eta')\right) \quad \text{[Equation 33]}$$

$$N = N_o + k_o A\left(\xi' + \sum_{j=1}^{3} \alpha_j \sin(2j\xi')\cosh(2j\eta')\right) \quad \text{[Equation 34]}$$

These formulas, derived in 1912 by Johann Heinrich Louis Kruger, are known to be accurate to the millimeter level within 3,000 km of the central meridian.

In the Republic of Korea, the TM (Transverse Mercator) coordinate system, which is a plane rectangular coordinate system, is the basic system of the national base map, and the UTM (Universal Transverse Mercator) coordinate system is partially used in the case of military maps. The Korean geodetic coordinate system is stipulated to use the global geodetic system in Article 6, Paragraph 1 of the Act on the Construction and Management of Geospatial Data (abbreviation: Spatial Data Management Act).

Article 6 of the Act on the Construction and Management of Geospatial Data (Standards for Surveying)

① The standards for measurement are as follows.

1. A location is expressed in terms of geographic latitude and longitude and height (referring to the height from the mean sea level; hereafter the same in this section) measured according to the global geodetic system. However, if necessary for map production or others, it can be expressed in rectangular coordinates and height, polar coordinates and height, Earth-centered rectangular coordinates or other coordinates.

2. The origin of the survey shall be the origin point of Korea geodetic horizontal datum and the origin point of Korea geodetic vertical datum. However, for areas prescribed by Presidential decree, such as islands, the origin determined and publicly announced by the Minister of Land, Infrastructure and Transport may be used.

This means that the longitude and the latitude are calculated according to the International Terrestrial Reference System (ITRF), which is the global reference system for geocentric coordinate, and applying the GRS80 ellipsoid as for the ellipsoid. This coordinate system is almost identical to that of GPS. In addition, Article 7 of the Enforcement Decree of the Act on the Construction and Management of Geospatial Data stipulates the world geodetic system as follows.

Article 7 of the Enforcement Decree of the Act on the Construction and Management of Geospatial Data (World Geodetic System, etc.)

① The world geodetic system under Article 6 (1) of the Act refers to a standard for position measurement assuming the Earth as an oblate spheroid, and satisfying the following requirements:

1. The semimajor axis and the flatness of the spheroid should be as follows.

Ga. semimajor axis: 6,378,137 m

Na. flatness: 1 over 298.257222101

2. The center of the spheroid must coincide with the Earth's center of mass.

3. The semiminor axis of the spheroid must coincide with the Earth's axis of rotation.

② The origin point of Korea geodetic horizontal datum and the origin point of Korea geodetic vertical datum under Article 6 (1) of the Act have their locations and numerical values as follows.

1. The origin point of Korea geodetic horizontal datum

Ga. Location: 92, World cup-ro, Yeongtong-gu, Suwon-si, Gyeonggi-do (the crosshairs of the metal mark of the origin point of Korea geodetic horizontal datum within National Geographic Information Institute)

Na. Numbers

1) Longitude: 127° 03'14.8913" east

2) Latitude: 37° 16'33.3659" north

3) True azimuth: 165° 03'44.538" (measured from the origin with respect to the true north in the right direction to the center of the satellite reference point of the antenna reference point in the Space Geodetic Observation Center)

2. The origin point of Korea geodetic vertical datum

Ga. Location: 100, Inha-ro, Nam-gu, Incheon (center point of the zero scale mark on the original benchmark quartz plate located in Inha Technical College)

Na. Numbers: 26.6871 meters above the mean sea level in Incheon Bay

③ The standard for rectangular coordinates in accordance with Article 6 (1) of the Act is as shown in the attached table 2 (table 1).

TABLE 1

| name | longitude-latitude of the origin | added value at the projection origin | point scale factor | applicable area |
| --- | --- | --- | --- | --- |
| western coordinate system | longitude: east longitude 125°00'<br>latitude: north latitude 38°00' | X(N) 600,000 m<br>Y(E) 200,000 m | 1.0000 | east longitude 124°-126° |
| central coordinate system | longitude: east longitude 127°00'<br>latitude: north latitude 38°00' | X(N) 600,000 m<br>Y(E) 200,000 m | 1.0000 | east longitude 126°-128° |
| eastern coordinate system | longitude: east longitude 129°00'<br>latitude: north latitude 38°00' | X(N) 600,000 m<br>Y(E) 200,000 m | 1.0000 | east longitude 128°-130° |
| East Sea coordinate system | longitude: east longitude 131°00'<br>latitude: north latitude 38°00' | X(N) 600,000 m<br>Y(E) 200,000 m | 1.0000 | east longitude 130°-132° |

In the remarks in table 1, the method for obtaining a rectangular coordinate system is stipulated as follows.

Cartesian coordinates in each coordinate system are expressed by the TM (Transverse Mercator) method in the following conditions, and the coordinates of the origin are (X=0, Y=0).

1) The X-axis must coincide with the meridian at the origin of the coordinate system, and the true north direction is the positive (+) direction, and the Y-axis is an axis orthogonal to the X-axis, and the true east direction is the positive (+) direction.

2) In the case of cadastral surveys that do not follow the global geodetic system, the Gauss conformal double projection method is used, but the added values of the projection origin in the Cartesian coordinate system are X(N) 500,000 m (Jeju island area 550,000 m) and Y(E) 200,000 m, respectively.

As can be seen from this, in Korea's plane rectangular coordinate system, only a section of 1° east-west longitude interval from each central meridian is used when applying the TM projection method, and the point scale factor at the central meridian is 1.0000.

The X-axis of the plane rectangular coordinate system coincides with the central meridian of the origin, and the true north direction is indicated by (+), and the Y-axis is an axis orthogonal to the X-axis from the origin and the true east direction is indicated by (+). The origin of each Cartesian coordinate system is not an actual reference point, but a virtual origin applied for projection calculation.

When representing topographic maps and cadastral maps, 600,000 m is added to X (ordinate) coordinate and 200,000 m to Y (abscissa) coordinate in the projected coordinates in order to prevent negative coordinate values.

In the Japanese colonial era, triangulation points in Korea were largely divided into three plane rectangular coordinate systems, namely the western coordinate system, the central coordinate system, and the eastern coordinate system, and Cartesian coordinates in each zone were calculated by Gauss conformal double projection method. The current Cartesian coordinates of the triangulation points are inherited from this projection method. On the other hand, in current cartography, coordinates are obtained by TM projection (Gauss-Kruger projection) method. Although this difference in projection is fundamentally problematic, it is neglected in practice because the coordinate difference between the Gauss conformal double projection method and the TM projection method is less than a few centimeters [non-patent document 12].

On the other hand, in order to collect, manage, and utilize a large amount of data, a database (DB) is indispensable. A database is a collection of data that is systematized, integrated, and managed for the purpose of shared use by many people. And we need a program to operate the database, and this is the DBMS (Database Management System) which we commonly refer to as DB or database. DBMS is a software that can store, access, protect, backup and the like of data.

Types of databases include relational database, key-value (KV store) database, object-oriented database, document database, column family database and etc. [non-patent document 13].

Among them, the relational database (RDBMS: Relational Database Management System) is the most widely used database. A standard language called SQL was created to use this relational database. SQL is an abbreviation for Structured Query Language. Because relational databases are so widely used, databases that are not relational databases are called NoSQL.

Data in the GIS field have the common properties of location, that is, latitude, longitude, and altitude. Such data inevitably have very similar structures, and a relational database is optimal for processing such structured data. It is not that other types of databases such as document types cannot be used. But speed or efficiency can be hampered in sorting and searching database, which are essential in database. Therefore, relational databases are widely used in the GIS field.

Representative relational databases include Oracle, IBM DB2, MsSQL, MySQL, and PostgreSQL. Relational databases all use SQL, so their usage is very similar. Relational databases are the most reliable as they have a long history, and the speed of data classification, sorting, and search is fast. SQL provides highly sophisticated search queries, allowing us to manipulate data in almost any way imaginable.

In a relational database, data is stored in the form of a two-dimensional table having rows and columns, and it is common for one database to have multiple tables. The main reason for storing data in multiple tables is to prevent data duplication. Thus, a database can have one main table and one or more subsidiary tables.

Since data is stored in the form of a two-dimensional table, the table is very similar to the Microsoft Excel data. A column is also conventionally called a field. FIG. 14 shows a table of a general relational database mimicked in Excel where it is assumed that the table is for managing customer information in an Internet shopping mall.

One customer's information occupies one row in this table. Each row is also called a record. That is, the information of any one customer is the sum of information recorded in the fields (columns) of any one row (record). As can be seen in FIG. 14, a table has several columns, and each column represents a different attribute of data. For example, in FIG. 14, there are fields such as id, customer's name (first_name), last_name, gender, age, phone number (phone_no), and city of residence (city).

Each column has its own data type. The most common data types are string, integer, real number, date, and Boolean. In the table of FIG. 14, id and age are integers, and first name, last name, gender, phone number, and city are character strings.

All rows in a table have the same number of columns, and the structure of this column and the relationship between data are predefined as a table schema. Data dependency is expressed as a relation. In SQL, table and relation have the same meaning.

Every table has a column called a primary key, a major key or an initial key. In FIG. 14, id in column 1 is the primary key. The primary key is usually called id, and serves to identify each row (record) in the table. Therefore, it can never be duplicate and it cannot be left unfilled. It is preferable to have the form of a natural number due to the nature of the primary key. Although the primary key can be manually generated by a person, it is common to have the database software automatically generate it whenever a record is added. In order to automatically generate the primary key, for example in PostgreSQL, the property of the corresponding column can be specified as serial.

When entering data into a database or a table, there are fields (columns) that can be omitted, and there are fields that cannot be omitted. The first or last name in the customer information database would correspond to fields that cannot be omitted. In PostgreSQL, which is a representative open source relational database, we can specify "not null" as constraint for columns that cannot be omitted. To create the customer table shown in FIG. 14 in PostgreSQL, we can enter the following code in SQL shell.

```
CREATE TABLE customer (
id SERIAL NOT NULL PRIMARY KEY,
first_name VARCHAR(50) NOT NULL,
last_name VARCHAR(50) NOT NULL,
gender VARCHAR(6),
age INT,
phone no VARCHAR(50) NOT NULL,
city VARCHAR(50) );
```

Here, commands entered in uppercase letters are merely to emphasize the fact that they are SQL keywords. As a matter of fact, it does not matter if they are entered in lowercase letters. When this command is executed, a table named customer is created in the database. When a database is built, a query is required to obtain a desired information. FIG. 15 shows the output of all customer records using the SQL command "select * from customer;".

FIG. 16 is the result of searching for a customer having a name "Tom" with command "select * from customer where first_name='Tom';". There are two people with the same name as "Tom Cruise" in the customer database. Therefore, a search by name alone returns two records. FIG. 17 shows a search result for a customer whose name is "Tom" and whose city is "L.A." with the command "select * from customer where first_name='Tom' and city='L.A.';". In this way, desired customer information can be obtained by applying two or more conditions.

Apps like Instagram and ShutterStock have tons of photo data. There are many cases where a database for binary data rather than strings or integers is required. Modern database SWs often have the option to store binary data. However, directly storing binary data in a database is generally not recommended. This is because it puts a strain on the database and degrades performance. Instead, it is more often the case that binary data such as photos are stored in separate folders and store only the file paths in the database.

When drawing a floor plan of a building, geometric elements such as points, lines, and polygons are used. PostgreSQL, an open source DBMS, allows points, lines, polygons, etc. as valid data types.

However, if we want to include a floor plan in a map, then the locations of the points must be designated with latitude (geodetic latitude) and longitude. In this way, once the locations of the points are designated by latitude and longitude, and then lines or polygons connecting the points are defined, they can be well matched to the map data.

GeoJSON is a text-based data format that can specify a geometric shape using the latitude and longitude of the points as described above. GeoJSON is not an acceptable data format for PostgreSQL, but it can be used if PostGIS, a PostgreSQL plug-in, is installed. The following is a virtual GeoJSON representation of the Malay Islands in the Java Sea, where Malaysia and Singapore are located [non-patent document 14].

```
{
"type": "FeatureCollection",
"features": [
{
"type": "Feature",
"geometry": {
"type": "Point",
"coordinates": [102.0, 0.5]
},
"properties": {
"prop0": "value0"
}
},
{
"type": "Feature",
"geometry": {
"type": "LineString",
"coordinates": [
[102.0, 0.0], [103.0, 1.0], [104.0, 0.0], [105.0, 1.0]
]
},
"properties": {
"prop0": "value0",
"prop1": 0.0
}
},
{
"type": "Feature",
"geometry": {
"type": "Polygon",
"coordinates": [
[
[100.0, 0.0], [101.0, 0.0], [101.0, 1.0],
[100.0, 1.0], [100.0, 0.0]
]
]
},
"properties": {
"prop0": "value0",
"prop1": {"this": "that"}
}
}
]
}
```

When constructing spatial information such as a floor plan as a database, it is common to store location information corresponding to the center of the floor plan and the location information of the smallest rectangle enclosing the floor plan, that is, the minimum bounding box.

FIG. 18 is a diagram illustrating the concept of a centroid and a minimum bounding box. In FIG. 18, a school campus is shown, and the boundary of this campus is indicated by a polygon. The centroid of the polygon representing the boundary of this school campus can be thought of as the exact position of the awl when you cut a wooden plank into the polygonal shape and put the wooden plank on the tip of the awl to level it. That is, it can be considered as a point on a planar object whereon the planar object can be supported and maintains the horizontal level without inclining either in the lateral direction or the longitudinal direction. In addition, the minimum bounding box may be considered as the smallest rectangle among rectangles within which the polygon is completely contained.

The reason why such a concept of centroid is necessary is that, since a building has a certain area, a representative location of the building, that is, a representative point to measure longitude and latitude, is required. In addition, even if not accurate, it is necessary to determine whether a certain point is inside or outside a complex-shaped building. Therefore, a concept of minimum bounding box with a simplified boundary line is needed.

In order to specify the minimum bounding box, two representative points, i.e., the latitude and the longitude of the upper left corner of the minimum bounding box, and the latitude and the longitude of the lower right corner, may be specified. And if the case of rotating the map is also considered, the slope of the minimum bounding box should be specified as well.

[Patent 1] discloses a map system capable of arbitrarily selecting a reference point on the map and displaying the two-dimensional rectangular coordinates (X, Y) of the measurement point with respect to the reference point. This invention calculates the distance and the direction from the reference point to the measurement point from the latitude/longitude information of the reference and measurement points, and displays it on the map display device. So it is easier to intuitively understand and use than the latitude/longitude information.

[Patent 2] discloses systems and methods for ultra-precise three-dimensional real-time positioning and tracking of objects such as trucks, firefighters, fire engines, and airplanes by generating movement related coordinates. In particular, this invention calculates latitude, longitude and altitude from GPS data, and then derives level information within a building based on a 3D site model of the structure. Then, the location of the target object is displayed as an icon in the 3D model of the structure. To this end, each target object is equipped with a GPS receiver as well as a wireless transmitter capable of sending its location to a monitoring system. This makes management easier for trucking companies by allowing the location of delivery trucks to be displayed as icons in real-time in a precise 3D model. In addition, it has a function of displaying the exact locations of firefighters on the computer of the monitoring system even when firefighters are moving up and down several floors in a building in order to extinguish fire. However, since it is difficult to receive GPS signals indoors, it is expected that there will be difficulties in practical application.

[Patent 3] discloses a conversion method for converting location information on the Earth and on a map into a decimal system, as well as a method of displaying location information on the Earth and on a map using the method. To this end, the invention first extended the range of latitude from 90° south to 90° north to 180° south to 180° north. In other words, although the North Pole is 90° north latitude, it is assumed that the north latitude continues to increase until reaching the Equator beyond the North Pole to become 180° north, and the south latitude is also extended likewise. In this way, both latitude and longitude ranges were extended to 360°. Next, using Eqs. 35-36, latitude P and longitude Q are converted into latitude corresponding coordinate OWP and longitude corresponding coordinate OWQ.

$$OWP = 0.5 + \frac{P}{360} \qquad \text{[Equation 35]}$$

$$OWQ = 0.5 + \frac{Q}{360} \qquad \text{[Equation 36]}$$

In this way, latitudes and longitudes of all the locations on the Earth are normalized to a square range between 0 and 1. Next, after multiplying this value by 100 million, a pair of values rounded from 2 decimal places to 4 decimal places according to the needs is used as a location information. It is said that using this method, an arbitrary location on the Earth can be easily expressed using only a pair of numbers.

We can find three major problems with this method. First, all places on the Earth have coordinates in double. Secondly, this number does not have a simple relationship with a distance on the Earth and therefore does not provide any special meaning to people. Third, since latitude and longitude are simply renormalized into large numbers, the resolution varies depending on the location on the Earth. In other words, even if the latitude corresponding coordinate is expressed to a third decimal place, the degree to which the numerical value specifies the position on the Earth varies depending on the latitude.

[Patent 4] discloses a radar device for observing the Earth mounted on an air vehicle such as an artificial satellite, an aircraft, an airship, and a hot air balloon.

[Patent 5] discloses method and apparatus for configuring digital information so as to limit the geographic area for accessing that digital information. For this purpose, location identification properties are given to arbitrary digital files such as photos or MP3 files, and the location identification properties (unique location designation geocode) include latitude, longitude and altitude, or other properties equivalent thereto. However, this location identification property is not, for example, a place where a photo was taken or a place where the photo is stored, but a representative address of an area where the photo can be accessed. And a property defining the proximity of the location is additionally defined, which may be a rectangular area or a circle including the vicinity of the location, or may be defined as a specific zip code, a specific city or country, and the like.

[Patent 6] discloses a position display system of moving objects that is mounted on a moving object such as a vehicle, a ship, and the like and can display the positions and shapes of itself and other moving objects existing around it. Using a GPS receiver, the position display system generates position coordinate data indicating its own position of the moving object on which the system is mounted. In addition, shape data indicating the shape of the moving object is prepared in advance for each moving object, and position display data including position coordinate data and shape data is generated and transmitted to other moving objects. The moving object that has received this uses the position coordinate data included in the data to determine where the moving object is heading from the geographical location (latitude, longitude, altitude, etc.). Then, this is displayed on the display device using the shape data.

On the other hand, there are many prior arts for methods of creating indoor maps or for wayfinding kiosk. In the one stop wayfinding information system disclosed in [patent 7], people's information and actual map are efficiently linked in the wayfinding kiosk. Therefore, route to the destination location, people's information, building exterior video and etc. are displayed for quick and precise one-stop navigation information.

In [patent 8], the exhibition data and the electronic map system are linked. Operating the electronic map system according to the properties of the exhibition data, an optimal route is suggested to multiple targets according to multiple target searches, and utilization of the exhibits information and user convenience are increased.

In the location memory service system disclosed in [patent 9], location information about rememberable place or place to remember is transmitted along with a photo to the location information server, and when a user requests information about the photo, location information about the photo is provided in real time.

In the mobile communication device disclosed in [patent 10], an image formed by an imaging device and image-related data including the location of the imaging device are stored using a mobile communication device having a built-in imaging device and a GPS receiver and then transmitted to the central processing unit. The central processing unit in turn can provide image related data to one or more mobile communication devices.

[Patent 11] discloses a method of providing a route guidance service with a mobile communication terminal that stores location information of the place where a picture is taken. Specifically, when a user selects a photo among the stored photos for which the user wants to receive a route guidance service, the current location is measured using a GPS signal, and route guidance information is received using the measured current location and the location information of the selected photo.

[Patent 12] discloses a system based on a computer network for providing a geographic information search and location information guidance service to users from various places.

In the system including a database disclosed in [patent 13], when taking a picture, the shooting place, the shooting angle, and the distance to the shooting target are measured, and the photographed photo data and the map data are analyzed and referenced in order to map with a geographic object, and then the photo data and the map data are recorded and maintained. Here, a geographic object refers to an entity in the real world having spatial properties such as location, shape, and spatial relationship and non-spatial properties such as a place name and a building name.

In a location-based image file conversion service server technology disclosed in [patent 14], after receiving a general image file that does not include location information from the user terminal, the shooting time and the terminal identification information included in the image file are extracted, and the user terminal uses the time information and the terminal identification information to obtain the identification information of the first base station the user terminal was located at the time of shooting, and the location information for the photo is obtained by analyzing the map of the service area of the base station. Finally the obtained location information is included in the general image file to obtain a location-based image file.

An indoor map authoring tool disclosed in [patent 15] comprises a model configuration unit that composes a building model corresponding to a building using the building drawing information, a building information request unit that requests POI information about a building from the outdoor map POI server, a matching unit for matching a POI information about a building to the building model, and a building indoor map generator for generating indoor map information of a building using the building model to which POI information about the building is matched.

In the technology disclosed in [patent 16], first, the user configures the inquiry target terminal on the server. When a user requests a user-set content service thereafter, the server acquires the location information of the region where the inquiry target terminal is located through LBS, and based on the obtained location information, provides image information captured by local base station cameras to the user terminal.

A location information provision system disclosed in [patent 17] comprises a data receiving unit for receiving image data captured from a terminal, a data search unit for searching map data related to the received image data, and a data transmitting unit for transmitting the searched map data to the terminal. According to an embodiment of this invention, by receiving image data photographed using the terminal, a landmark, a location information can be tracked thereof, is identified from the image data, and the identified landmark and the searched map data related to the landmark are transmitted to the terminal. Therefore, it is possible to easily determine the current location of the terminal by using the captured image data and provide map data accordingly.

A location-based content providing technology is disclosed in [patent 18]. In specific areas including filming locations for movies and dramas, and tourist destinations, photographic images are taken while encircling the shooting target 360° all around and at a certain distance. Photo images thus obtained at regular angular intervals are stored in a database. Using the GPS and other sensors installed in the user's terminal, the location and the orientation of the user's terminal can be obtained, and allows a user to check image information from the user's current location and from the viewpoint of the user.

The indoor map authoring method disclosed in [patent 19] comprises steps of analyzing the properties of nodes existing on the indoor map for each floor of a building, detecting one or more inter-story nodes based on the analyzed properties of the nodes, and connecting the detected inter-story nodes to create a new link.

PRIOR ART

Patent Document

[patent 1] Kumi Sugimoto, "Map system", publication no. JP 2007-34214, date of publication Feb. 8, 2007.
[patent 2] Michael R. Zeitfuss, Joseph M. Nemethy, Joseph A. Venezia, "System and method for highly accurate real time tracking and location in three dimensions", international publication no. WO 2004/034076, date of publication Apr. 22, 2004.
[patent 3] Shigeru Owada, "Method of displaying location information on the Earth and on a map, and maps and coordinates using it", publication no. JP 2010-61092, date of publication Mar. 18, 2010.
[patent 4] Hisayuki Yuki, "radar device", publication no. JP 2000-162315, date of publication Jun. 16, 2000.
[patent 5] Barry J. Glick, Ronald S. Karpf, Mark E. Seiler, "System and method for using location identity to control access to digital information", patent no. U.S. Pat. No. 6,985,588, date of patent Jan. 10, 2006.
[patent 6] Koji Sasano, "Position display system", publication no. JP 2005-315721, date of publication Nov. 10, 2005.
[patent 7] Samkeun Kim, Jeongmin Seo, "Onestop road guidance information system", registered utility model KR 20-0430083, date of patent Oct. 26, 2006.
[patent 8] Seunghyeon Lee, Onechul Ji, "Information service method and system for museum", patent no. KR 10-0674445, date of patent Jan. 19, 2007.
[patent 9] Yumi Kim, Hwancheol Kim, Jumun Lee, Sehyeon Oh, "Location memorizing mobile station, location memorizing service system and method thereof using it", patent no. KR 10-0676619, date of patent Jan. 24, 2007.
[patent 10] Michael, L. Obradovich, "Positional camera and GPS data interchange device", patent no. KR 10-0697833, date of patent Mar. 14, 2007.
[patent 11] Hyungwon Park, "Mobile terminal for storing picture and positioning information of the picture and method for providing service using thereof", patent no. KR 10-0703277, date of patent Mar. 28, 2007.
[patent 12] Sangyoun Kim, "System for providing location information guide services by kiosk", patent no. KR 10-0827463, date of patent Apr. 28, 2008.
[patent 13] Yongju Jung, Yong Lee, Jiyeon Kim, Sanggyun Kim, "Method and system for mapping image objects in photo to geographic objects", patent no. KR 10-0845892, date of patent Jul. 7, 2008.
[patent 14] Soonjin Kwon, Jeonghwan Lee, Dongsoon Min, "Method for transforming based position image file and service server thereof", patent no. KR 10-0853379, date of patent Oct. 14, 2008.
[patent 15] Jaemyung Lee, "Indoor map authoring device and method thereof", patent no. KR 10-2013-0112492, date of publication Oct. 14, 2013.
[patent 16] Seunghoon Moon, "Method and system for providing video information about locating area of searching terminal", patent no. KR 10-1358690, date of patent Jan. 28, 2014.
[patent 17] Lee Seyeon Lee, "Method and system for providing location information", patent no. KR 10-1472144, date of patent Dec. 5, 2014.
[patent 18] Kyuhyun Kim, "Method of providing location-based contents and apparatus thereof", patent no. KR 10-1546676, date of patent Oct. 18, 2015.
[patent 19] Daehyeon Lim, Jinkwon Lee, "Method for building an indoor map and apparatus thereof", patent no. KR 10-1985699, date of patent May 29, 2019.

Non-Patent Document

[non-patent document 1] Wikipedia, Geoid.
[non-patent document 2] Wikipedia, World Geodetic System.
[non-patent document 3] Encyclopaedia Britannica, latitude and longitude.
[non-patent document 4] Wikipedia, Equirectangular projection.
[non-patent document 5] Wikipedia, Map projection.
[non-patent document 6] Wikipedia, Mercator projection.
[non-patent document 7] Wikipedia, Web Mercator projection.
[non-patent document 8] Wikipedia, Sinusoidal projection.
[non-patent document 9] Heeyeon Lee, Jaeheon Shim, Geographic information system $2^{nd}$ ed. (Bobmunsa).
[non-patent document 10] Wikipedia, UTM coordinate.
[non-patent document 11] Wikipedia, Universal Transverse Mercator coordinate system.
[non-patent document 12] Seongkon Lee, "Summarized reviews on geodetic coordinate system and map projection for practitioners in exploration geophysics", Geophysics and Geophysical Exploration, vol. 19, no. 4, 2016, pp. 236-248.
[non-patent document 13] Namuwiki, database.
[non-patent document 14] Wikipedia, GeoJSON.
[non-patent document 15] Aboelmagd Noureldin, Tashfeen B. Karamat and Jacques Georgy, "Basic Navigational Mathematics, Reference Frames and the Earth's Geometry", in Fundamentals of Inertial Navigation, Satellite-based Positioning and their Integration (Springer, Berlin, Heidelberg, 2013), https://doi.org/10.1007/978-3-642-30466-8_2.
[non-patent document 16] Peter Osborne, The Mercator Projections (Edinburgh, 2013).

SUMMARY OF THE INVENTION

Technical Subject

An alternative and useful method is provided for expressing a geographic location that can be expressed as a combination of latitude, longitude, and altitude as a combination of two or three simple integers.

Solution

When the coordinates of a point on the Earth are given as geodetic latitude φ, longitude λ, and ellipsoidal height h in a geodetic coordinate system based on the Earth ellipsoid, the location of the point is represented as a set of new coordinates comprising a Northing N, an Easting E, and selectively an integer F representing the floor information. The intersection point of the prime meridian and the parallel of latitude L(φ) with geodetic latitude φ is called a waypoint W(φ), and the intersection point of the meridian M(λ) with longitude λ and the parallel of latitude L(φ) with geodetic latitude φ is called an ellipsoidal point. The Northing N is given as a linear function of the distance measured along the prime meridian from the latitude-longitude origin to the waypoint, and the Easting is given as a linear function of the distance measured along the parallel of latitude from the waypoint to the ellipsoidal point.

Effects

By specifying the location of any indoor or outdoor point on the Earth in a simple and useful manner, it can be used in various industries such as wayfinding, delivery, and autonomous driving.

BRIEF DESCRIPTION OF THE DRAWINGS

FIG. 13 is a conceptual diagram of a UTM zone.
FIG. 14 is an example of a table in a relational database.
FIG. 15 is a customer information table implemented in PostgreSQL.
FIG. 16 is the result of searching for a record with name Tom.
FIG. 17 is the result of searching for a record with name Tom and city L.A.
FIG. 33 is an example of a simple database in the eleventh embodiment of the present invention.
FIG. 34 is the result of searching with various keywords in the eleventh embodiment of the present invention.

DETAILED DESCRIPTION

In traditional markets, we can see grandmothers selling things with stalls measuring only 1 m in width and length or smaller. In addition, street lights, traffic lights, telephone booths, fire hydrants, etc. occupy a smaller area. As such, there may be a need to accurately specify the location of a movable property or real estate with a small footprint. Or, if we want to meet friends by specifying the location in a place without any special geographical features while people are densely populated such as in the middle of the Gwanghwamun Plaza in Seoul, we need a method to specify and distinguish a section of about 1 m in width and length in a unique way.

The surface area of a sphere with radius R is given by $4\pi R^2$. Using 6,371,008.8 m as the value of the average radius R of the spherical model Earth, the surface area is given as $5.1006588 \times 10^{14}$ m$^2$. In other words, if the surface of the Earth is divided into pieces of approximately 1 m in width and length, about 510 trillion pieces are obtained.

The method of the sixth embodiment of the present invention may be used to divide the surface of the Earth into pieces of approximately 1 m in width: height, and to give each piece a location identifier given as a pair of two integers. That is, using the geodetic latitude and the longitude of the center position of the corresponding piece, the Northing N and the Easting E are calculated in meters. Most preferably, the Northing and the Easting given by Eqs. 99-100 are calculated.

$$N=N_o+R(\phi-\phi_o) \qquad \text{[Equation 99]}$$

$$E=E_o+(\lambda-\lambda_o)R\cos\phi \qquad \text{[Equation 100]}$$

By rounding off this Northing and Easting, they are converted into integers. In Eqs. 101-102, round( ) is a function that returns a rounded value of a real number. That is, round(9.4) is 9, and round(9.7) is 10.

$$I=\text{round}(N) \qquad \text{[Equation 101]}$$

$$J=\text{round}(E) \qquad \text{[Equation 102]}$$

Any point on the Earth can be conveniently specified using the integers I, J thus obtained, and selectively an integer F representing the floor.

Figure 31:
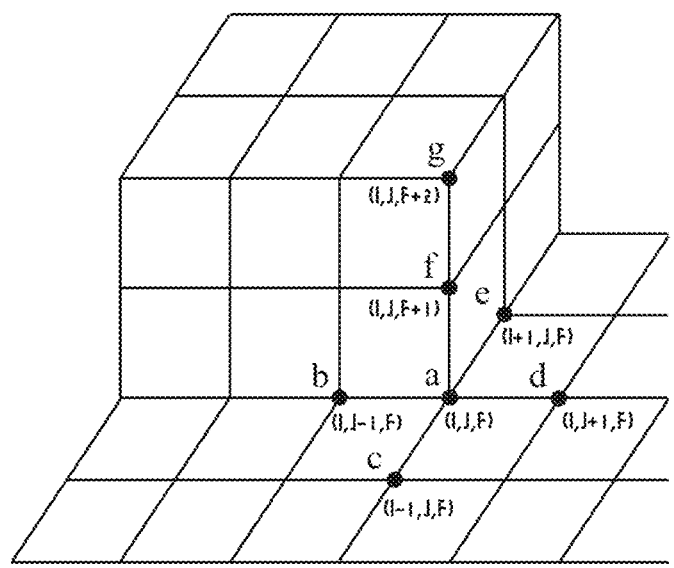
FIG. 31 is a conceptual diagram of a location identifier according to the present invention.

FIG. 31 is a conceptual diagram of a three-dimensional location identifier. By using the method of the eighth embodiment in the present invention, the location can be specified using three integers (I, J, F) with an error range of less than 1 m² regardless of the actual location on the surface of the Earth and the floor levels within all the buildings. We will refer these three integers as 3-dimensional geological location identifier or simply as location identifier.

In FIG. 31, the location identifier of a place a on the Earth is (I, J, F), the location identifier of a point e about 1 m away from a in the north direction is (I+1, J, F), and the location identifier of a point d about 1 m away from a in the east direction is (I, J+1, F), and the location identifier of a point f at the same geodetic latitude and longitude but one floor above a is (I, J, F+1). In addition, by transmitting thus obtained location identifier (I, J) or (I, J, F) to a friend, we can easily inform our location even if we are in a wild plain or deep in the mountains. This set of integers not only consumes less data to transmit than the geodetic latitude and longitude, but also has the advantage that distances can be estimated because I and J have units of length. And the biggest advantage is that this location identifier indicates an area about 1 m in width and in height for any location on the Earth.

In addition, when geodetic latitude and longitude are needed, they can be obtained using Eqs. 103-104.

$$\phi_I = \phi_o + \frac{I-N_o}{R} \qquad \text{[Equation 103]}$$

$$\lambda_{I,J} = \lambda_o + \frac{J-E_o}{R\cos\left(\phi_o + \frac{I-N_o}{R}\right)} \qquad \text{[Equation 104]}$$

Hereinafter, embodiments of the present invention will be described in detail with reference to FIGS. 19-34.

First Embodiment

Figure 19:
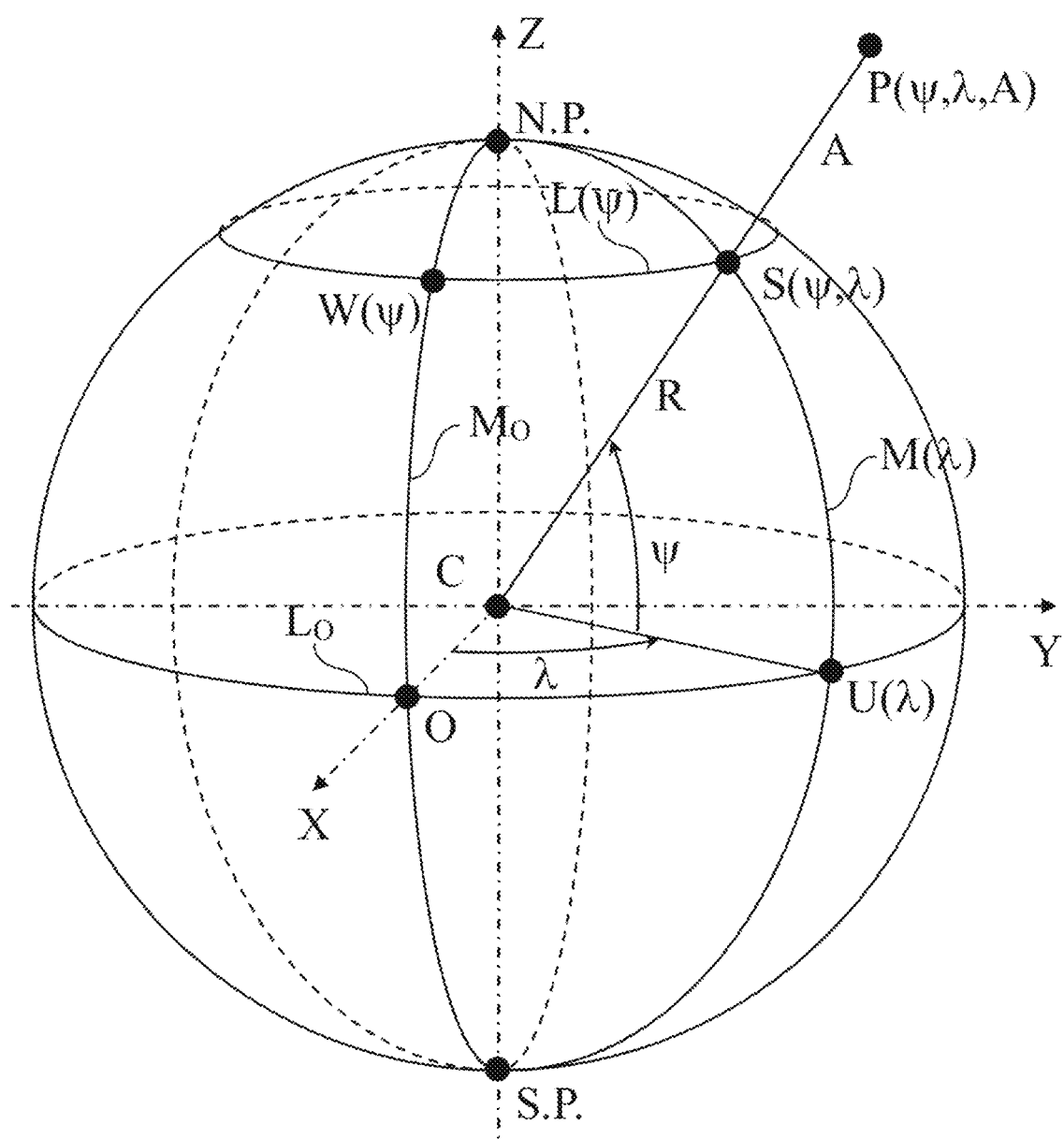
FIG. 19 is a conceptual diagram for understanding the world coordinate system according to the first embodiment of the present invention.

In the first embodiment of the present invention, a sphere having a radius R is assumed as the shape of the Earth. FIG. 19 is a conceptual diagram of a World coordinate system or an Earth-Centered Earth-Fixed three-dimensional Cartesian coordinate system according to the first embodiment of the present invention. Hereinafter, it will be simply referred to as a three-dimensional Cartesian coordinate system. The origin C of this three-dimensional Cartesian coordinate system is located at the Earth's center of mass, the Z-axis coincides with the Earth's axis of rotation, the X-axis is a straight line from the origin through the intersection point of the Equator and the prime meridian, and the Y-axis direction is automatically determined by the principle of Right-Handed coordinate System (RHS).

A point P with geocentric latitude ψ and longitude λ is located at geocentric altitude (geocentric height) A from the Earth's surface. A coordinate system using geocentric latitude and longitude and geocentric altitude will be referred to as a geocentric coordinate system.

Figure 1:
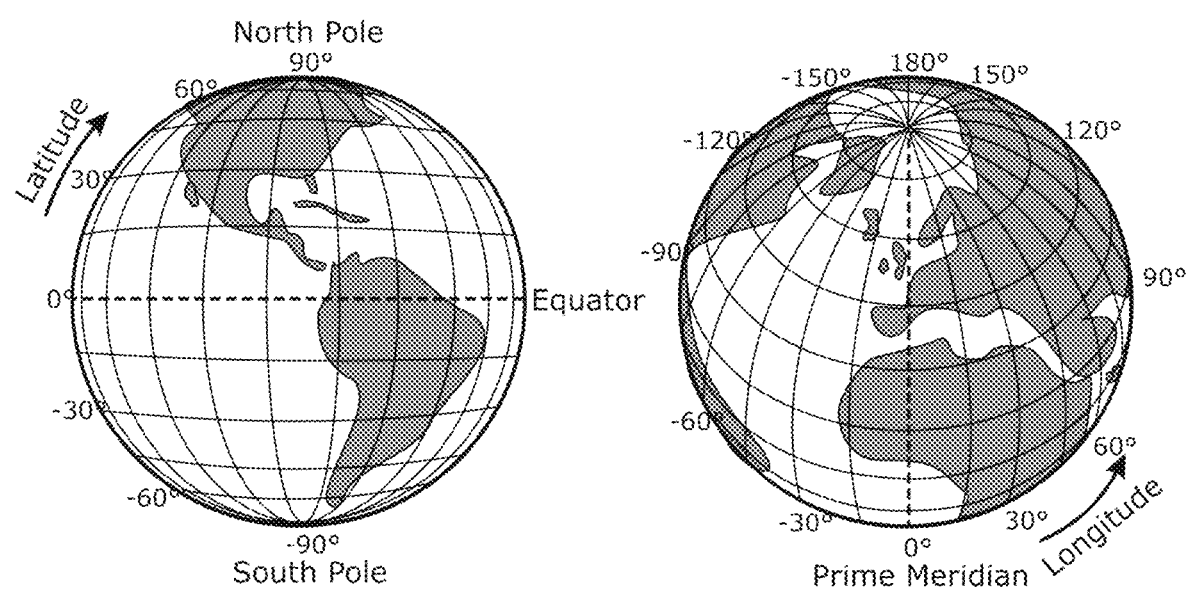
FIG. 1 is a conceptual diagram of latitude and longitude.
Figure 2:
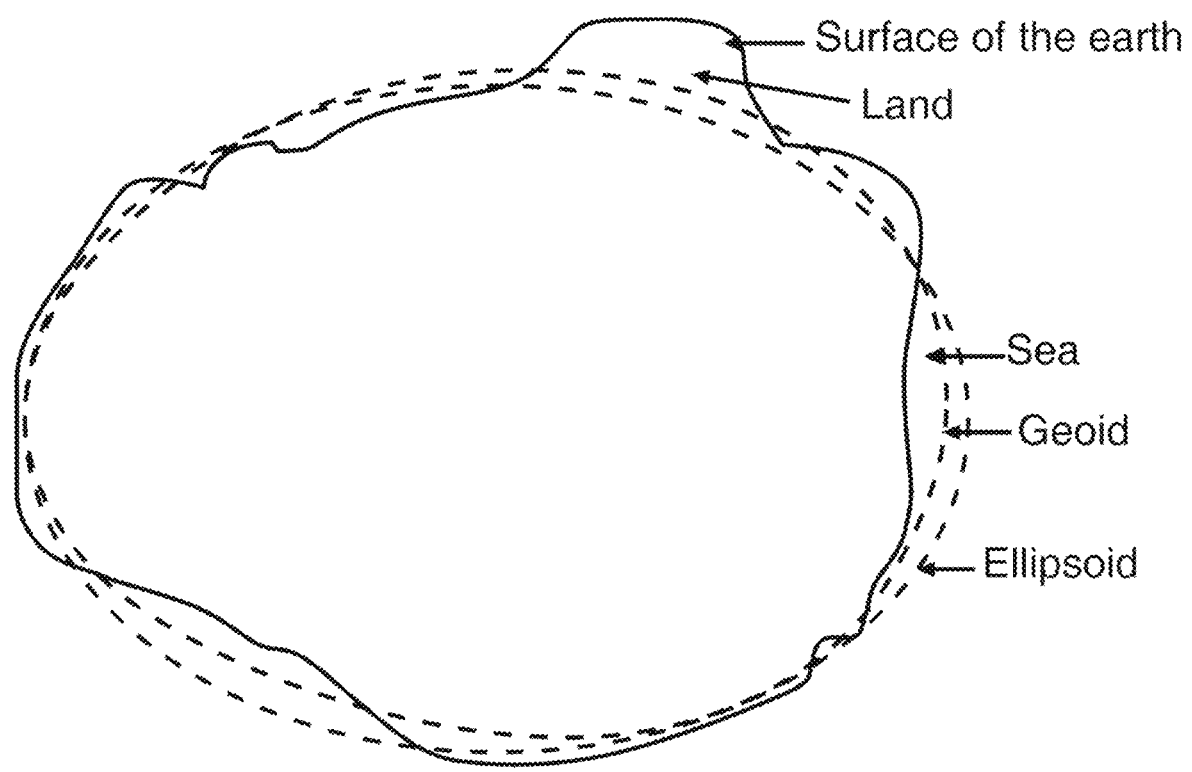
FIG. 2 is a conceptual diagram of a geoid.
Figure 3:
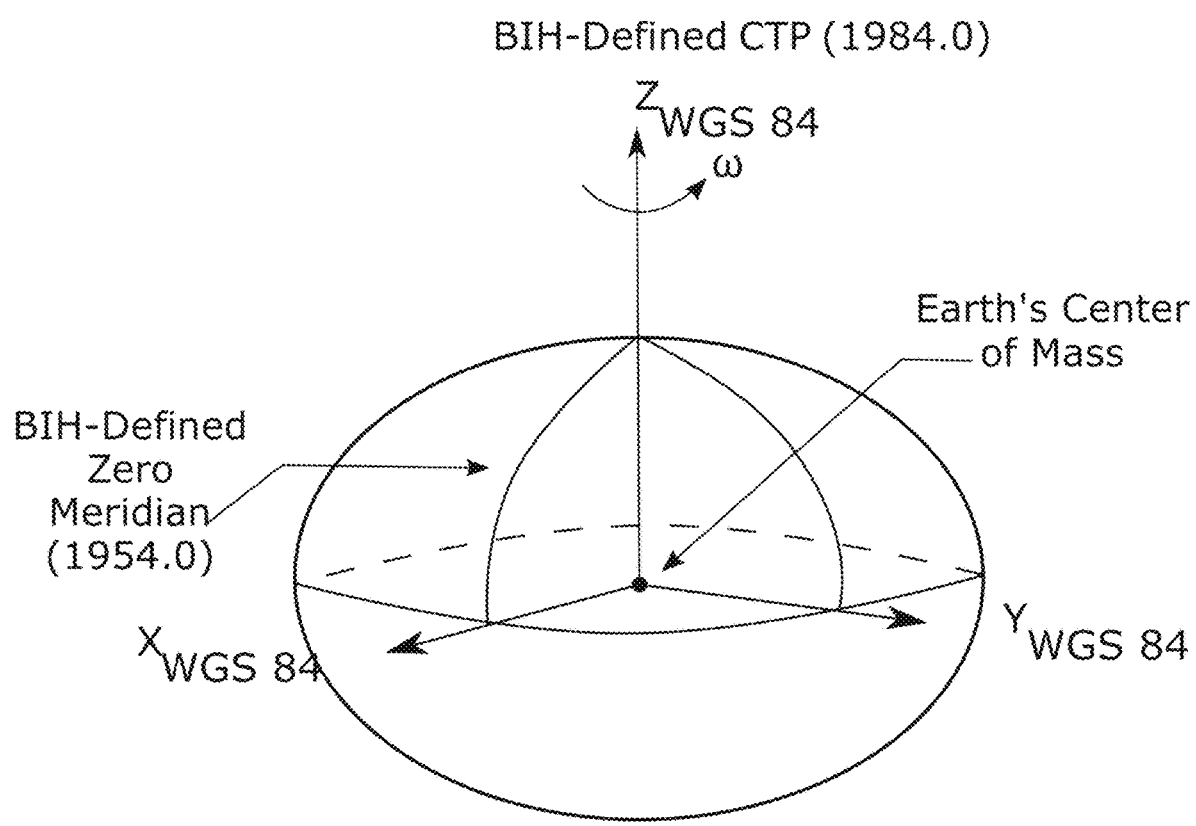
FIG. 3 is a conceptual diagram of the Earth ellipsoid.
Figure 4:
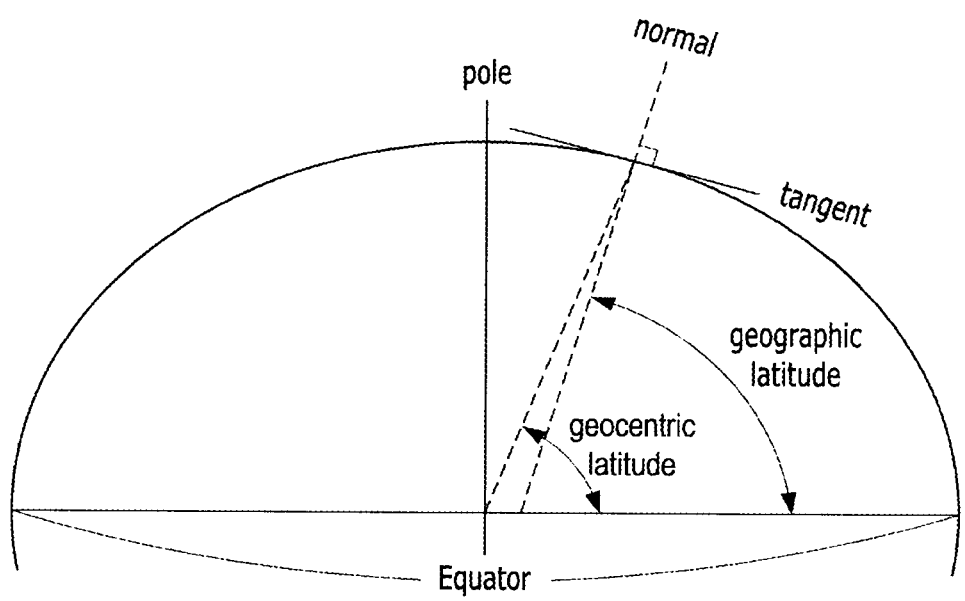
FIG. 4 is a conceptual diagram showing the difference between geocentric latitude and geodetic latitude.
Figure 5:
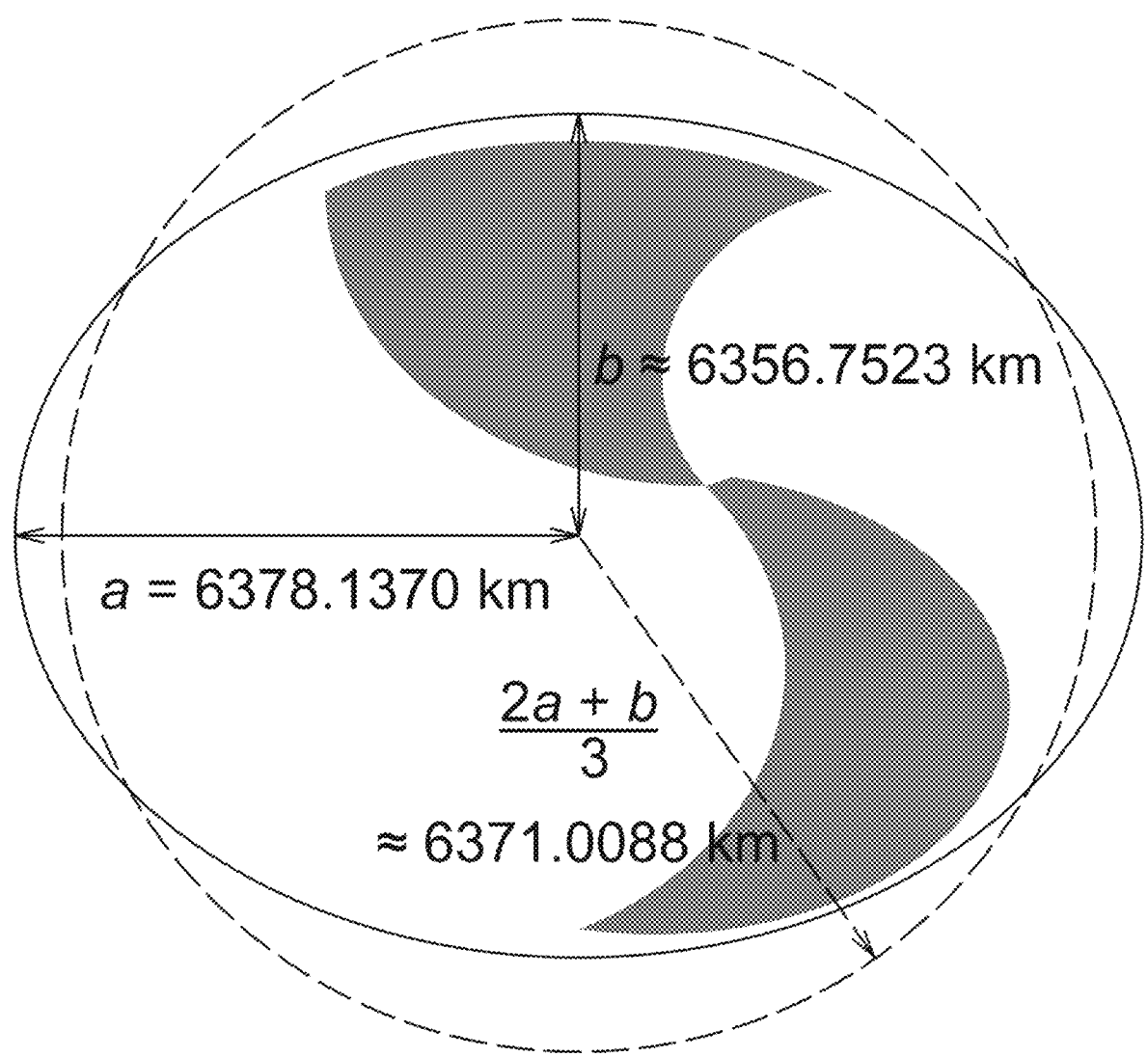
FIG. 5 is a conceptual diagram illustrating the average radius of the Earth ellipsoid.
Figure 6:
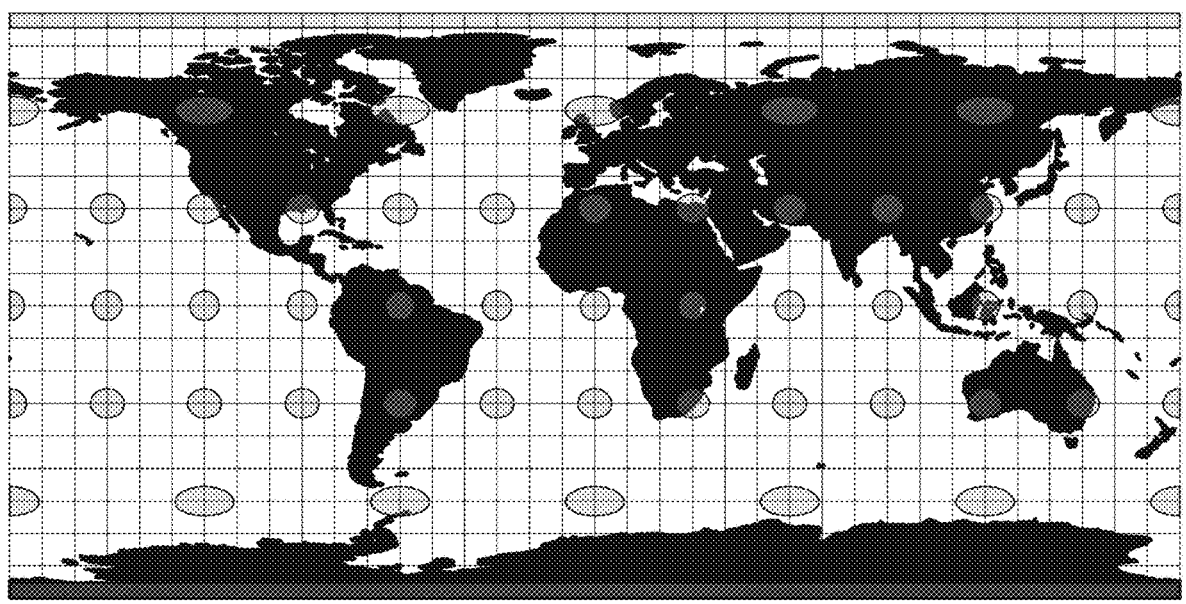
FIG. 6 is an example of a map by the equirectangular projection method.
Figure 7:
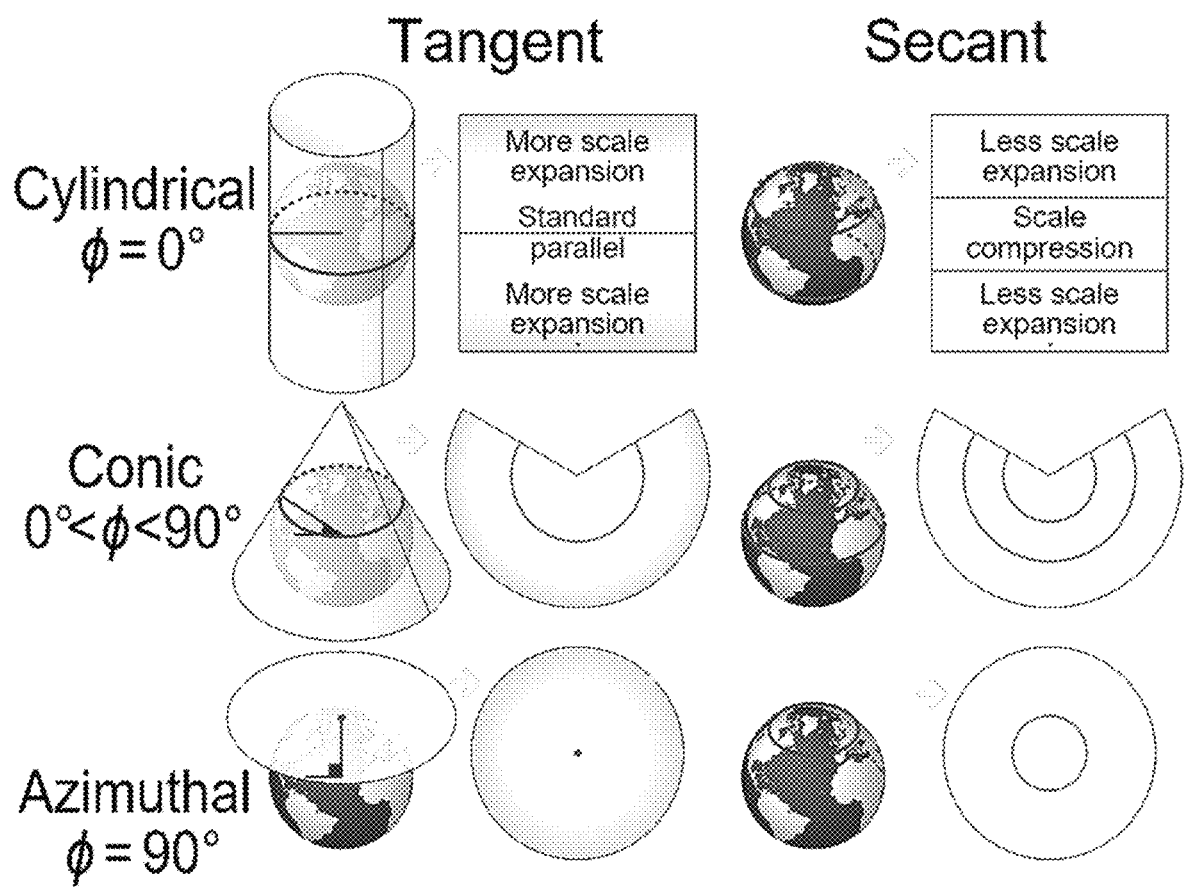
FIG. 7 is a conceptual diagram illustrating various map projection methods.
Figure 8:
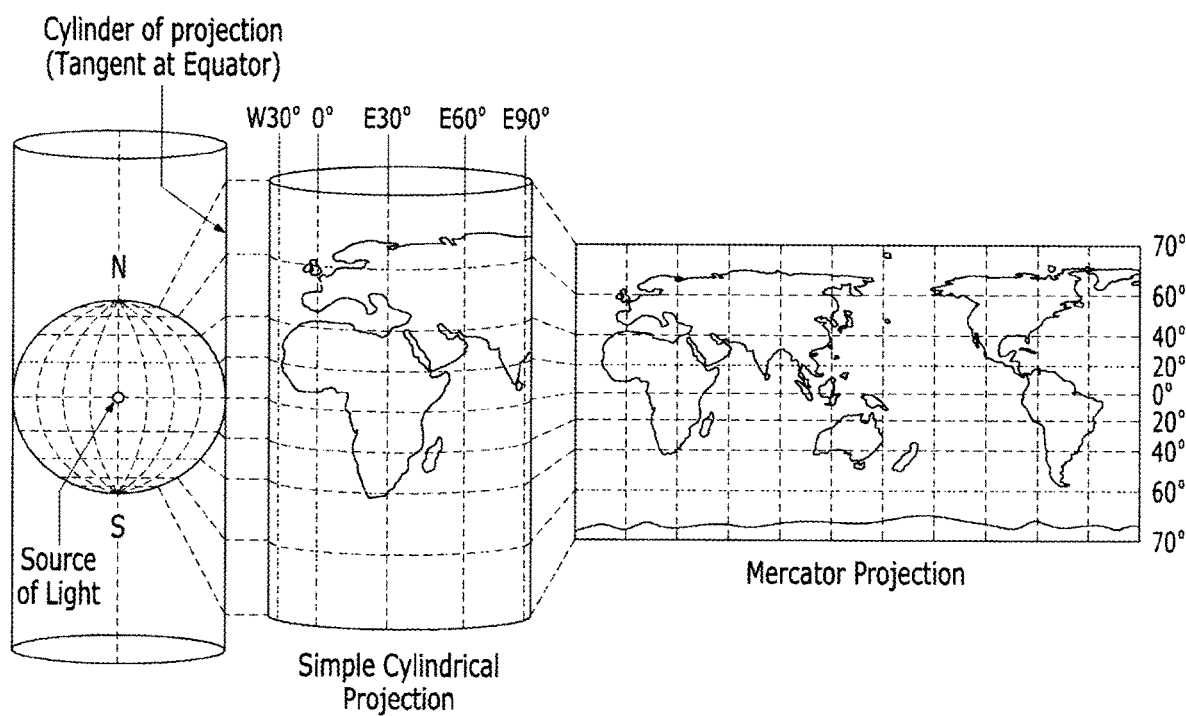
FIG. 8 is a conceptual diagram of the Mercator projection method.
Figure 9:
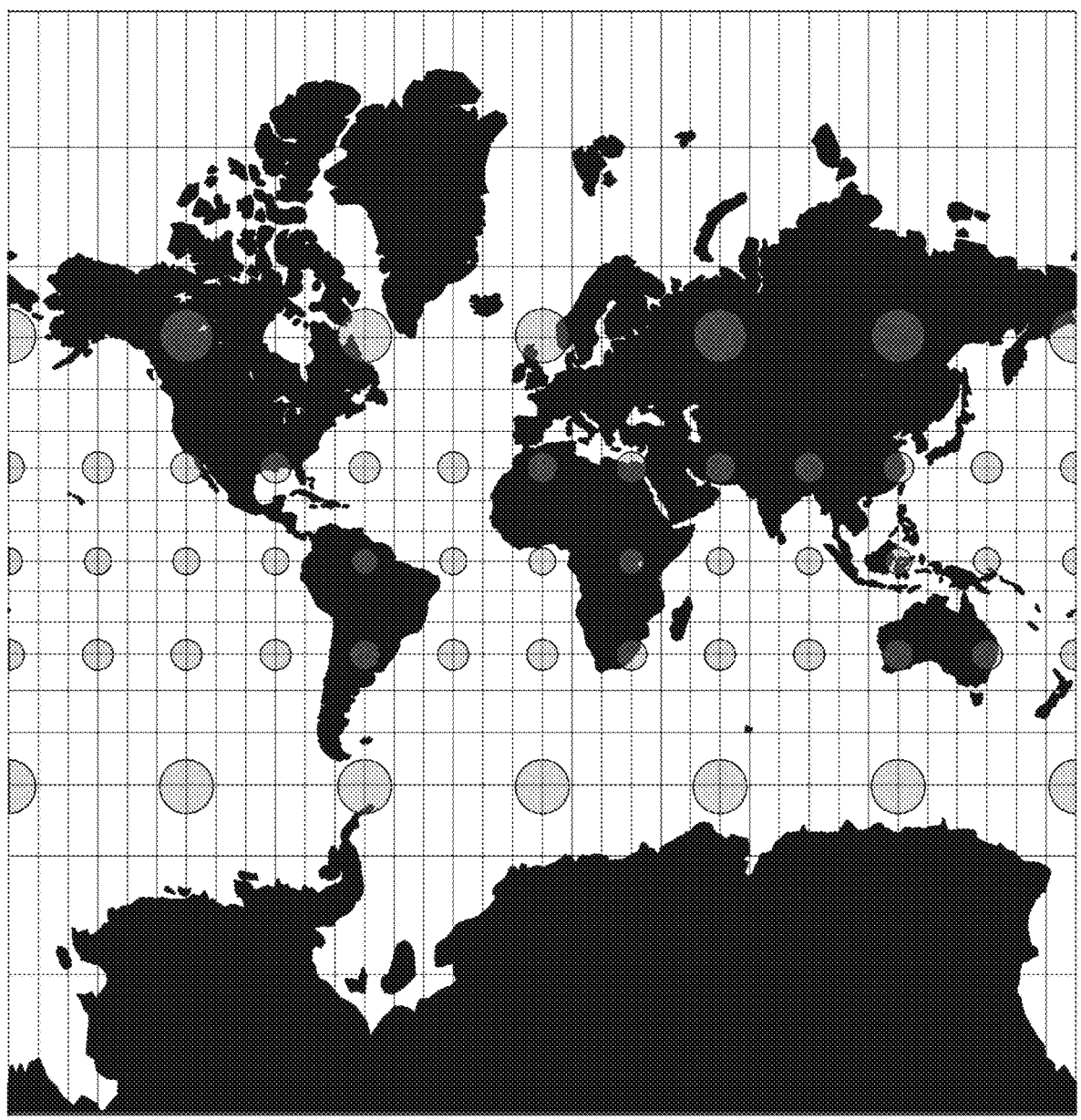
FIG. 9 is an example of a map created by the Mercator projection method.
Figure 10:
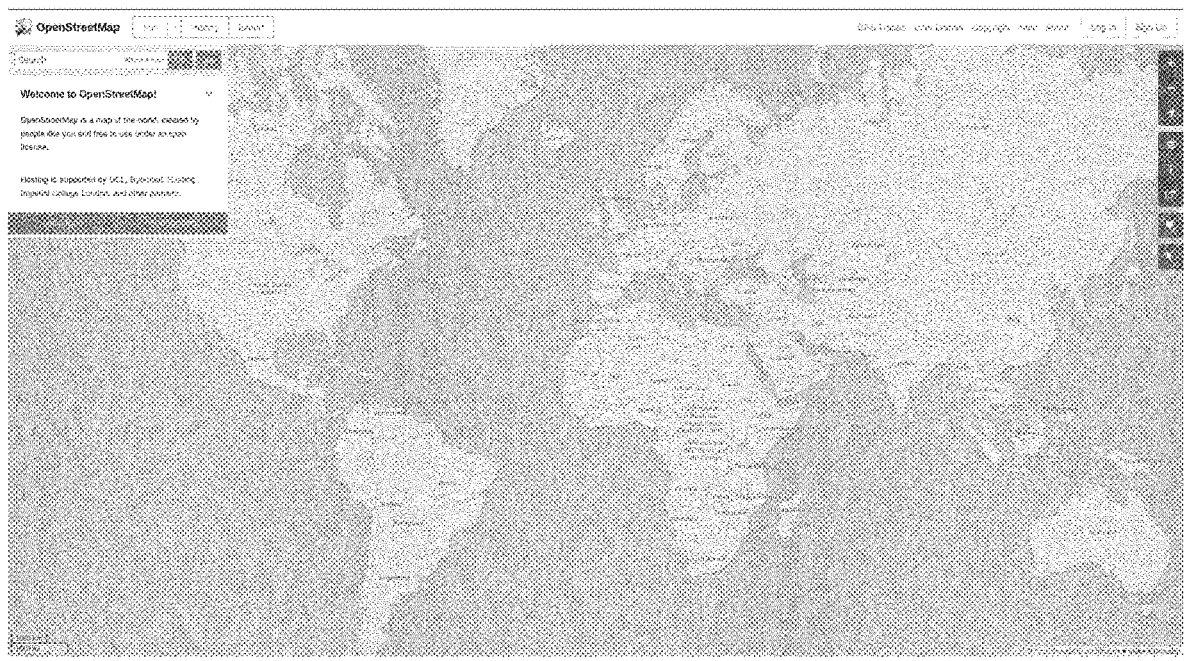
FIG. 10 is an example of a map by the web Mercator projection method.

Assume that the Earth is a sphere with its center located at the origin, and this sphere will be referred to as a spherical model Earth. The radius of this spherical model Earth is R. As illustrated in FIG. 5, 6,371.0088 km may be used as the R value. The point P is separated by a distance (R+A) from the center of the Earth. Therefore, the coordinates of the point P can be written as (X, Y, Z) in the three-dimensional Cartesian coordinate system, and also can be written as (ψ, λ, A) in the geocentric coordinate system.

Let's call the point where the line segment connecting the point P(X, Y, Z)=P(ψ, λ, A) and the center of the Earth C meets the Earth's surface, that is, the surface of the spherical model Earth, as an Earth point S(ψ, λ). The Earth point is also the intersection point of the meridian M(λ) with longitude λ and the parallel of latitude L(ψ) with geocentric latitude w.

Among the parallels of latitude, the $L_O$ corresponding to latitude 0° is the Equator. Among the meridians, the prime meridian $M_O$ is the meridian which corresponds to 0° longitude. And the intersection point O of the Equator $L_O$ and the prime meridian $M_O$ is the latitude-longitude origin. Also, a point on the Earth's surface with 90° latitude is the North Pole (N.P.), and a point with −90° latitude is the South Pole (S.P.).

The coordinates X, Y and Z of the three-dimensional Cartesian coordinate system are given by Eqs. 37-39 as functions of the coordinates of the geocentric coordinate system.

$$X=(R+A)\cos\psi\cos\lambda \qquad \text{[Equation 37]}$$

$$Y=(R+A)\cos\psi\sin\lambda \qquad \text{[Equation 38]}$$

$$Z=(R+A)\sin\psi \qquad \text{[Equation 39]}$$

Conversely, the geocentric latitude ψ, the longitude λ, and the geocentric altitude A of the geocentric coordinate system are given by Eqs. 40-42 as functions of the coordinates of the three-dimensional Cartesian coordinate system.

$$\psi = \tan^{-1}\left(\frac{Z}{\sqrt{X^2+Y^2}}\right) \qquad \text{[Equation 40]}$$

$$\lambda = \tan^{-1}\left(\frac{Y}{X}\right) \qquad \text{[Equation 41]}$$

$$A = \sqrt{X^2+Y^2+Z^2} - R \qquad \text{[Equation 42]}$$

In the first embodiment of the present invention, extended concepts of Northing N, Easting E and geocentric altitude A are used in place of the geocentric latitude ψ, longitude λ and the geocentric altitude A. The Northing and the Easting were defined even in a plane rectangular coordinate system such as the UTM coordinate system. However, in the UTM coordinate system, the Northing and the Easting have the disadvantage that they are given as complex functions of the geodetic latitude φ and the longitude λ. In the first embodiment of the present invention, the Northing is defined as an arc length measured along a meridian, and the Easting is defined as an arc length measured along a parallel of latitude.

Referring to FIG. 19, it can be seen that there are two methods of using Northing and Easting. A method through the waypoint U(λ) and a method through the waypoint W(ψ) are them. The waypoint U(λ) is the intersection point of the Equator $L_O$ and the meridian M(λ), and the waypoint W(ψ) is the intersection point of the prime meridian $M_O$ and the parallel of latitude L(ψ).

In the method through the waypoint U(λ), the coordinates of the point P are expressed by the Easting Rλ measured along the Equator $L_O$ from the latitude-longitude origin O to the waypoint U(λ), the Northing Rψ measured from the waypoint U(λ) to the Earth point S(ψ, λ) along the meridian M(λ), and the elevation A from the Earth point S(ψ, λ) to the one point P(ψ, λ, A).

$$P_U = (R\lambda, R\psi, A) \quad \text{[Equation 43]}$$

Figure 20:
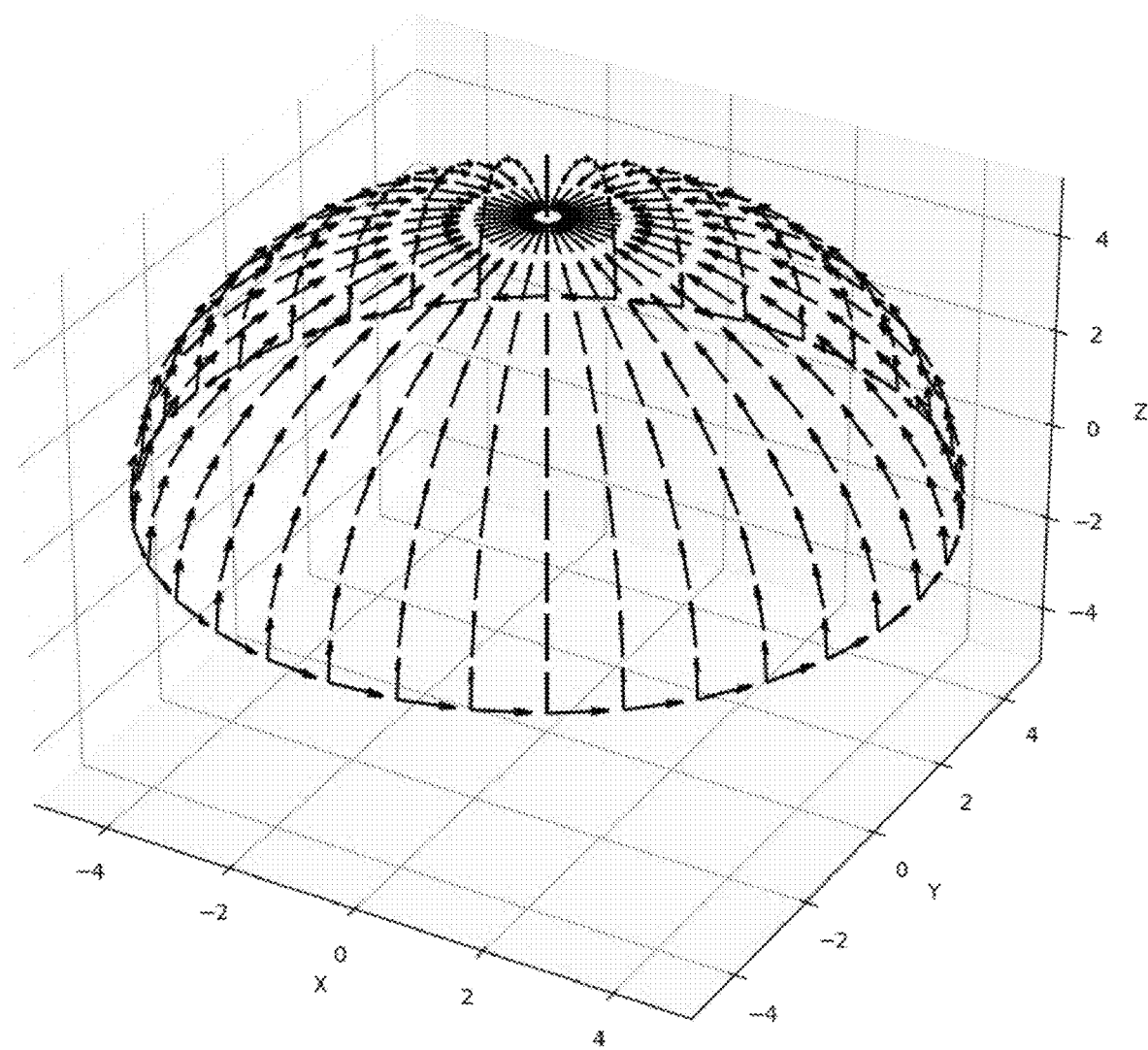
FIG. 20 is a drawing showing the density of sample points in the longitude-first coordinate system.

This method will be referred to as longitude-first coordinate system. A disadvantage of this longitude-first coordinate system can be seen in FIG. 20. In FIG. 20, the circumference of the Earth is set to 36 m, and each arrow corresponds to Easting 1 m or Northing 1 m. However, it can be seen that the lateral spacing between sampling points decreases as the latitude increases. That is, even if the effective digits of the Northing or the Easting are up to, for example, the first decimal place, the positional accuracy in the lateral direction changes with latitude.

On the other hand, in the method through the waypoint W(ψ), the coordinates of the point P are expressed by the Northing Rψ measured along the prime meridian $M_O$ from the latitude-longitude origin O to the waypoint W(ψ), the Easting λR cos ψ measured from the waypoint W(ψ) to the Earth point S(ψ, k) along the parallel of latitude L(ψ), and the elevation A from the Earth point S(ψ, k) to the one point P(ψ, λ, A).

$$P_W = (R\psi, \lambda R \cos \psi, A) \quad \text{[Equation 44]}$$

That is, the Northing N and the Easting E satisfy the relations of Eqs. 45-48 with the radius R of the spherical model Earth, the geocentric latitude ψ and the longitude λ.

$$N = R\psi \quad \text{[Equation 45]}$$

$$E = \lambda R \cos \psi \quad \text{[Equation 46]}$$

$$\psi = \frac{N}{R} \quad \text{[Equation 47]}$$

$$\lambda = \frac{E}{R \cos \psi} = \frac{E}{R \cos\left(\frac{N}{R}\right)} \quad \text{[Equation 48]}$$

Figure 21:
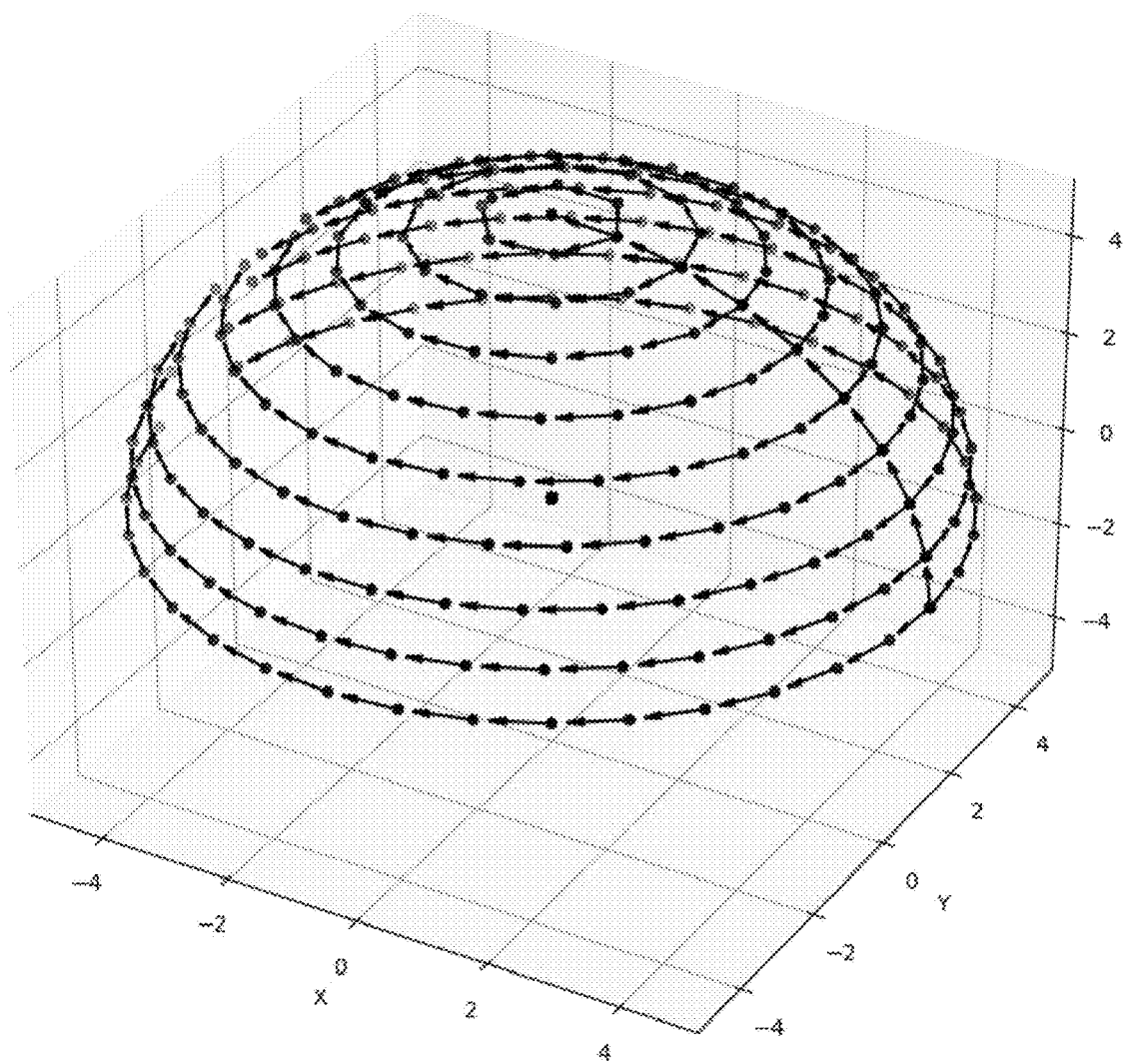
FIG. 21 is a drawing showing the density of sample points in the latitude-first coordinate system.

FIG. 21 shows the distribution of sample points in the latitude-first coordinate system. In FIG. 21, it can be seen that the intervals between the points are constant in the lateral direction or in the longitudinal direction. Thus, the latitude-first coordinate system is a far superior system.

In the latitude-first coordinate system, sample points do not form a grid. As shown in FIG. 21, as the latitude increases, the number of sampling also decreases, so it is theoretically impossible to form a grid structure such as a go board. However, if we look at a local area on a global scale, for example, around Gwanghwamun Plaza in Seoul, the distribution of sample points may appear to form a grid structure. That is, while it surely looks like a Cartesian coordinate system locally, it has the characteristics of a spherical coordinate system on a global scale.

In addition, since Northing N, Easting E, and geocentric height A all have units of length or distance, people can intuitively understand their meaning. It is best to use the meter as the unit of length, but other units such as km or mm can also be used. If we use meter as the unit of length, then anyone can figure out that the positional accuracy is 10 cm if the Northing is written down to the first decimal place. Therefore, by using such a latitude-first coordinate system, any location on the Earth can be designated, and it is very convenient because a unit of length rather than an angle is used.

The mathematical formula of the latitude-first coordinate system is essentially the same as that of the sinusoidal projection. However, while the sinusoidal projection method has the purpose of drawing a map, the latitude-first coordinate system of the present embodiment has the purpose of designating the location of a point on the Earth in a useful and convenient way.

One might wonder where to use this latitude-first coordinate system if it's not for drawing maps. One area where this coordinate system can be useful is to describe the trajectory of a flight vehicle such as a satellite, aircraft, or drone. When a satellite does not use its own power, the trajectory of a satellite becomes a circle centered on the Earth's center of mass. Therefore, it is an optimal coordinate system to describe the trajectory of an artificial satellite. It is also suitable for describing the trajectories of aircrafts, drones, and missiles.

However, a map is essential in order to check our actual location, or find and go to a place. As described above, since the latitude-first coordinate system is not a coordinate system for drawing maps, not only a map drawn using other projection method such as the Mercator projection method is required, but also a method for matching the latitude-first coordinate system with an ordinary map is required.

Most of the maps indicate geodetic latitude, longitude and elevation above sea level. And on most of the maps, distances doesn't mean much unless it's a large-scale map. This is because distances vary in a very strange way depending on the projection method, and even for 1 cm length on the same map, the actual distance can vary depending on the location within the map. This is because the distance scale varies depending on the projection method and on the location within the map. Also, the altitude is mainly altitude above sea level, and the altitude above sea level can only be obtained by knowing the exact shape of the geoid.

Figure 22:
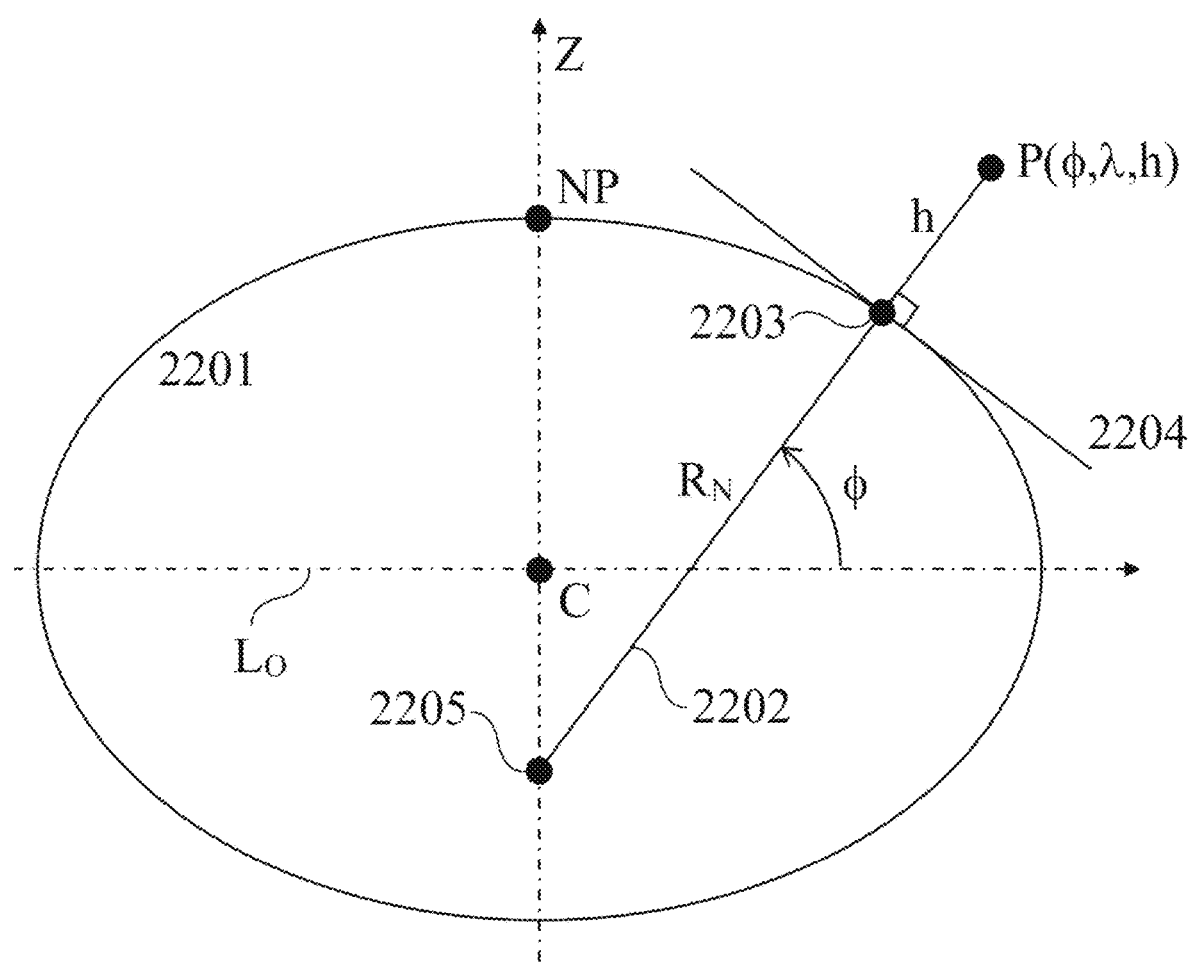
FIG. 22 is a conceptual diagram of the Earth ellipsoid for calculating geodetic latitude and ellipsoidal height in the world coordinate system.

FIG. 22 is a conceptual diagram of the Earth ellipsoid for calculating geodetic latitude and ellipsoidal height. The Earth ellipsoid (2201) uses the same three-dimensional Cartesian coordinate system as the spherical model Earth shown in FIG. 19. That is, the Earth ellipsoid is a flat rotational ellipsoid, i.e., an oblate spheroid, whose center is located at the origin of the three-dimensional Cartesian coordinate system. Also, the minor axis of the spheroid coincides with the Z-axis. That is, the Z-axis is the Earth's axis of rotation, and the X-Y plane is the Equatorial plane.

The coordinates of a point P on the Earth are expressed as geodetic latitude φ, longitude λ, and ellipsoidal height h. A coordinate system using geodetic latitude φ, longitude λ and ellipsoidal height h is called a geodetic coordinate system. Here, the ellipsoidal height is not measured based on the line segment connecting the origin C and the point P on the three-dimensional Cartesian coordinate system. At point P, a normal (2202) is dropped to the Earth ellipsoid. The point (2203) where the normal (2202) meets the Earth ellipsoid (2201) will be referred to as an ellipsoidal point. If a tangent plane (2204) is drawn to the Earth ellipsoid (2201) at the ellipsoidal point (2203), then the normal (2202) passes vertically through the tangent plane (2204). The angle φ with which the normal (2202) meets the Equatorial plane is the geodetic latitude. Then, the distance from the point (2205) where the extended normal meets the Z-axis to the ellipsoidal point (2203) is the radius of curvature in the prime vertical RN [non-patent document 12].

If the semimajor axis (radius of the semimajor axis), i.e., the long radius, is a, and the semiminor axis (radius of the semiminor axis), i.e., the short radius, is b, then the eccentricity e of the Earth ellipsoid is given by Eq. 49.

$$e^2 = 1 - \frac{b^2}{a^2} \quad \text{[Equation 49]}$$

And the radius of curvature in the prime vertical $R_N$ is given by Eq. 50 [non-patent document 15].

$$R_N = \frac{a}{\sqrt{1 - e^2(\sin\phi)^2}} \quad \text{[Equation 50]}$$

That is, the radius of curvature in the prime vertical is not a constant but given as a function of the geodetic latitude φ. And, the Cartesian coordinates X, Y and Z are given as functions of geodetic coordinates, i.e., geodetic latitude φ, longitude λ and ellipsoidal height h as in Eqs. 51-53.

$$X = (R_N + h)\cos\phi \cos\lambda \quad \text{[Equation 51]}$$

$$Y = (R_N + h)\cos\phi \sin\lambda \quad \text{[Equation 52]}$$

$$Z = \{R_N(1-e^2) + h\} \sin\phi \quad \text{[Equation 53]}$$

Using these formulas, the geodetic latitude φ, longitude λ and ellipsoidal height h can be sequentially converted in (φ, λ, h)→(X, Y, Z)→(ψ, λ, A)→(N, E, A) order, and the Northing N, the Easting E and the geocentric altitude A can be obtained. This can be summarized as follows.

First, let's suppose that the semimajor axis (long radius) a and the flattening/of the Earth ellipsoid are given. Then the eccentricity of the Earth is given by Eq. 54.

$$e^2 = 2f - f^2 \quad \text{[Equation 54]}$$

Given the geodetic latitude φ, the longitude λ and the ellipsoidal height h of a point P on the Earth, the radius of curvature in the prime vertical is given by Eq. 55.

$$R_N = \frac{a}{\sqrt{1 - e^2(\sin\phi)^2}} \quad \text{[Equation 55]}$$

In addition, the Cartesian coordinates X, Y and Z of the three-dimensional Cartesian coordinate system are given by Eqs. 56-58 as functions of the geodetic coordinates.

$$X = (R_N + h)\cos\phi \cos\lambda \quad \text{[Equation 56]}$$

$$Y = (R_N + h)\cos\phi \sin\lambda \quad \text{[Equation 57]}$$

$$Z = \{R_N(1-e^2) + h\} \sin\phi \quad \text{[Equation 58]}$$

On the other hand, X, Y and Z may also be written as functions of the geocentric coordinates as in Eqs. 59-61.

$$X = (R+A)\cos\psi \cos\lambda \quad \text{[Equation 59]}$$

$$Y = (R+A)\cos\psi \sin\lambda \quad \text{[Equation 60]}$$

$$Z = (R+A)\sin\psi \quad \text{[Equation 61]}$$

Therefore, from Eqs. 59-61, the geocentric latitude ψ, the longitude λ and the geocentric altitude A can be obtained as in Eqs. 62-64.

$$\psi = \tan^{-1}\left(\frac{Z}{\sqrt{X^2 + Y^2}}\right) \quad \text{[Equation 62]}$$

$$\lambda = \tan^{-1}\left(\frac{Y}{X}\right) \quad \text{[Equation 63]}$$

$$A = \sqrt{X^2 + Y^2 + Z^2} - R \quad \text{[Equation 64]}$$

In addition, the Northing N and the Easting E can be obtained as in Eqs. 65-66. [Equation 65]
N=Rip
[Equation 66] E=AR cos The Sejong Continuously Operating Reference Station (SEJN), one of the GNSS reference stations managed by the National Geographic Information Institute, has coordinates given by the geodetic latitude 36° 31'19.9682", the longitude 127° 18'11.4836" and the ellipsoidal height 181.196 m in the geodetic coordinate system based on the GRS80 ellipsoid. Converting the longitude and the latitude values into decimal system, in other words, express in decimal degrees, the geodetic latitude is 36.5222134° and the longitude is 127.3031899°. If we calculate the geocentric latitude and the longitude from this, the geocentric latitude is 36.3383398° and the longitude is 127.3031899°. That is, the difference between geodetic latitude and the geocentric latitude is 0.1838736°. Also, using R=6,371,008.8 m, the Northing and the Easting are calculated as N=4,040,644.61 m and E=11,402,698.22 m, respectively.

In a geodetic coordinate system, the ellipsoidal height is not measured along the straight line passing through the center of the Earth. Therefore, even if the geodetic latitude is the same, the geocentric latitude is different if the ellipsoidal height is different. Assuming that the ellipsoidal height is 0, the geocentric latitude is given as 36.3383346°, and the Northing and the Easting are given as 4,040,644.03 m and 11,402,698.98 m, respectively.

Figure 23:
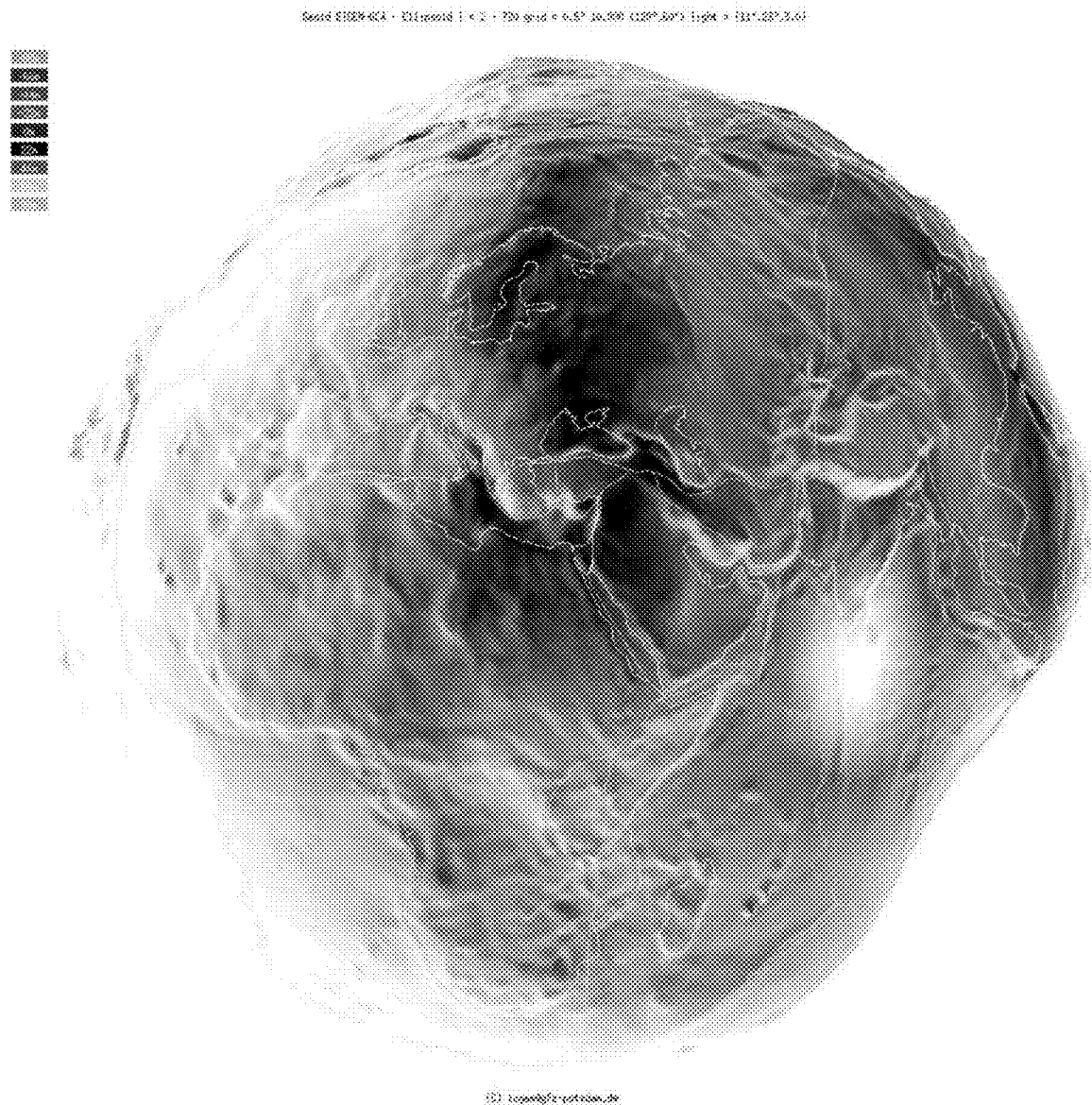
FIG. 23 is an exaggerated shape of the geoid.

However, although GPS receivers sometimes display the ellipsoidal height, mostly display the elevation above sea level. And, not the ellipsoidal height but the elevation above sea level is marked on most of the maps. FIG. 23 shows an exaggerated shape of the geoid (https://commons.wikimedia.org/wiki/File:Geoid_undulation_10k_scale.jpg).

As can be seen in FIG. 23, the shape of the geoid is very irregular. The Earth ellipsoid is a perfect spheroid which can be described by a simple mathematical equation, but the geoid depends on the topography and the density of underground minerals. Its theoretical concept is complicated, and it is very difficult to measure. Therefore, it is next to impossible to describe the shape of the geoid with a mathematical function such as a spheroid. Realistically, the Earth is divided into a grid structure and measured to create the geoid.

Each country measures the geoid for its own territory and announces a standard model, that is, the Geoid datum. In Korea, there is a KNGEOID provided by the National Geographic Information Institute, and the accuracy is said to be about 3 cm. Considering that the horizontal distance has a millimeter-level accuracy, it can be said that the errors are considerable.

Figure 24:
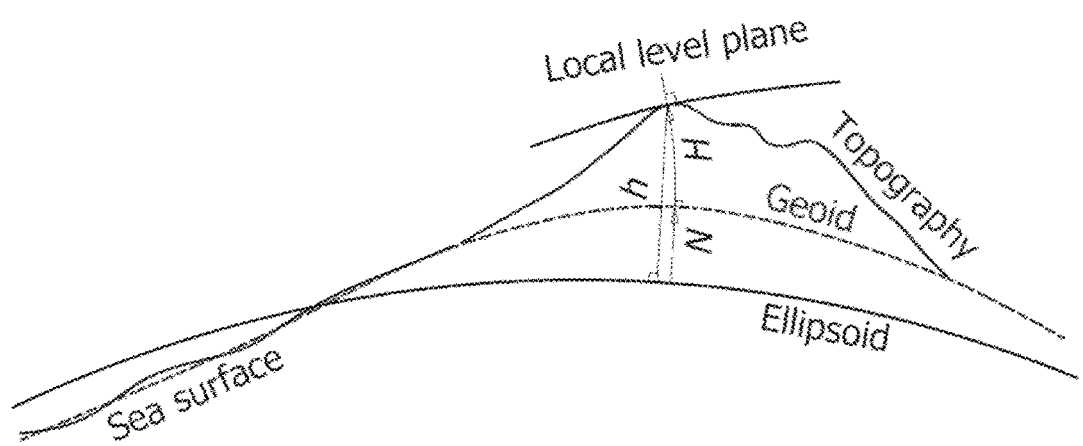
FIG. 24 is a conceptual diagram showing the relationship between the ellipsoidal height and the altitude above sea level.

FIG. 24 is a conceptual diagram for understanding the relationship between a geoid height and an ellipsoidal height. The altitude above sea level H at any point on the Earth is given as the ellipsoidal height h minus the geoid height N.

$$H = h - N \quad \text{[Equation 67]}$$

Therefore, if a GPS or a map shows the elevation above sea level, the ellipsoidal height can be obtained by considering the geoid height. However, strictly speaking, H is not an elevation above sea level, but a value called orthometric height.

In any case, we can obtain the geodetic latitude φ, the longitude λ and the elevation above sea level H from a GPS receiver, and from these by sequentially converting in (φ, λ, H)→(φ, λ, h)→(X, Y, Z)→(ψ, λ, A)→(N, E, A) order, we can obtain the Northing N, the Easting E and the geocentric altitude A.

Conversely, the process of obtaining the geodetic latitude φ, the longitude λ, and the elevation above sea level H from the Northing N, the Easting E and the geocentric altitude A is far more difficult. Geodetic latitude φ, longitude λ and ellipsoidal height h as functions of coordinates X, Y and Z in three-dimensional Cartesian coordinate system are given by Eqs. 68-70 [non-patent document 16].

$$\phi = \tan^{-1}\left[\frac{Z(R_N + h)}{\{R_N(1 - e^2) + h\}\sqrt{X^2 + Y^2}}\right] = \tan^{-1}\left[\frac{Z + e^2 R_N \sin\phi}{\sqrt{X^2 + Y^2}}\right] \quad \text{[Equation 68]}$$

$$\lambda = \tan^{-1}\left(\frac{Y}{X}\right) \quad \text{[Equation 69]}$$

$$h = \frac{\sqrt{X^2 + Y^2}}{\cos\phi} - R_N \quad \text{[Equation 70]}$$

Taking Eq. 68 as an example, since the radius of curvature in the prime vertical $R_N$ is a function of the geodetic latitude φ, the geodetic latitude is present in the formula for calculating the geodetic latitude. Therefore, we cannot obtain this value by simply tapping on a calculator. To obtain this value, we can use a simplified formula by taking advantage of the fact that the difference between the geodetic latitude and the geocentric latitude is small. Or, we can recursively call this function until the value converges. These methods itself are still the subject of research, and new methods are being devised and published by researchers.

Looking at Eq. 70, the geodetic latitude is required to obtain the ellipsoidal height. Therefore, finding the ellipsoidal height is not an easy problem, either. Only the formula for calculating longitude is simple, and it is the same regardless of whether the shape of the Earth is a sphere or an oblate spheroid.

Figure 11:
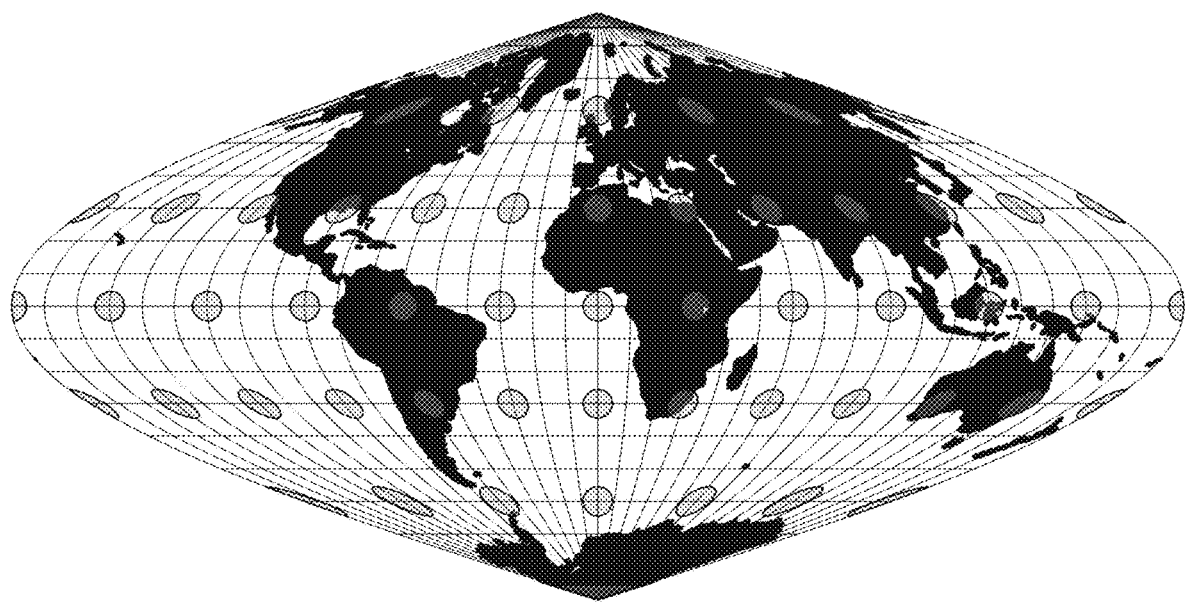
FIG. 11 is an example of a map by the sinusoidal projection method.
Figure 12:
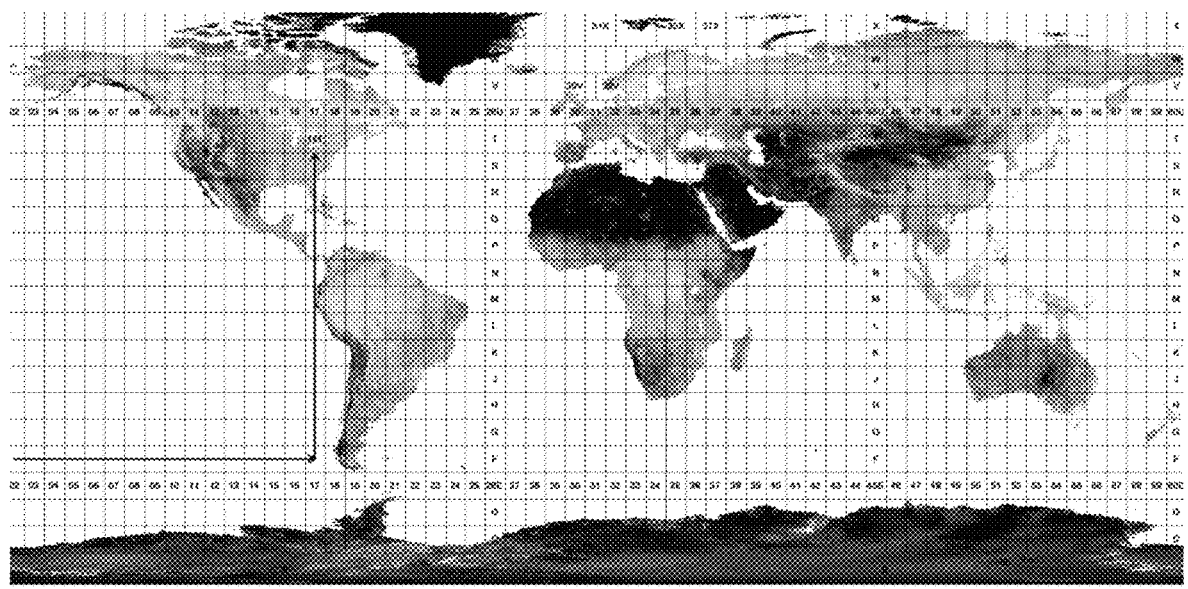
FIG. 12 is an example of the world map drawn in the UTM coordinate system.
Figure 18:
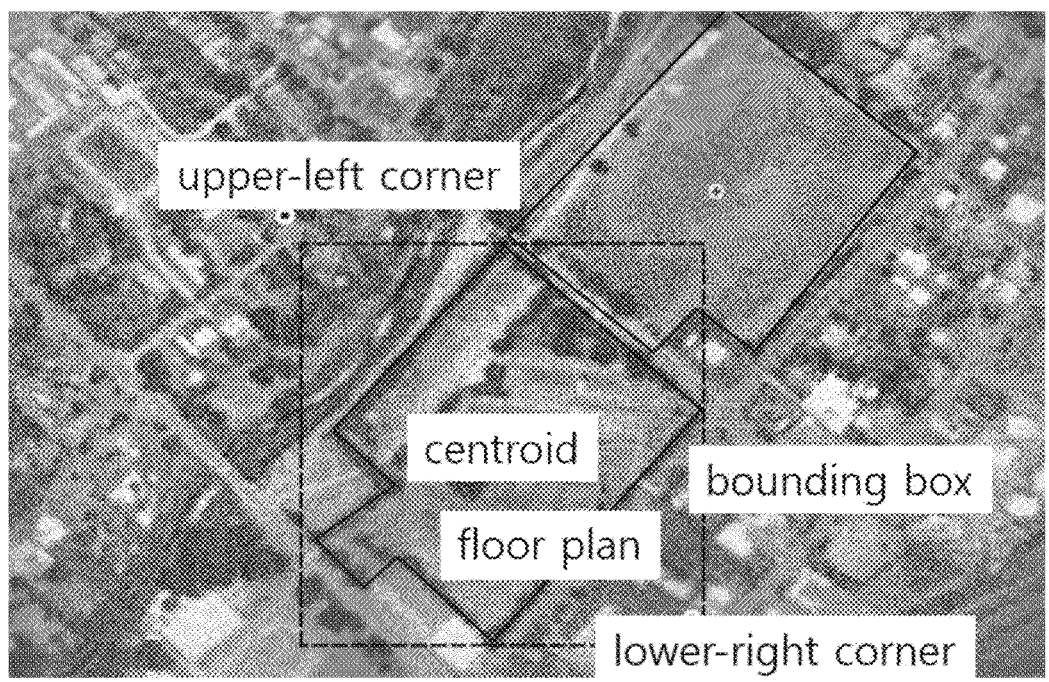
FIG. 18 is a drawing showing the concept of a centroid of a building and a minimum bounding box in a building floor plan.
Figure 25:
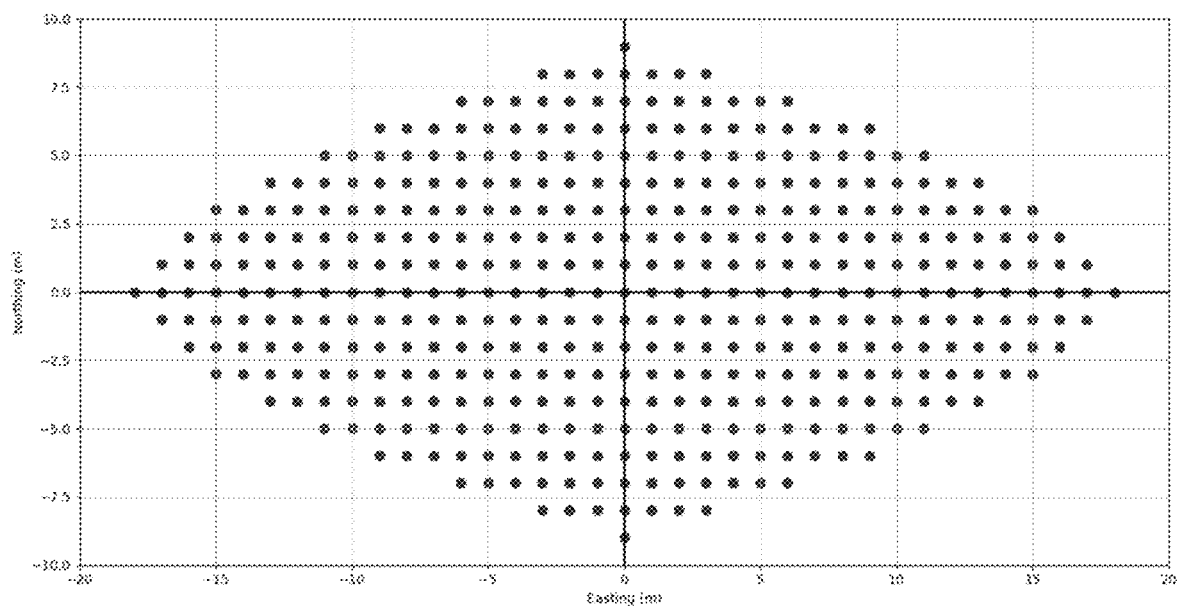
FIG. 25 is a diagram showing the distribution of sample points in the first embodiment of the present invention.

FIG. 25 shows the distribution of sample points set at Northing 1 m interval and Easting 1 m interval in the latitude-first coordinate system. It can be seen that the outline is the same as that of the map by the sinusoidal projection method shown in FIG. 11.

Figure 26:
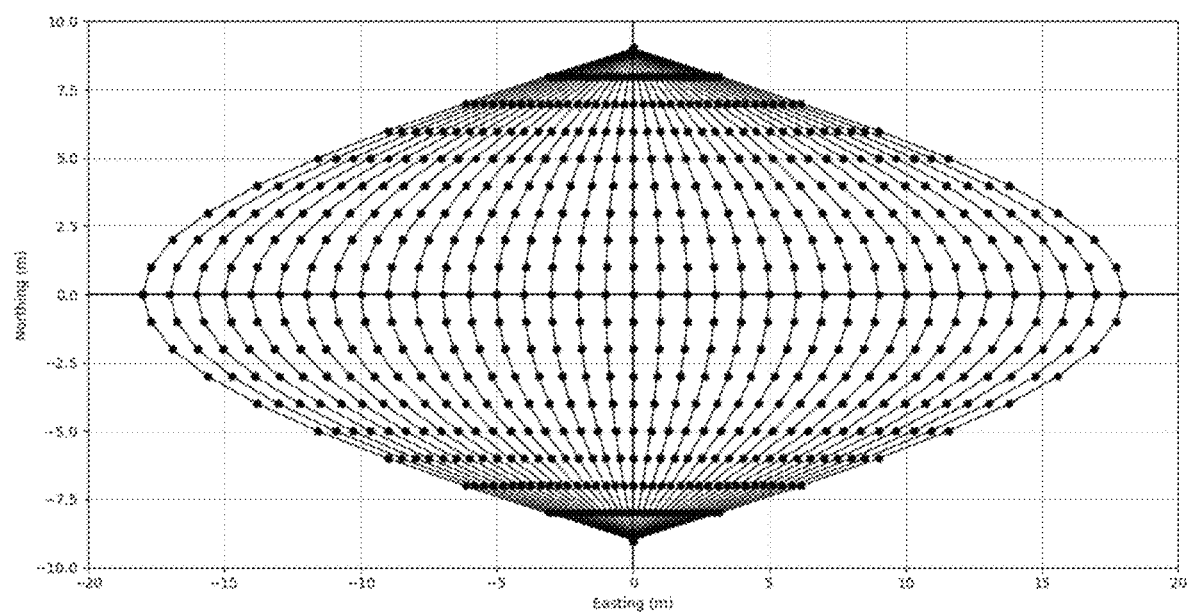
FIG. 26 is a diagram showing the distribution of sample points corresponding to uniform latitude and longitude intervals in the first embodiment of the present invention.

FIG. 26 is a diagram showing how the Northing and the Easting of corresponding points are distributed when a latitude-longitude grid structure with 10° intervals in both directions is assumed. As expected, it can be seen that the same longitude interval does not correspond to the same Easting interval. Also, if latitude is the same, the Northing is the same, and if latitude interval is the same, the Northing interval is the same. And if we look at a very small area in FIG. 26, it can be seen that the distribution of sample points is close to a grid structure.

Second Embodiment

Figure 27:
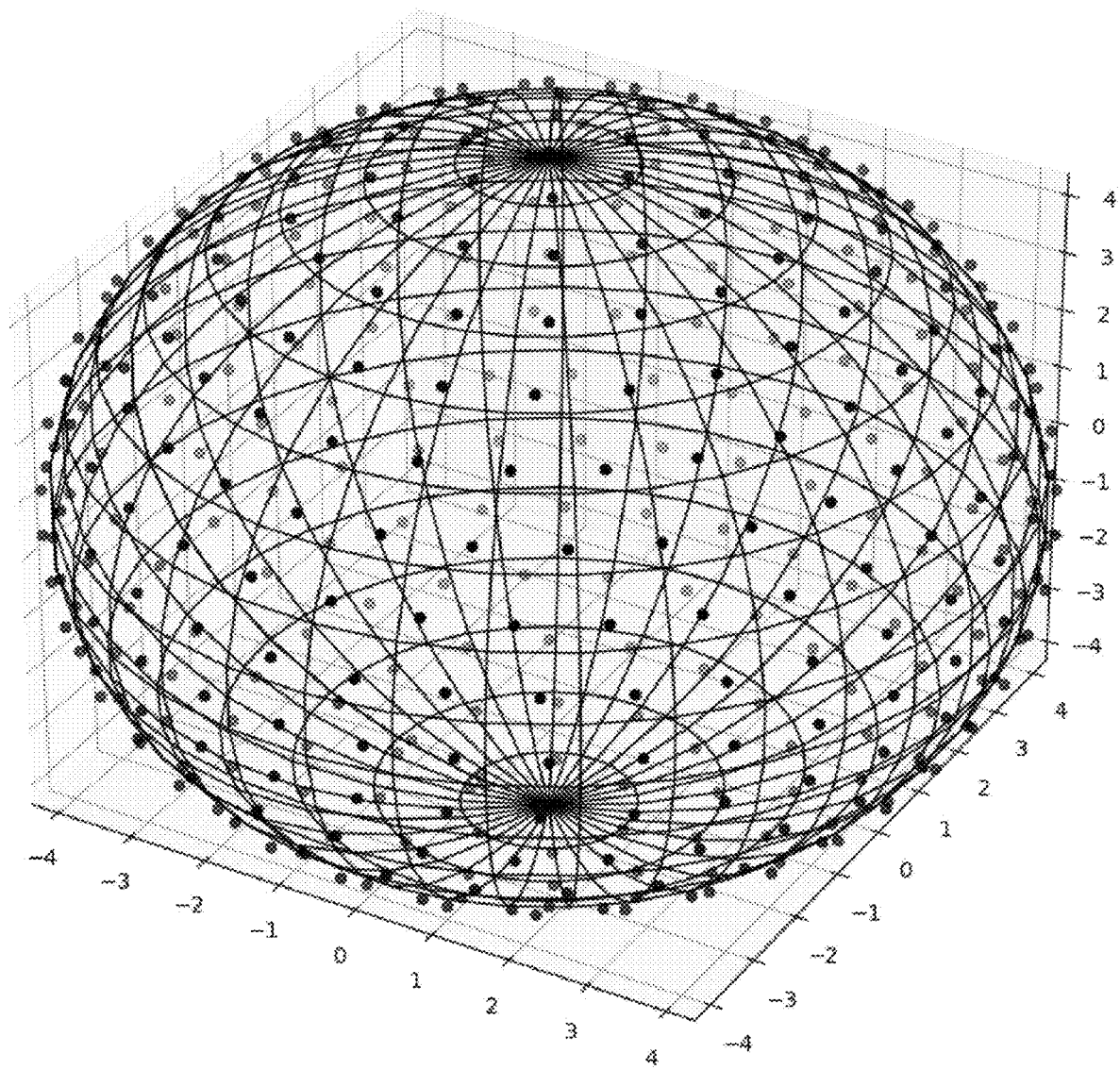
FIG. 27 is a shape of a sphere expressed in the latitude-first coordinate system in the second embodiment of the present invention.

As described above, the first embodiment of the present invention is a method not for creating a map, but for displaying the location of a point in a convenient and useful manner. However, rather than creating a map accompanying a map projection, the present invention can also be used to accurately express the shape of an object that is roughly spherical in shape. FIG. 27 shows a spherical surface expressed using the latitude-first coordinate system of the first embodiment of the present invention. That is, a spherical surface is modeled with a geocentric altitude A=0 and with the intervals of Northing N and the Easting E being both 1 m. As can be seen from FIG. 27, the spacing of the sampling points on the spherical surface is uniform regardless of the latitude.

Such a latitude-first coordinate system may be used, for example, to express the shape of the geoid shown in FIG. 23. In the existing method, 1° latitude and 1° longitude intervals are divided into a grid structure like a go board, and then measures the geoid at each grid point. However, in this method, the sampling interval is wide near the Equator, and narrow at the Polar Regions. That is, in a geographic coordinate system using longitude and latitude, the sampling interval decreases as the latitude increases, and hence it is inefficient. In addition, the UTM coordinate system is not only complicated, but also it cannot express the Polar Regions at all. However, using a latitude-first coordinate system, any point on the Earth can be expressed while having uniform sampling density.

In addition, the latitude-first coordinate system can be used to express the shape of the real Earth including mountain ranges, rivers, roads, overpass, high-rise buildings and the like in 3D. For example, a three-dimensional (3D) globe can be created by sampling every place on the Earth at 1 m lateral and longitudinal intervals.

Third Embodiment

One drawback of the first embodiment is that the Northing and the Easting may have negative (−) values as well as positive (+) values. A data structure where values are symmetrically distributed in positive and negative directions with respect to the origin may appear very natural to people, but there are many inconveniences in processing them with computer. For computers, data that is expressed as a natural number which starts from 0 and increases in one direction only or that is expressed as a positive real number are convenient to deal with.

Another drawback is that when we are interested in only a part of the Earth, the Northing or the Easting may have unnecessarily large values. In Korea, for example, a TM coordinate system having the west, the central, the east and the East Sea origin of Korea plane coordinate system is used. Since it is difficult to know the ellipsoidal heights of these origins, table 2 shows the Northing and the Easting for the Sejong Continuously Operating Reference Station and the four origins assuming that the ellipsoidal heights are 0.

TABLE 2

| classification | geodetic latitude | longitude | Northing | Easting |
|---|---|---|---|---|
| Sejong Continuously Operating Reference Station | 36.5222134° | 127.3031899° | 4040644.03 m | 11402698.98 m |
| west origin of Korea plane coordinate system | 38.0° | 125.0° | 4204668.95 m | 10980669.51 m |
| central origin of Korea plane coordinate system | 38.0° | 127.0° | 4204668.95 m | 11156360.22 m |
| east origin of Korea plane coordinate system | 38.0° | 129.0° | 4204668.95 m | 11332050.93 m |
| East Sea origin of Korea plane coordinate system | 38.0° | 131.0° | 4204668.95 m | 11507741.65 m |

If we look at the Easting in table 2, the largest digit is all the same. If our interest are on purely domestic regions, it is unnecessary and inconvenient to display such a large number. In the third embodiment of the present invention, the Northing and the Easting are given by Eqs. 71-72.

$$N = N_o + R(\psi - \psi_o) \quad \text{[Equation 71]}$$

$$E = E_o + (\lambda - \lambda_o) R \cos \psi \quad \text{[Equation 72]}$$

Here, $\psi_o$ and $\lambda_o$ are the geocentric latitude and the longitude of the reference point. That is, not only the latitude-longitude origin, but also any point on the Earth can be used as a reference point. Also, $N_o$ and $E_o$ are the default values of the Northing and the Easting, respectively. When the reference geocentric latitude $\psi_o$, the reference longitude $\lambda_o$, the default Northing $N_o$ and the default Easting $E_o$ are all 0, it becomes the same as the first embodiment. In addition, by adjusting the reference geocentric latitude $\psi_o$, the reference longitude $\lambda_o$, the default Northing $N_o$ and the default Easting $E_o$, the ranges of the Northing N and the Easting E can be adjusted.

Geocentric latitude $\psi$ and longitude $\lambda$ are given as functions of the Northing N and the Easting E as in Eqs. 73-74.

$$\psi = \psi_o + \frac{N - N_o}{R} \quad \text{[Equation 73]}$$

$$\lambda = \lambda_o + \frac{E - E_o}{R \cos\left(\psi_o + \frac{N - N_o}{R}\right)} \quad \text{[Equation 74]}$$

Figure 28:
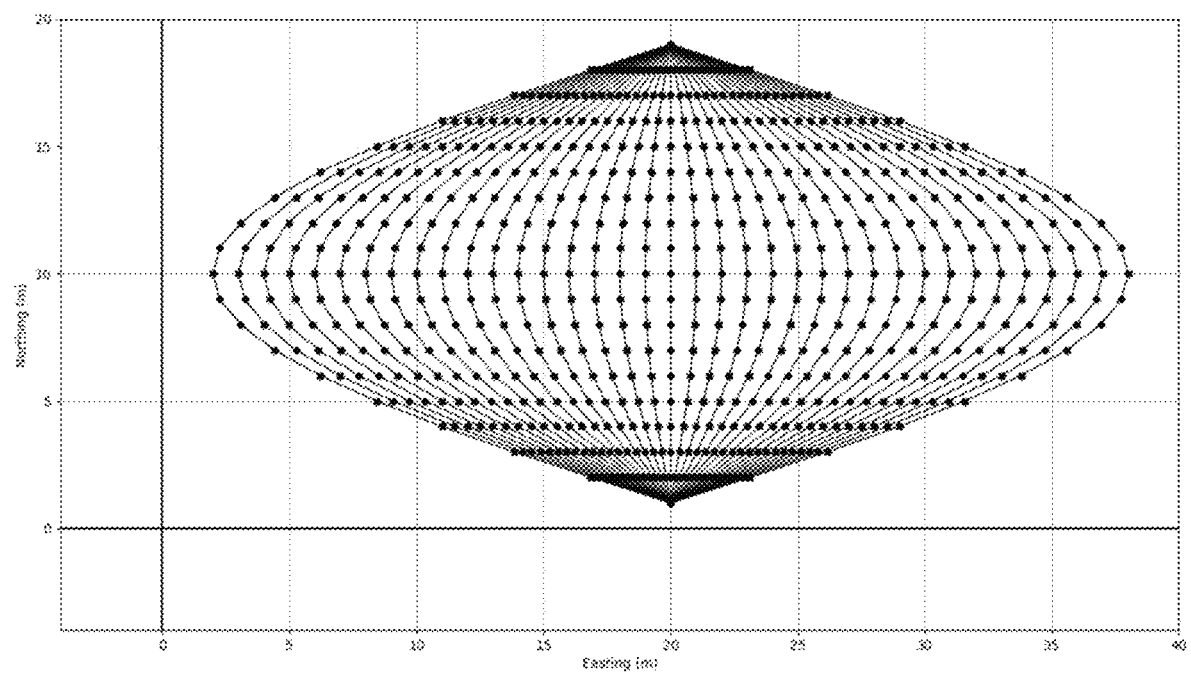
FIG. 28 is a diagram illustrating a case where the ranges of the Northing and the Easting are moved to positive regions using default values of the Northing and the Easting in the third embodiment of the present invention.

FIG. 28 is a diagram illustrating a case where the ranges of the Northing and the Easting are moved to positive regions using the default values of the Northing and the Easting in the third embodiment of the present invention. Specifically, it is a case where assuming that the circumference of the spherical model Earth is 36 m, the default Northing is set at 10 m and the default Easting is set at 20 m. As can be seen in FIG. 28, the Northing N and the Easting E have positive (+) values over the entire region of the Earth's surface.

Figure 29:
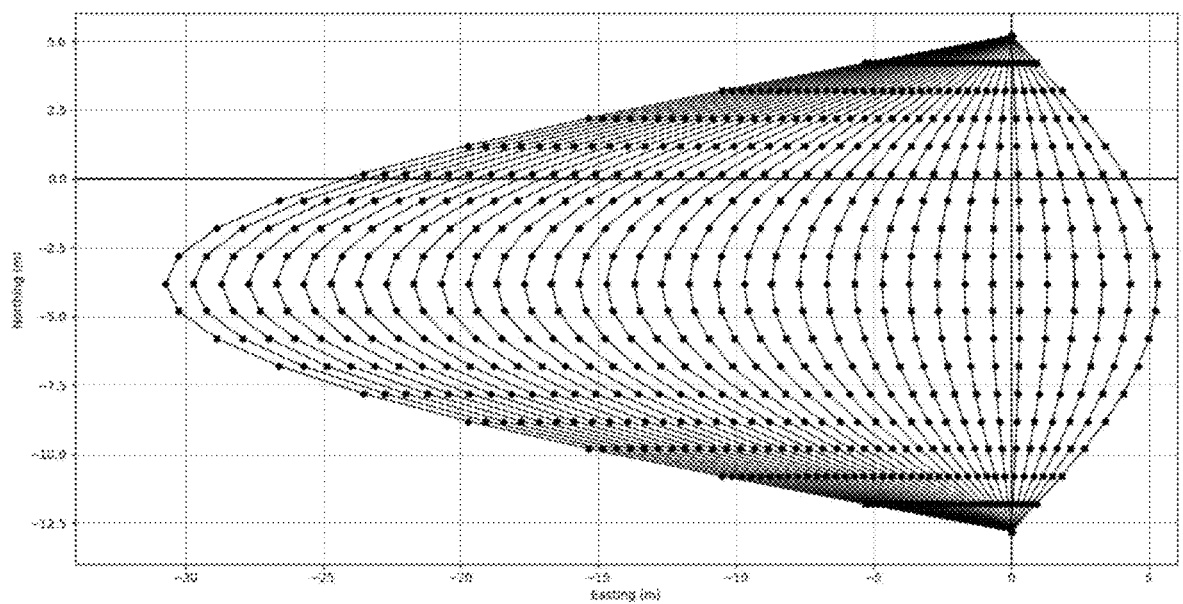
FIG. 29 is a diagram illustrating a case where the reference geocentric latitude and the reference longitude are changed from the origin of latitude-longitude origin to (38°, 127°) in the third embodiment of the present invention.

FIG. 29 is a diagram showing a case where the reference geocentric latitude and the reference longitude are changed from the latitude-longitude origin to (38°, 127°) in the third embodiment of the present invention. It can be seen that the distribution of the sampling points have moved with respect to the origin, and the overall shape has also changed.

As such, by changing the reference geocentric latitude and the reference longitude, or setting the default Northing and the default Easting appropriately, the latitude-first coordinate system can be optimized for any local area on the Earth.

Table 3 shows the Northing and the Easting calculations for the Sejong Continuously Operating Reference Station and the four origins where the Sejong Continuously Operating Reference Station is set as the reference point and the ellipsoidal heights are assumed as 0.

TABLE 3

| classification | geodetic latitude | longitude | Northing | Easting |
|---|---|---|---|---|
| Sejong Continuously Operating Reference Station | 36.5222134° | 127.3031899° | 0.00 m | 0.00 m |
| west origin of Korea plane coordinate system | 38.0° | 125.0° | 164024.92 m | −202324.54 m |
| central origin of Korea plane coordinate system | 38.0° | 127.0° | 164024.92 m | −26633.82 m |
| east origin of Korea plane coordinate system | 38.0° | 129.0° | 164024.92 m | 149056.89 m |
| East Sea origin of Korea plane coordinate system | 38.0° | 131.0° | 164024.92 m | 324747.60 m |

As can be seen in table 3, the Northing and the Easting are given as small values by using this method.

Fourth Embodiment

In the first and the third embodiments, the Northing and the Easting were calculated assuming a spherical model Earth. However, the Earth ellipsoid model is used to produce public maps at the national level or to conduct surveys related to large-scale civil engineering or construction works. Moreover, it would be desirable to use the Earth ellipsoid model to collect survey data compatible in the global scale. Therefore, the concepts of the Northing and the Easting should be also defined based on the Earth ellipsoid.

Also in this case, as shown in FIG. 19, a three-dimensional Cartesian coordinate system is used where the coordinate system is fixed to the Earth and rotates with the Earth (Earth-Centered Earth-Fixed), the coordinate origin lies at the Earth's center of mass, and the Earth's rotational axis is set as the Z-axis. The X-axis is a straight line from the origin and passing through the point where the prime meridian meets the Equator. The Earth ellipsoid is an oblate spheroid whose center is located at the origin of the three-dimensional Cartesian coordinate system, and its minor axis coincides with the Z-axis.

The rectangular coordinates (X, Y, Z) of a point P on the Earth have the geodetic latitude $\varphi$, the longitude $\lambda$ and the ellipsoidal height h in the geodetic coordinate system based on the Earth ellipsoid. A normal (2202) is dropped from the one point to the Earth ellipsoid, and the point (2203) where the normal (2202) meets the Earth ellipsoid (2201) is called an ellipsoidal point. The normal (2202) is perpendicular to the tangent plane (2204) which is tangent to the Earth ellipsoid at the ellipsoidal point (2203). And the distance from the point where the extended normal (2202) meets the Z-axis, that is, the intersection point (2205) between the Z-axis and the normal (2202), to the ellipsoidal point is the radius of curvature in the prime vertical. The radius of curvature in the prime vertical RN is given by Eq. 75, where e is the eccentricity and a is the long radius of the Earth ellipsoid.

$$R_N = \frac{a}{\sqrt{1 - e^2(\sin\phi)^2}} \quad \text{[Equation 75]}$$

Also, the rectangular coordinates X, Y and Z of the three-dimensional Cartesian coordinate system are given by Eqs. 76-78 as functions of the geodetic coordinates.

$$X = (R_N + h)\cos\phi \cos\lambda \quad \text{[Equation 76]}$$

$$Y = (R_N + h)\cos\phi \sin\lambda \quad \text{[Equation 77]}$$

$$Z = \{R_N(1 - e^2) + h\} \sin\phi \quad \text{[Equation 78]}$$

Identical to the case of the spherical model Earth, meridians, prime meridian, parallels of latitude and Equator can be defined. That is, on the surface of the Earth ellipsoid, a meridian is a curve connecting points of the same longitude and is given as half an ellipse. The meridian corresponding to the longitude $\lambda$ is denoted as $M(\lambda)$. And the meridian $M_O = M(0)$ corresponding to longitude $\lambda = 0$ is the prime meridian. Also, parallels of latitude are curves connecting points having the same geodetic latitude on the surface of the Earth ellipsoid, and are always given as circles parallel to the Equator. The parallel of latitude corresponding to the geodetic latitude $\varphi$ is $L(\varphi)$, and among the parallels of latitude, the parallel of latitude $L_O = L(0)$ corresponding to latitude 0° is the Equator. And the intersection point of the prime meridian and the Equator is the latitude-longitude origin O.

In the fourth embodiment of the present invention, the location of a point having geodetic latitude $\varphi$, longitude $\lambda$ and ellipsoidal height h is expressed as a Northing N, an Easting E and an ellipsoidal height h. Also, the intersection point of the prime meridian $M_O$ and the parallel of latitude $L(\varphi)$ is called the waypoint $W(\varphi)$. In this case, the Northing N is the distance from the latitude-longitude origin to the waypoint measured along the prime meridian $M_O$. Although the derivation process of the equation is quite complicated, the result is simply given by Eq. 79 [non-patent document 16].

$$N = a(1 - e^2) \int_0^\phi \frac{dt}{(1 - e^2(\sin t)^2)^{\frac{3}{2}}} \quad \text{[Equation 79]}$$

Similarly, the Easting E is the arc length from the waypoint to the ellipsoidal point, and is given by Eq. 80.

$$E = \lambda R_N \cos\phi \quad \text{[Equation 80]}$$

The Northing N given by Eq. 79 can be given as Eqs. 81-86 by using the binomial theorem.

$$N(\phi) = A_0\phi + A_2\sin 2\phi + A_4\sin 4\phi + A_6\sin 6\phi + A_8\sin 8\phi + \cdots \quad \text{[Equation 81]}$$

$$A_0 = a\left(1 - \frac{e^2}{4} - \frac{3e^4}{64} - \frac{5e^6}{256} - \frac{175e^8}{16 \times 1024}\right) \quad \text{[Equation 82]}$$

$$A_2 = a\left(-\frac{3e^2}{8} - \frac{3e^4}{32} - \frac{5e^6}{1025} - \frac{420e^8}{16 \times 1024}\right) \quad \text{[Equation 83]}$$

$$A_4 = a\left(\frac{15e^4}{256} + \frac{45e^6}{1024} + \frac{525e^8}{16 \times 1024}\right) \quad \text{[Equation 84]}$$

$$A_6 = a\left(-\frac{35e^6}{3072} - \frac{175e^8}{12 \times 1024}\right) \quad \text{[Equation 85]}$$

$$A_8 = a\left(\frac{315e^8}{128 \times 1024}\right) \quad \text{[Equation 86]}$$

When this formula is applied, the error is said to be sub-millimeter.

Using the spherical model Earth (R=6,371,008.8 m) to calculate the Northing of the North Pole (i.e. 1/4 of the circumference), we get 10,007,557.22 m. On the other hand, the Northing obtained by numerical integration of Eq. 79 using the Earth ellipsoid model is 10,001,965.7292 m. If the Northing is calculated using Eq. 81, it is also given as 10,001,965.7292 m. Therefore, it can be seen that Eq. 79 and Eq. 81 exactly match. On the other hand, if we draw a graph of the Northing as a function of the geodetic latitude, it is difficult with a naked eye to distinguish it from a straight line passing through the origin.

Fifth Embodiment

When collecting data on the global scale, it would be desirable to use the latitude-longitude origin as the origin of the coordinate system. However, when using only in a local area, for example, when using only within the territory of the Republic of Korea, as with the case of using spherical model Earth, it would be desirable to use default Northing $N_o$, default Easting $E_o$ and a reference point with geodetic latitude $\varphi_o$ and longitude $\lambda_o$. Therefore, in general, the Northing N and the Easting E are given by Eqs. 87-88.

$$N = N_o + a(1 - e^2) \int_{\phi_o}^{\phi} \frac{dt}{(1 - e^2(\sin t)^2)^{\frac{3}{2}}} \quad \text{[Equation 87]}$$

$$E = E_o + (\lambda - \lambda_o)R_N \cos\phi \quad \text{[Equation 88]}$$

Eq. 87 can be transformed as follows.

$$N(\phi) = a(1-e^2)\int_0^\phi \frac{dt}{(1-e^2(\sin t)^2)^{\frac{3}{2}}} + \left\{N_o - a(1-e^2)\int_0^{\phi_o} \frac{dt}{(1-e^2(\sin t)^2)^{\frac{3}{2}}}\right\} \quad \text{[Equation 89]}$$

When a function y has the form of Eq. 90, the function y is called a linear function with respect to the variable x. Here, a and b are constants, where a is called the slope and b is called the y-intercept.

$$y(x)=ax+b \quad \text{[Equation 90]}$$

The first term in Eq. 89 is the Northing from the latitude-longitude origin to the geodetic latitude φ and it is identical to Eq. 79. And the second term has no dependency on geodetic latitude φ. That is, the second term is a constant. Then, Eq. 89 is a linear function of the Northing from the latitude-longitude origin to the geodetic latitude φ, where especially the slope is 1.

Sixth Embodiment

The exact location on the Earth is uniquely determined when the rectangular coordinates (X, Y, Z) of the three-dimensional Cartesian coordinate system are given, but the rectangular coordinates (X, Y, Z) are recognized as empty numbers for people living on a roughly spherical surface of the Earth. The exact location can also be specified by the geocentric latitude ψ, the longitude λ, and the geocentric altitude A in the geocentric coordinate system. But maps, smartphones, or GPS receivers provide geodetic latitude, not geocentric latitude. Furthermore, geocentric altitude is not provided by them.

Given the geodetic latitude φ, the longitude λ and the ellipsoidal height h in the geodetic coordinate system, it is possible to accurately specify a position on the Earth. However, most of the maps provide the geodetic latitude and the longitude but not the ellipsoidal height. If we use a smartphone or a GPS receiver, we can obtain the altitude above sea level. But if we don't know the geoid height, we can't find out the ellipsoidal height. If we don't know the ellipsoidal height, we don't know the exact location on the Earth, either.

However, since most of the people live attached to the surface of the Earth or on sea level, only the geodetic latitude and the longitude are necessary to know to practically determine the location. That is, were it not for special cases, such as sending an Inter-Continental Ballistic Missile (ICBM) to surgically strike an enemy's military facilities, or specifying the exact location of an airplane, drone, or submarine, we only need to specify the geodetic latitude and the longitude. For example, when precise coordinates are needed to rescue a strayed traveler in a deep mountain or a boundless ocean, the altitude above sea level is not really necessary.

Although it is possible to specify a location simply by geodetic latitude and longitude, as described above, it is difficult to guess how far away that location is from the current location or how vast positional error range the coordinates represents. Therefore, coordinates such as the Northing and the Easting according to the present invention are preferable. However, in the geodetic coordinate system based on the Earth ellipsoid, the formulas for calculating the Northing and the Easting from the geodetic latitude and the longitude are relatively complicated, and the inverse process of calculating the geodetic latitude and the longitude from the Northing and the Easting is even more complicated.

However, even if the Northing and the Easting are perceived as more meaningful numbers by people, and in a format more suitable for transmission using transmission media such as the Internet, they should be converted back to the geodetic latitude and the longitude in order to find its location on a map. Therefore, for everyday purposes such as using maps and not surveying or scientific research, all we need are two numbers that have similar meanings to Northing and Easting and can be easily converted to and from a pair of geodetic latitude and longitude. We don't' really need exact distances measured along meridians or parallel of latitude for a spherical model Earth or the Earth ellipsoid.

Moreover, the distances measured along meridians or parallels of latitude on the Earth ellipsoid do not correspond to the actual distances we are moving when we travel. If the ellipsoidal height at my current location is not 0 m, or the ellipsoidal height is 0 m but the slope of the surface of the Earth is not 0°, then the two numbers do not match.

Therefore, in the sixth embodiment of the present invention, the Northing has a unit of distance, and is given as a monotonically increasing function of geodetic latitude φ or a monotonically increasing function of geocentric latitude ψ, and the Easting is also given as a monotonically increasing function of longitude λ with units of distance.

A monotonically increasing function means that when the variable value increases, the function value also increases, and therefore it refers to a special kind of function. For example, sin(x) is not a monotonically increasing function of x. This is because sin(x) repeats increasing and decreasing even though x continues to increase. Meanwhile, $x^3$ is a monotonically increasing function, and exp(x) is also a monotonically increasing function. As x increases, $x^3$ increases, and exp(x) also increases. However, the extents to which $x^3$ increases and exp(x) increases are of course different. On the other hand, y(x)=−2x+3 is a monotonically decreasing function of x. This is because it is a linear function with a negative (−) slope. That is, a monotonically increasing function only cares if the function value increases when the variable value increases, and does not care how much it increases in value.

In the fourth embodiment, the Northing and the Easting are given by Eqs. 91-92.

$$N(\phi) = N_o + a(1-e^2)\int_{\phi_o}^\phi \frac{dt}{(1-e^2(\sin t)^2)^{\frac{3}{2}}} \quad \text{[Equation 91]}$$

$$E(\lambda) = E_o + (\lambda - \lambda_o)R_N \cos\phi \quad \text{[Equation 92]}$$

First, since the default Northing $N_o$ and the long radius a of the Earth ellipsoid have units of distance, the Northing also has a unit of distance, for example, meter. Also, the Northing N(φ) is a monotonically increasing function of the geodetic latitude φ. Since the integrand is always greater than 0, the integral in Eq. 91 must always be a monotonically increasing function with respect to the geodetic latitude φ.

The Easting E(λ) also has a unit of distance. This is because the default Easting $E_o$ and the radius of curvature in the prime vertical $R_N$ have units of distance. Moreover, the Easting is a monotonically increasing function with respect to the longitude λ. Since cos φ always has a positive value in the interval from −90° to +90°, Eq. 92 is a linear function of the longitude λ in which the slope $R_N \cos \varphi$ has a positive value. Therefore, it is a monotonically increasing function.

Similarly, in the case of the third and the fifth embodiments, the Northing is a monotonically increasing function of the geodetic latitude φ, and the Easting is a monotonically increasing function of the longitude λ.

In the third embodiment, the Northing and the Easting are given by Eqs. 93-94.

$$N(\psi)=N_o+R(\psi-\psi_o) \qquad \text{[Equation 93]}$$

$$E(\lambda)=E_o+(\lambda-\lambda_o)R \cos \psi \qquad \text{[Equation 94]}$$

The Northing N(ψ) is a linear function with a positive slope R with respect to the geocentric latitude ψ, and the Easting E(λ) is a linear function with a positive slope R cos ψ with respect to the longitude λ. That is, both are monotonically increasing functions. In addition, the Northing and the Easting in the first embodiment are also monotonically increasing functions.

Accordingly, the Northings used in embodiments 1, and 3 to 5 of the present invention are monotonically increasing functions of the geocentric latitude or the geodetic latitude, and the Easting is a monotonically increasing function of the longitude. And, all have units of distance. By the way, the Northing and the Easting in the third or the fifth embodiments are not preferable for the above-mentioned reasons. The most preferable forms of the Northing and the Easting are given by Eqs. 95-96.

$$N=N_o+R(\phi-\phi_o) \qquad \text{[Equation 95]}$$

$$E=E_o+(\lambda-\lambda_o)R \cos \phi \qquad \text{[Equation 96]}$$

That is, it is in the form of the equation in the third embodiment where the geocentric latitude is replaced by the geodetic latitude. In addition, formulas for obtaining geodetic latitude and longitude from the Northing and the Easting are given by Eqs. 97-98.

$$\phi = \phi_o + \frac{N - N_o}{R} \qquad \text{[Equation 97]}$$

$$\lambda = \lambda_o + \frac{E - E_o}{R \cos\left(\phi_o + \frac{N - N_o}{R}\right)} \qquad \text{[Equation 98]}$$

That is, bidirectional calculations are given as simple formulas that can be calculated even by hand, and fast calculations are possible when processed by computers.

Unlike in the third or fifth embodiment, the Northing and the Easting in the sixth embodiment of the present invention do not have clear geometrical meanings. Therefore, they should not be understood as actual distances. However, since the difference between the geocentric latitude and the geodetic latitude is not large, the Northing given by Eq. 95 and the Easting given by Eq. 96 allows us to roughly estimate the real distances. Also, if we want to know the exact corresponding location on the map, we can obtain the exact geodetic latitude and longitude using Eqs. 97-98. If we know the exact geodetic latitude and longitude, we can find its location directly on the map. If geocentric altitude or ellipsoidal height is added to this, the exact location on the Earth can be specified using the formula in the first embodiment.

Seventh Embodiment

Most of the contemporary people live in cities. In cities, there are numerous buildings such as apartments and commercial buildings. For modern people living or working in indoor spaces, a method of comprehensively specifying the location including the indoor location is required along with the geographical location that can be specified by latitude and longitude.

In the present invention, all the artificial structures will be called buildings without distinguishing between structures and buildings. Buildings and structures have different legal meanings, but not only they do not conform to the common senses, but also most of the people do not know the difference. Therefore, in the present invention, all the artificial structures such as apartments, commercial buildings, barns, school buildings, factories, churches or temples, underground shopping malls, baseball stadiums, and parking towers will be called buildings.

When we are in multi-story buildings, such as apartment, underground shopping mall, building, or parking tower, floor information is more important than the altitude above sea level. For example, if we are to meet someone in a tall business building, information about which floor we are on is more important. Also, at one time or another, everyone has an experience of parking his/her car in an underground parking lot and get perplexed after finding out that he/she forgot the basement level he/she parked on. For these various reasons, floor information is more useful than the elevation above sea level.

The concept of floors in commercial building or apartment is familiar to everyone. However, in general, the ground floor is called the first floor, and the way underground floors are called are like the first basement level and the second basement level. If the first basement level is considered as −1 floor and the second basement level is considered as −2 floor and the like, and if we substitute the floor levels by integers, the index becomes discontinuous because there is no zeroth floor. That is, it becomes like −3, −2, −1, 1, 2, 3, 4, 5, which is inconvenient to process with computers.

Figure 30:
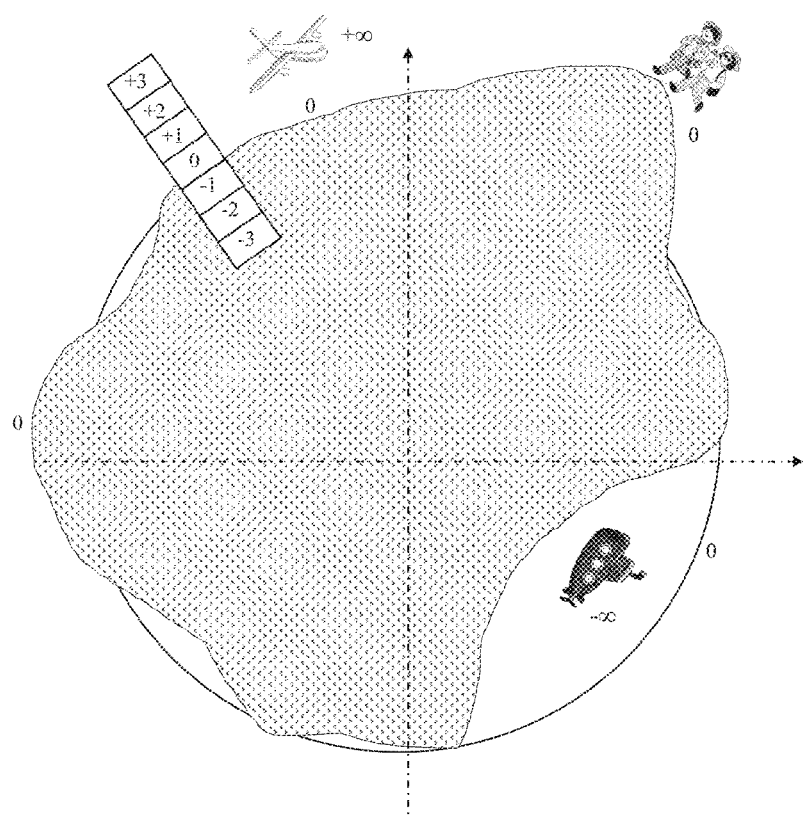
FIG. 30 is a conceptual diagram illustrating the concept of floor information in the present invention.

FIG. 30 is a conceptual diagram for understanding the floor model used in the seventh embodiment of the present invention. In order to describe the entire Earth with a simple mathematical model and in a consistent concept, it is desirable to call the ground floor as the 0th floor. Of course, there is nothing wrong with calling the first floor as +1 floor as in the general concept, but the computer code will look a little messy.

In any case, in the seventh embodiment of the present invention, the surface of the Earth, the surface of a lake, and the sea level in the middle of the ocean are all regarded as the 0th floor. The 0th floor in the seventh embodiment of the present invention refers to the surface of the Earth on which a person can walk around naturally with his feet and the floor of the building continuously connected to the surface of the Earth. Therefore, if John Doe goes jogging along the riverside road, or swim in the lake, or finds a favorite store and walks into the store from the sidewalk, he still remains on the 0th floor. Also, when he climb Mt. Baekdu or Mt. Everest and sing hurray at the top of the mountain, he is also on the 0th floor. That is, in the present invention, the 0th floor has nothing to do with the altitude above sea level.

On the other hand, the floor we call the second floor is +1 floor, and the third floor is +2 floor. Also, the first basement level is −1 floor, and the second basement level is −2 floor. And if we are floating in the air on an airplane or on a hot air balloon, we are considered to be on +∞ floor regardless of the altitude. Also, if we are diving under a lake or in the sea, we are considered to be on −∞ level.

In the present invention, the +∞ layer or −∞ layer does not actually mean an infinite number, but means the largest number or the smallest number. For example, assuming that floors from −612 to +611 are allowed in the embodiment of the present invention, the +611 floor is regarded as the +∞ floor, and the −612 floor is regarded as the −∞ floor.

In the seventh embodiment of the present invention, the geocentric altitude, the ellipsoidal height, and the altitude above sea level are all ignored, and an integer F representing the floor is used instead. In addition, the location in the horizontal dimension uses the Northing N and the Easting E of the sixth embodiment. And an integer F representing the floor is selectively used. That is, if the location of one point is specified as (N, E, F), it means the F floor of a building with a Northing N and an Easting E. In reality, it represents a specific point on the F floor of a building where the geodetic latitude and the longitude of the point corresponds to the Northing N and the Easting E. On the other hand, if it is simply written as (N, E), it means (N, E, 0). That is, it may mean an outdoor place that does not require the concept of a floor, or it may mean the first floor of a multi-story building.

This model can be used for a variety of purposes in large cities where most of the buildings are multi-story buildings, such as ordering food for delivery, delivering mail, making an appointment with other people, or visiting a restaurant found on the Internet.

Eighth Embodiment

In traditional markets, we can see grandmothers selling things with stalls measuring only 1 m in width and length or smaller. In addition, street lights, traffic lights, telephone booths, fire hydrants, etc. occupy a smaller area. As such, there may be a need to accurately specify the location of a movable property or real estate with a small footprint. Or, if we want to meet friends by specifying the location in a place without any special geographical features and where people are densely populated such as in the middle of the Gwanghwamun Plaza in Seoul, we need a method to specify and distinguish a section of about 1 m in width and length in a unique way.

The surface area of a sphere with radius R is given by $4\pi R^2$. Using 6,371,008.8 m as the value of the average radius R of the spherical model Earth, the surface area is given as $5.1006588 \times 10^{14}$ m$^2$. In other words, if the surface of the Earth is divided into pieces of approximately 1 m in width and length, about 510 trillion pieces are obtained.

The method of the sixth embodiment of the present invention may be used to divide the surface of the Earth into pieces of approximately 1 m in width: height, and to give each piece a location identifier given as a pair of two integers. That is, using the geodetic latitude and the longitude of the center position of the corresponding piece, the Northing N and the Easting E are calculated in meters. Most preferably, the Northing and the Easting given by Eqs. 99-100 are calculated.

$$N = N_o + R(\phi - \phi_o) \quad \text{[Equation 99]}$$

$$E = E_o + (\lambda - \lambda_o) R \cos \phi \quad \text{[Equation 100]}$$

By rounding off this Northing and Easting, they are converted into integers. In Eqs. 101-102, round( ) is a function that returns a rounded value of a real number. That is, round(9.4) is 9, and round(9.7) is 10.

$$I = \text{round}(N) \quad \text{[Equation 101]}$$

$$J = \text{round}(E) \quad \text{[Equation 102]}$$

Any point on the Earth can be conveniently specified using the integers I, J thus obtained, and selectively an integer F representing the floor.

FIG. 31 is a conceptual diagram of a three-dimensional location identifier. By using the method of the eighth embodiment in the present invention, the location can be specified using three integers (I, J, F) with an error range of less than 1 m$^2$ regardless of the actual location on the surface of the Earth and the floor within all the buildings. We will refer to these three integers as 3-dimensional geological location identifier or simply as location identifier.

In FIG. 31, the location identifier of a place a on the Earth is (I, J, F), the location identifier of a point e about 1 m away from a in the north direction is (I+1, J, F), and the location identifier of a point d about 1 m away from a in the east direction is (I, J+1, F), and the location identifier of a point f at the same geodetic latitude and longitude but one floor above a is (I, J, F+1). In addition, by transmitting thus obtained location identifier (I, J) or (I, J, F) to a friend, we can easily inform our location even if we are in a wild plain or deep in the mountains. This set of integers not only consume less data to transmit than the geodetic latitude and longitude, but also have the advantage that distances can be estimated because I and J have units of length. And the biggest advantage is that this location identifier indicates an area about 1 m in width and height for any location on the Earth.

In addition, when geodetic latitude and longitude are needed, they can be obtained using Eqs. 103-104.

$$\phi_I = \phi_o + \frac{I - N_o}{R} \quad \text{[Equation 103]}$$

$$\lambda_{I,J} = \lambda_o + \frac{J - E_o}{R \cos\left(\phi_o + \frac{I - N_o}{R}\right)} \quad \text{[Equation 104]}$$

Ninth Embodiment

In building a photo database, many techniques as well as related techniques have been developed for adding location information of the places where pictures were taken to the database using built-in GPS receivers in smartphones. Location information is recorded in the form of latitude and longitude expressed as decimal numbers, or in the form of latitude, longitude and altitude. In addition, even if the photo is not uploaded to the database right away at the shooting site, location information can be recorded using additional information recorded in the photo, that is, metadata stored in EXIF (Exchangeable Image File Format).

In the ninth embodiment of the present invention, all digital contents to which location properties are given, HyperText Mark-up Language (HTML) pages, movables, real estates, and databases are the targets for registration in a relational database. For this reason, digital contents, HTML pages, personal property, real estate and databases can be all called data.

The fact that a location property is given means that for the location property of a certain data, for example, a photo taken at the summit of Seoraksan Mountain, the geodetic latitude φ and the longitude λ at the summit of Seoraksan Mountain are assigned as the location property of the photo. Also, in the case of a movable property, such as a street lamp, a traffic light, a fire hydrant, a statue erected in a plaza, a work of art displayed in a museum, a luxury bag displayed in a department store, or a photograph of an idol hanging in a girl's room, a location property can be assigned with the latitude and the longitude corresponding to the location of the movable property. In the case of a movable property located in a multi-story building, the location property includes the floor number within the building. For example, for a CCTV installed in an office in a high-rise building, a location properties ($\varphi$, $\lambda$, F) can be assigned by the latitude, the longitude and the floor number considering the floor of the office.

An HTML page is a web document that is displayed through a web browser when we visit a web site using a web browser such as Internet Explorer or Google Chrome, and has an extension of htm or html.

There are many small stores in department stores, shopping malls, and underground shopping malls, and most of them do not have their own homepages. In addition, in order to operate an independent website, first an Internet domain must be purchased and maintained. For example, Applicant's domain is www.S360VR.com. When we visit a website, an HTML page with the name index.html is usually displayed first in our web browser.

There are many difficulties in all the small stores in the shopping mall purchasing Internet domains and running websites. Instead, create HTML pages all named index.html, and for each HTML page, add a set ($\varphi$, $\lambda$) of geodetic latitude $\varphi$ and longitude $\lambda$ of the store's representative location as the location attribute of the HTML page, or add ($\varphi$, $\lambda$, F) where the integer F represents the floor of the store. By generating location identifiers (I, J) or (I, J, F) from these location attributes ($\varphi$, $\lambda$) or ($\varphi$, $\lambda$, F), it is possible to maintain virtually individual homepages without each store having to purchase individual domain.

In addition, for the case of real estate such as the house I live in or a cafe I frequently visit, the representative location of the real estate is selected, and location properties can be assigned for the real estate which include the geodetic latitude and the longitude of the representative location and selectively an integer specifying the floor in the building.

However, the digital contents include not only photos that can specify the physical geodetic latitude and longitude of the place where the photos were taken, but also paintings, illustrations, cartoons, animations, moving pictures, music files, audio files, poetries, novels, essays, historical or cultural commentaries, menu boards, catalogs, news articles, reviews, blueprints, technical documents, and etc.

A poem or a song may not have a special location attribute. However, in the present invention, the location property of a data is not objectively given, but is a property that the owner of the data subjectively recognizes. For example, even in the case of a photo taken at the top of the Seoraksan Mountain, the geodetic latitude and the longitude of the summit of Seoraksan Mountain can be used as the location attribute of the photograph. Alternatively, focusing not on the background in the photograph but on the main character in the photograph, the geodetic latitude and the longitude of the main character's home can be used as the location attribute. Or, both can be used as the location attributes.

Even in the case of a painting or an illustration, if a special geographical feature appears in the painting or in the illustration, the location of the geographical feature can be used as the location attribute. Alternatively, the location of the atelier of the painter who draw that painting or the location of the author's workroom who draw that illustration can be used at the location attribute of the painting or the illustration.

If we want to register the national anthem as data, we can use the latitude and the longitude of the Baekdusan Mountain appearing in the lyrics of the national anthem as the location attribute. Or, we can use the location of the birthplace of Mr. Ahn Eaktae who composed the national anthem as the location attribute, or the location of the Blue House, which is the symbol of Korea's ruling power, can be used as the location attribute. Or, all of them can be used as location attributes. If all of them are used as location attributes, they can be registered as multiple records in the same database, or they can be registered as a single record and multiple indexes can be created referencing that record.

In addition, in the case of a newspaper article dealing with an assembly in Gwanghwamun Plaza, the location attribute of the article uses the location information the newspaper publishing company or the journalist subjectively recognizes as its attribute such as the central location of Gwanghwamun Plaza, the location of the statue of King Sejong which is the symbol of Gwanghwamun Plaza, the location of the office of the organization hosting the assembly, or the location of the newspaper publishing company the journalist is affiliated with.

Data that can be added to the database of the present invention can be another database. For example, we can create a separate database by collecting only photos taken at the top of the Seoraksan Mountain. This is because we may want to compare and view only the photos taken at the top of the Seoraksan Mountain.

Also, suppose that there is a nationally renowned bakery on the second floor of a commercial building, and proof shots or reviews of that bakery are constantly added. In this case, there are good reasons to create a separate database of all the photos, videos, and reviews with the same location identifier (I, J, F) corresponding to the geodetic latitude, longitude and floor ($\varphi$, $\lambda$, F) of the representative location of the bakery.

In addition, a national museum can build a database of all the exhibits in the national museum, and the "Seoul Arts Center" or "Sejong Center for the Performing Arts" can build a separate database for all performance files performed at their respective institutions.

Since the data registered in this database have the same location identifier (I, J, F), there is no need for fields (columns) corresponding to the Northing corresponding integer I, the Easting corresponding integer J, and the floor representing integer F. Therefore, there is no need to be a relational database, and a relational database or a non-relational database can be used as needed.

On the other hand, since all data registered in the database according to the ninth embodiment of the present invention have location attributes, it is advantageous to use a relational database. A relational database may have non-nullable fields, that is columns, and nullable fields. More strictly speaking, the main table of a relational database may have non-nullable fields and nullable fields. This is because some databases may consist of only one table, but may also consist of one main table and multiple auxiliary tables. However, since there is no room for confusion, for the convenience of discussion, it will be phrased that a database can have non-nullable fields and nullable fields. A non-nullable field means that if the field (column) is not filled in, data is not registered as a record in the database and an error occurs.

In the relational database according to the ninth embodiment of the present invention, there are a field for entering the Northing corresponding integer I, a field for entering the Easting corresponding integer J, and a field for entering the floor representing integer F. However, since there is still no room for confusion, hereinafter, for the convenience of discussion, the field names will be referred to as the Northing corresponding integer I, the Easting corresponding integer J, and the floor representing integer F. The Northing corresponding integer I and the Easting corresponding integer J are non-nullable (NOT NULL) fields, and the floor representing integer F is a nullable field.

The Northing corresponding integer I is an integer obtained by rounding off the Northing N. The Northing N has a unit of distance and is a monotonically increasing function of the geodetic latitude φ. The Easting corresponding integer J is also an integer obtained by rounding off the Easting E. The Easting E has a unit of distance and is a monotonically increasing function of the longitude λ. For example, the Northing N and the Easting E may have a unit of meters. On the other hand, geodetic latitude and longitude have units of degrees or radians.

Table 4 illustrates the structure of such a relational database.

TABLE 4

| number | field_name | description | datatype | constraints |
|---|---|---|---|---|
| 1 | id | identification number | integer | serial primary key |
| 2 | I | integer corresponding to the Northing of the data | integer | not null |
| 3 | J | integer corresponding to the Easting of the data | integer | not null |
| 4 | F | floor number | integer | |
| 5 | data_name | name of the data | string | |
| 6 | data_category | data category such as photographs, music, HTML page, immovable, database and etc. | string | |
| 7 | owner | owner who registered the data | string | |
| 8 | time | the date and time when the data was registered | string | |
| 9 | file_path | the full path to the data including directories and file name | string | not null |
| 10 | ... | | | |
| 11 | ... | | | |
| 12 | ... | | | |
| 13 | ... | | | |
| 14 | ... | | | |

In table 4, id is an integer that is automatically generated (serial) as a primary key. That is, whenever data is added as a record, id is assigned sequentially starting from 1.

Field I is the Northing corresponding integer and cannot be omitted (not null). The field J is the Easting corresponding integer and cannot be omitted. Field F is an integer corresponding to the floor number and can be omitted. For the fields I, J and F, if the owner who registers the data subjectively determines the geodetic latitude and the longitude for the data and, if necessary, the floor number, from there, the Northing corresponding integer I and the Easting corresponding integer J are calculated, and registered in the database along with the floor number F.

The data_name is the name of the data. The data_name can be entered by the user, but if the user does not explicitly enter it, the server can create it for the user and enter it. For example, if the user take a picture with a smartphone, a file name is automatically created by combining the date and the time.

The data_category is a character string entered by the user or the server in order to distinguish whether the data is a photo, a music file, an HTML, page, a real estate, or another database.

The owner is the name or user id of the user who entered the data, and is a character string. The time is the date and the time the server automatically entered as a character string when registering the data.

The file_path is a full file path including a folder name and a file name in which the data is registered. For example, it can be in the form of "D:\DB2019(Personal)\Photos2019 (DSLR)\20191023A\4O4A0403.JPG"

Since data can be a picture, a video, a poetry, or NoSQL, the data types registered in the relational database of this embodiment are diverse. Therefore, in this case, the data itself cannot be entered. Instead, the path name must be stored.

The Northing N and the Easting E can be implemented in various ways from the pair (φ, λ) of geodetic latitude φ and longitude λ, but the most preferred form of the Northing N is given by Eq. 105 as a function of the geodetic latitude φ.

$$N=N_o+R(\phi-\phi_o)$$ [Equation 105]

Here, $N_o$ is the default value of the Northing, R is the average radius of the Earth, $\varphi_o$ is the geodetic latitude of the reference point, and the unit of angle is radian.

Also, the Easting E is given by Eq. 106.

$$E=E_o+(\lambda-\lambda_o)R\cos\phi$$ [Equation 106]

Here, $E_o$ is the default value of the Easting, and $\lambda_o$ is the longitude of the reference point.

In this case, the Northing corresponding integer I is obtained by rounding off the Northing N as in Eq. 107.

$$I=\text{round}(N)$$ [Equation 107]

Further, the Easting corresponding integer J is obtained by rounding off the Easting E as in Eq. 108.

$$J=\text{round}(E)$$ [Equation 108]

Instead of the latitude and the longitude, which is difficult to estimate the corresponding distance or error range, the reason for using the Northing and the Easting has already been explained enough. However, the reason for converting these numbers again from real numbers to integers and storing them is as follows. First of all, the latitude and the longitude expressed as decimal numbers or the Northing and the Easting in the form of real numbers can be used as fields.

However, due to the nature of computers, the task of examining real numbers is much slower than that of examining integers.

More importantly, if we use latitude•longitude or Northing•Easting where the location attributes are given as real numbers, for example, to determine if a certain photograph was taken at the top of the Seoraksan Mountain, we have to do proximity test by comparing the location attribute of the top of the Seoraksan Mountain and the location attribute of the photograph. Therefore, if it is found to be within the pre-determined criterion, it is judged to be the same place, and if it is found to exceed the criterion, it is judged to be taken in a different place. However, such proximity test not only takes a lot of time, but also has a possibility of error.

On the other hand, if we let it have all the same Northing corresponding integer I and the same Easting corresponding integer J when it is within an area of about 1 m in width and length, after checking whether the Northing corresponding integer I and the Easting corresponding integer J of the top of the Seoraksan Mountain match those of the photograph, it is judged to be the same place if both integers match, and not the same place if at least one integer does not match. Therefore, not only is the search fast, but also there is no possibility of error.

In addition, when there is a need to specify a location with maximum precision, such as the location of a cadastral control point, meter-level numbers are assigned to integers I and J, and numbers (distances) less than a meter can be stored in separate fields in a relational database. So there is no problem in using it even when precise positioning is required.

Tenth Embodiment

It can be useful in various fields if the outdoor map and the indoor map are displayed together by superimposing floor plans of buildings on the outdoor map. For this purpose, it is desirable to construct a database of floor plans for each floor of buildings. Among them, a relational database will be the most preferable.

In order to overlappingly display the map and the floor plan for each floor, it is desirable to create the floor plan for each floor in GeoJSON format, or convert to GeoJSON format from CAD data format such as AutoCAD or map data format such as shapefile.

Since a building occupies a considerable area, it is necessary to select a representative point of the building. The representative point can be selected in a variety of ways, but one method that can be automated is to use the centroid of the floor plan of the ground floor of the building as a representative point. When a representative point is selected, the Northing corresponding integer I and the Easting corresponding integer J are generated from the geodetic latitude and the longitude of the representative point.

The Northing corresponding integer I is an integer obtained by rounding off the Northing N. The Northing N has a unit of distance and is a monotonically increasing function of the geodetic latitude $\varphi$. The Easting corresponding integer J is also an integer obtained by rounding off the Easting E. The Easting E has a unit of distance and is a monotonically increasing function of the longitude $\lambda$.

The Northing N and the Easting E can be implemented in various ways from the pair ($\varphi$, $\lambda$) of the geodetic latitude $\varphi$ and the longitude $\lambda$, but in the most preferred form, the Northing N is given by Eq. 109 as a function of the geodetic latitude $\varphi$.

$$N = N_o + R(\varphi - \varphi_o)$$ [Equation 109]

Here, $N_o$ is the default value of the Northing, R is the average radius of the Earth, $\varphi_o$ is the geodetic latitude of the reference point, and the unit of angle is radian.

Also, the Easting E is given by Eq. 110.

$$E = E_o + (\lambda - \lambda_o) R \cos \varphi$$ [Equation 110]

Here, $E_o$ is the default value of the Easting, and $\lambda_o$ is the longitude of the reference point.

The Northing corresponding integer I is obtained by rounding off the Northing N as in Eq. 111.

$$I = \text{round}(N)$$ [Equation 111]

In addition, the Easting corresponding integer J is obtained by rounding off the Easting E as in Eq. 112.

$$J = \text{round}(E)$$ [Equation 112]

And, needless to say, there is a field for entering a floor plan in GeoJSON format, or a full file path including the file name and the folder wherein the floor plan is stored. Using PostGIS extension allows us to directly save GeoJSON files in PostgreSQL, so directly saving GeoJSON files may be preferable.

In a relational database according to the tenth embodiment of the present invention, there are Northing corresponding integer I and Easting corresponding integer J, which are non-nullable fields, and floor representing integer F, which is a nullable field. If the building is a single-story building, the field for the floor can be left unfilled, or 0 can be entered. In the case of a floor plan of the second floor, an integer 1 is entered in the floor field, and in the case of a floor plan of the third floor, 2 is entered in the floor field. Furthermore, in the case of the first basement floor, -1 is entered in the floor field, and in the case of the second basement floor, -2 is entered in the floor field.

In order to overlap floor plan per level on a map, or to quickly search for buildings located within the map area, we can use the method of including the coordinates of the boundary points of the minimum bounding box enclosing the floor plan of a building in the database. It would be preferable to use the upper-left corner point and the lower-right corner point of the minimum bounding box as the boundary points. In this case, the fields of the relational database will contain the coordinates of the boundary points of the minimum bounding box enclosing the floor plan of a building either as two pairs of Northing and Easting or as two pairs of geodetic latitude and longitude. Table 5 exemplifies the structure of such a relational database, and shows a case in which the Northing and the Easting of the upper left corner and the Northing and the Easting of the lower right corner are added as fields.

TABLE 5

| number | field_name | description | datatype | constraints |
|--------|------------|-------------|----------|-------------|
| 1 | id | identification number | integer | serial primary key |
| 2 | I | integer corresponding to the Northing of the centroid | integer | not null |

TABLE 5-continued

| number | field_name | description | datatype | constraints |
|---|---|---|---|---|
| 3 | J | integer corresponding to the Easting of the centroid | integer | not null |
| 4 | F | floor number | integer | |
| 5 | Northing_upper | Northing of the upper left corner of the bounding box | real | |
| 6 | Easting_left | Easting of the upper left corner of the bounding box | real | |
| 7 | Northing_bottom | Northing of the lower right corner of the bounding box | real | |
| 8 | Easting_right | Easting of the lower right corner of the bounding box | real | |
| 9 | floor_map | floor map in F floor | GeoJSON | not null |
| 10 | ... | | | |
| 11 | ... | | | |
| 12 | ... | | | |
| 13 | ... | | | |
| 14 | ... | | | |

In Table 5, id is the primary key, which is an automatically generated (serial) integer. That is, whenever a data is added as a record, id is assigned sequentially starting from 1. Field I is the Northing corresponding integer, and is a non-nullable field (not null). The field J is the Easting corresponding integer, and is a non-nullable field. Field F is the floor representing integer and is a nullable field.

When a representative point is selected in the floor plan of the ground floor of a building, the Northing corresponding integer I and the Easting corresponding integer J are automatically generated from the geodetic latitude and the longitude of the representative point. If the building is a multi-story building, the floor plan of each floor is entered as individual data (record), where the Northing corresponding integer I and the Easting corresponding integer J are the same, and F is entered differently according to the floor.

floor_map is the floor plan for each floor written in GeoJSON format.

In table 5, it is assumed that the positions of the upper-left and the lower-right corners of the minimum bounding box are stored as Northing and Easting, but it may be better to directly enter the geodetic latitude and the longitude in these columns. This is because these fields are not used for sorting and searching, but are only used when displaying on a map.

However, the method of using a minimum bounding box has many inconveniences. First, when viewing a map using a smartphone, the direction of the map changes to match the direction the smartphone is facing. In that case, the orientation of the floor plan superimposed on the map must also be changed, and therefore the minimum bounding box must also be rotated. Instead of such a minimum bounding box, a minimum enclosing circle may be used. The minimum enclosing circle is a circle with the smallest radius among the circles enclosing all of the floor plan of the building.

Figure 32:
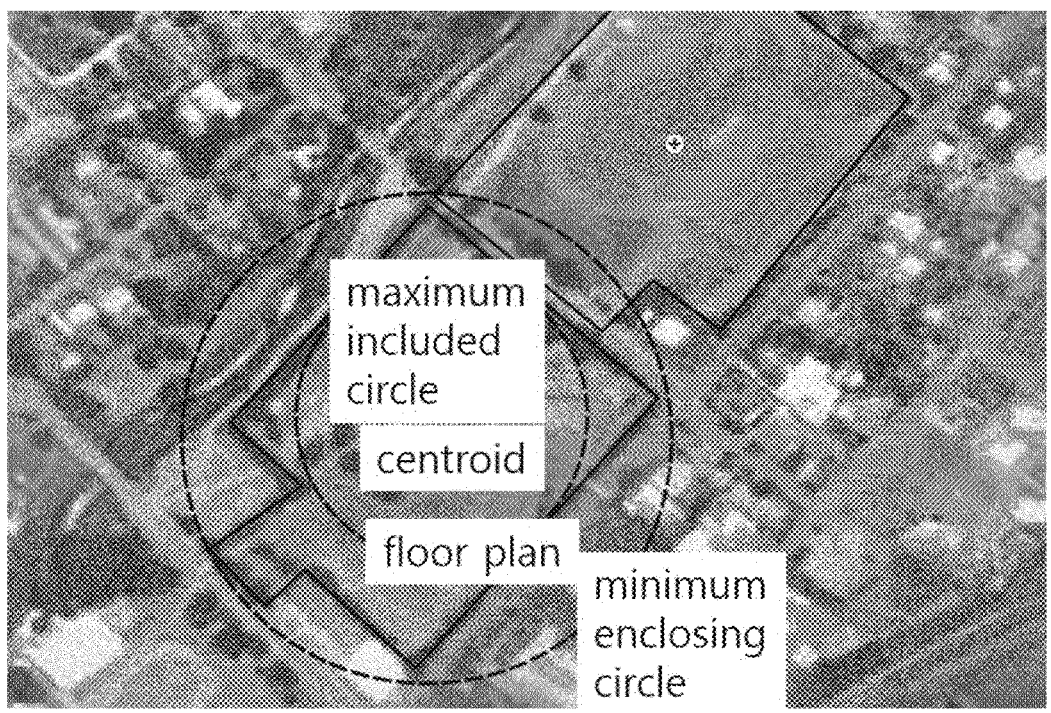
FIG. 32 is a conceptual diagram of a minimum enclosing circle and a maximum included circle in the tenth embodiment of the present invention.

The above-mentioned centroid may be used as the center of the minimum enclosing circle, or the center and the radius of the optimal circle having the minimum radius may be searched irrespective of the centroid. In FIG. 32, a centroid is indicated by assuming that the boundary of the school campus is a floor plan, and a minimum enclosing circle having the centroid as its center is also indicated.

The most convenient way to specify a circle is to specify the location of the center and the radius. In order to specify the center of the minimum enclosing circle containing the floor plan of a building therein, the field of the relational database includes the coordinates of the center position either as a pair of Northing and Easting or as a pair of geodetic latitude and longitude. Also, since radius must have a unit of length, the database contains a field storing the radius of the minimum enclosing circle in the same unit as the Northing.

Another circle is indicated in FIG. 32, which will be referred to as a maximum included circle. The maximum included circle is a circle with the largest radius among the circles that are completely contained within the floor plan. The maximum included circle may also have the centroid as its center, or the center and the radius of the circle having the largest radius may be determined regardless of the centroid. In FIG. 32, the maximum included circle was obtained irrespective of the centroid, and as shown in FIG. 32, the center of the circle is at a different position from the centroid. In fact, since the centroid is just a point at which the physical moments are balanced, the center of the maximum included circle does not needs to coincide with the centroid.

In this case also, the fields of the relational database contain the center coordinates of the maximum included circle contained in the floor plan for each floor of the building either as a pair of Northing and Easting or as a pair of geodetic latitude and longitude. The fields also contain the radius of the maximum included circle in the same unit as the Northing.

Finally, instead of the maximum included circle, we can use a maximum included box. The maximum included box is a rectangle with the largest area among the rectangles that are completely contained within the floor plan. The center of the maximum included box may also be the centroid, or the upper left corner and the lower right corner of a box having the largest area may be determined irrespective of the centroid.

In this case, the fields of the relational database include the coordinates of the boundary points of the maximum included box contained within the floor plan per level of the building either as two pairs of Northing and Easting or as two pairs of geodetic latitude and longitude.

Apart from the concept of a maximum included circle or a maximum included box and how to specify them, one might wonder why a maximum included circle or a maximum included box is needed. The use of a maximum included circle or a maximum included box is the same. The purpose of the maximum included circle is to check whether the center of the map screen indicating the user's position on the map or the position of the mouse cursor is clearly located within the building. That is, it is used to determine for 100% sure whether a smartphone user or the mouse cursor of a user searching the map on a PC is located within a certain building.

In fact, if it is outside the maximum included circle and still within the floor plan, the test will fail despite the fact that it is within the floor plan for sure. But this is not important. If the user move the mouse further and the cursor enters within the maximum included circle, we know with 100% certainty that the user is inside the building, and this is the information we really need. In addition, the search algorithm is simple, and it does not matter even if the screen is rotated.

In this way, when it is confirmed that the user is inside a building, a menu for selecting a floor in a multi-story building appears and allows the user to select the desired floor. When the desired floor is selected, the floor plan of that floor is superimposed on the map and shown to the user.

Eleventh Embodiment

When using an internet map service such as Google map, we can search the map by entering a latitude and a longitude, but we can also search by entering an address. This is because, in this case, the map server finds the latitude and the longitude corresponding to the address. This technique of finding the latitude and the longitude from a name of a place or an address is called geocoding. Conversely, the technique of finding the address from a latitude and a longitude is called reverse geocoding.

In the eleventh embodiment of the present invention, the concept of this geocoding technique is extended to give a location attribute to any proper noun, common noun, or more general arbitrary character string, and a relational database is built for the character string. In such a relational database according to the eleventh embodiment of the present invention, data is a character string to which a location attribute is assigned. Location attribute include a geodetic latitude $\varphi$ and a longitude $\lambda$ and selectively a floor number within the building.

As in the ninth embodiment of the present invention, the location attribute in the eleventh embodiment of the present invention is the location attribute of the data (i.e., character string) the owner of the data, in other words, a database user who registers the character string in a relational database, subjectively recognizes as its attribute. From the location attribute of the character string, a Northing corresponding integer I and an Easting corresponding integer J are generated, and these two integers (I, J) are entered into the database. If not on the ground floor, in other words, $0^{th}$ floor, an integer F specifying the floor in a building is also entered into the database.

In a relational database according to the eleventh embodiment of the present invention, a Northing corresponding integer I and an Easting corresponding integer J are non-nullable fields (NOT NULL), and a floor representing integer F is a nullable field. The Northing corresponding integer I is an integer obtained by rounding off the Northing N. The Northing N has a unit of distance and is a monotonically increasing function of the geodetic latitude $\varphi$. The Easting corresponding integer J is also an integer obtained by rounding off the Easting E. The Easting E has a unit of distance and is a monotonically increasing function of the longitude $\lambda$.

The Northing N and the Easting E can be implemented in various ways from the pair ($\varphi$, $\lambda$) of the geodetic latitude $\varphi$ and the longitude $\lambda$, but in the most preferred form, the Northing N is given by Eq. 113 as a function of the geodetic latitude $\varphi$.

$$N=N_o+R(\varphi-\varphi_o) \quad \text{[Equation 113]}$$

Here, $N_o$ is the default value of the Northing, R is the average radius of the Earth, $\varphi_o$ is the geodetic latitude of the reference point, and the unit of angle is radian.

Also, the Easting E is given by Eq. 114.

$$E=E_o+(\lambda-\lambda_o)R \cos \varphi \quad \text{[Equation 114]}$$

Here, $E_o$ is the default value of the Easting, and $\lambda_o$ is the longitude of the reference point.

The Northing corresponding integer I is obtained by rounding off the Northing N as in Eq. 115.

$$I=\text{round}(N) \quad \text{[Equation 115]}$$

In addition, the Easting corresponding integer J is obtained by rounding off the Easting E as in Eq. 116.

$$J=\text{round}(E) \quad \text{[Equation 116]}$$

If an objective location attribute is related to a specific character string, preferentially a location identifier (I, J) or (I, J, F) will be generated from the location attribute. For example, for a character string "Namdaemun", a Northing corresponding integer I and an Easting corresponding integer J can be assigned corresponding to the geodetic latitude and the longitude of the Namdaemun. Also, for "Sungnyemun", the official name of the Namdaemun, the same Northing corresponding integer I and the Easting corresponding integer J are assigned. In addition, the same Northing corresponding integer I and the Easting corresponding integer J are assigned to the string "40 Sejong-daero, Jung-gu, Seoul", which is the address of the Namdaemun. And since Namdaemun is Korea's National Treasure No. 1, the same Northing corresponding integer and the Easting corresponding integer are assigned to the string "National Treasure No. 1". In addition, a corresponding location identifier can also be assigned to a place name such as "Seoraksan Mountain rocking stone".

The company name of the present applicant is "S360VR CO., LTD.". Then, with the geodetic latitude and the longitude and the floor number of the applicant's office location, a Northing corresponding integer I, an Easting corresponding integer J, and a floor representing integer F are assigned to the character string "S360VR". In addition to this, the same location identifier (I, J, F) is assigned to the representative's name, "Kweon Gyeongil". In addition, the same location identifier is assigned to the applicant's representative phone number, fax number, e-mail address, and internet domain. In addition, the same location identifier is assigned to the applicant's main product, "scanning stereoscopic panoramic camera," and to the main service area, "software development."

"S360VR" and "software development" are obviously character strings, but we might think that the representative phone number is not a character string but a number. For example, the usual way to write the applicant's office phone number including the country code is +82-42-226-8664. Here, 82 is the country code of the Republic of Korea, 42 is the area code of Daejeon, 226 is the telephone exchange number, and 8664 is the rest of the number.

However, the dash (–) is not part of the phone number, but is inserted for convenience so that people can easily distinguish the phone number from the country code and the area code. It's also clear from the fact that we don't press the dash (–) button when making a call. So, the phone number in the purest form would be 82422268664. In other words, it can be thought of as a very large integer. Therefore, even if a location attribute is assigned to a phone number, we might wonder it cannot be registered as data because it is not a character string.

However, most of the software allows converting an integer or a real number into a character string, or storing as a character string. In addition, functions are provided to convert numeric data stored in character string format back to the original numeric format. In PostgreSQL, we can convert numbers to character strings just by enclosing them in quotation marks. That is, if it is saved as '82-42-226-8664' or as '82422268664', it can be inserted into a field whose datatype is a character string.

As such, all names, place names, trade names, nicknames, addresses, internet domains, email addresses, telephone numbers, fax numbers, and etc. whereon location attributes are assigned can be entered as data. The above location attribute includes not only an objective location attribute, in other words, (geodetic) latitude and longitude, but also a subjective location attribute the owner of the data considers as its location attribute.

In addition, the character strings to which location attributes are assigned include a type of business as a common noun, a type of service, services, and products. For example, if an electrician living in a certain neighborhood registers a character string such as "electrical repairs", the location attribute of the character string may specify the location attribute of the electrician's shop, or the location attribute of his or her house.

Similarly, 'starbucks', 'coffee house', 'cafe', 'Americano' and 'coffee' can all be registered as data by assigning the location attribute corresponding to the same address. Then, whether the user searches by 'cafe', or 'Americano', searches will be successful for all cases.

Since 'cafe' and 'coffee' are both common nouns, data with the same keywords, i.e., 'cafe' or 'coffee', can be entered by many cafes. Therefore, when a user using the relational database of the embodiment of the present invention searches for 'coffee' using a smart phone, numerous data will be retrieved. Then, after the database software finds out the user's current location from the smartphone, the search results can be displayed by listing them in the order closest to the user's current location. Therefore, it can be used for various purposes, such as ordering food for delivery or finding a movie theater or a gas station.

The relational database according to the eleventh embodiment of the present invention may have a structure as shown in table 6. Table 6 illustrates the main table of a relational database whose data is a character string with a location attribute assigned in a very simple format.

TABLE 6

| number | field_name | description | datatype | constraints |
|---|---|---|---|---|
| 1 | id | identification number | integer | serial primary key |
| 2 | keyword | keyword | string | not null |
| 3 | category | category | string | |
| 4 | I | integer corresponding to the Northing of the data | integer | not null |
| 5 | J | integer corresponding to the Easting of the data | integer | not null |
| 6 | F | floor number | integer | |
| 7 | owner | owner who registered the data | string | |

In table 6, keyword is a character string to which a location attribute is assigned. In other words, it is a data. And, category is an additional information entered in order to improve efficiency in data management and searching.

As such, "keywords", a database for character strings with location attributes, can be created in PostgreSQL with the following SQL command.

```
CREATE TABLE keywords (
    id BIGSERIAL NOT NULL PRIMARY KEY,
    keyword VARCHAR(100) NOT NULL,
    category VARCHAR(50),
    I BIGINT NOT NULL,
    J BIGINT NOT NULL,
    F SMALLINT,
    owner VARCHAR(50));
```

Here, the datatype of id is listed as BIGSERIAL, which is an integer type that is automatically generated like SERIAL, but starts from 1 and the maximum integer value is possible up to 9223372036854775807. Both BIGINT and SMALLINT are integer types with different ranges.

Figure 33:
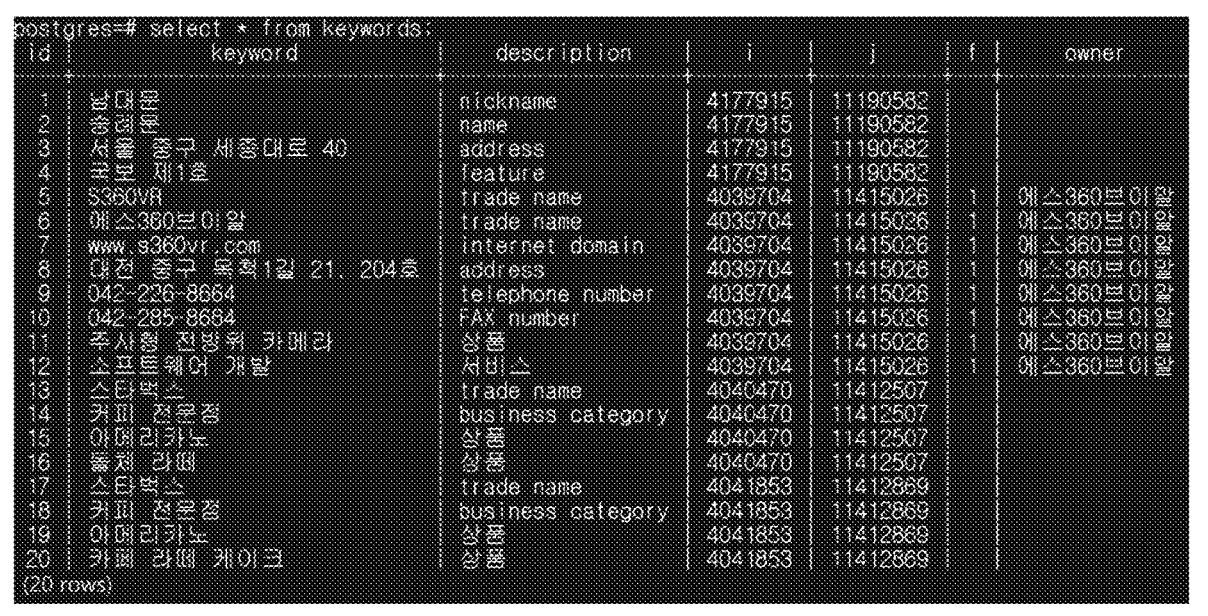
Figure 34:
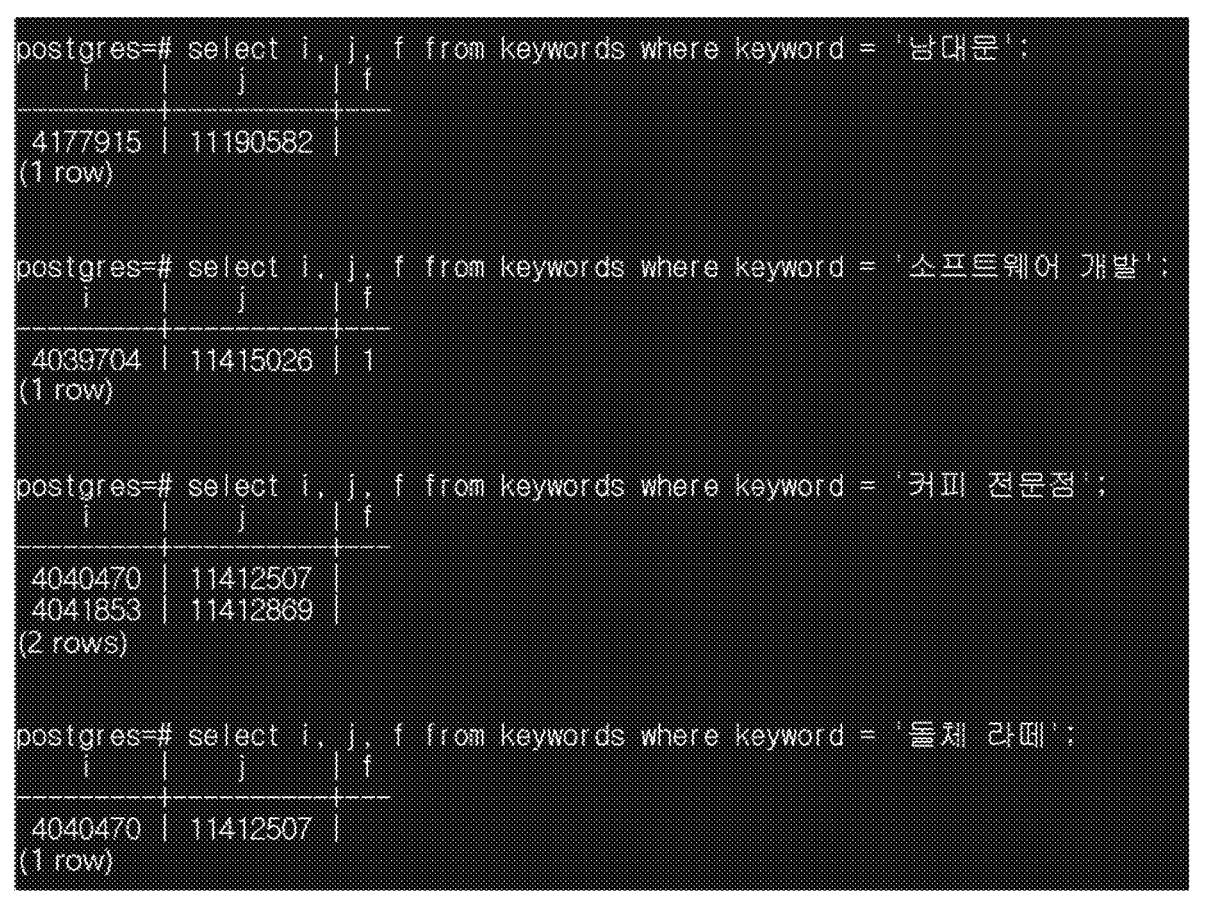

FIG. 33 shows a database using PostgreSQL having one table "keywords", and FIG. 34 shows search results with various keywords.

INDUSTRIAL APPLICABILITY

It can be used in various industrial fields such as way-finding by integrally specifying a geographic location and an indoor location within a building by two or three integers.

What is claimed is:

1. A method of accurate integrally specifying geographic locations and indoor locations within buildings, the method comprising:

a coordinate of any one point on an Earth is given as (X, Y, Z) in a three-dimensional Cartesian coordinate system which is fixed to the Earth and rotates with the Earth (Earth-Centered Earth-Fixed), having the Earth's center of mass as an origin, having the Earth's rotation axis as a Z-axis, and having a straight line from the origin to an intersection point of a prime meridian and an Equator as a X-axis, and given as a geodetic latitude $\varphi$, a longitude $\lambda$, and an ellipsoidal height h in a geodetic coordinate system based on an Earth ellipsoid, a location of the one point is represented by a new coordinate system including a Northing N, an Easting E, and selectively an integer F specifying a floor within a building, wherein, the Northing N has a unit of distance, and is given as a monotonically increasing function of the geodetic latitude $\varphi$, and the Easting E has a unit of distance, and is given as a monotonically increasing function of the latitude $\lambda$, wherein, the Northing N is given as a function of the geodetic latitude y as follows, $$N = N_o + R(\varphi - \varphi_o)$$

here $N_o$ is a default value of the Northing,

R is an average radius of the Earth, $\varphi_o$ is the geodetic latitude of a reference point, the unit of angle is radian, the Easting E is given as a function of the geodetic latitude φ and the longitude λ, as follows, $$E=E_o+(\lambda-\lambda_o)R\cos\phi$$

here $E_o$ is a default value of the Easting,
$\lambda_o$ is the longitude of the reference point,
the geodetic latitude φ is given as a function of the Northing N as follows, $$\phi=\phi_o+\frac{N-N_o}{R}$$

and the longitude λ, is given as a function of the Northing N and the Easting E as follows, $$\lambda=\lambda_o+\frac{E-E_o}{R\cos\left(\phi_o+\frac{N-N_o}{R}\right)}$$

wherein,
the Northing and the Easting are real numbers having positive (+) values.

2. A relational database stored in a device, wherein data is any one or more among digital contents, HTML pages, movable properties, real estates, and databases to which location attributes are assigned,
wherein the location attribute includes a geodetic latitude φ, a longitude λ, and selectively a floor within a building,
wherein the relational database includes a Northing corresponding integer I and an Easting corresponding integer J, which are non-nullable fields,
and selectively an integer F representing a floor within a building,
the Northing corresponding integer I is an integer obtained by rounding off the Northing N having a unit of distance,
the Easting corresponding integer J is an integer obtained by rounding off the Easting E having a unit of distance,
the Northing is given as a monotonically increasing function of the geodetic latitude φ,
the Easting is given as a monotonically increasing function of the longitude λ,
wherein,
the Northing N is given as a function of the geodetic latitude φ as follows, $$N=N_o+R(\phi-\phi_o)$$

here $N_o$ is a default value of the Northing,
R is an average radius of the Earth,
$\lambda_o$ is the geodetic latitude of a reference point,
the unit of angle is radian,
the Easting E is given as a function of the geodetic latitude φ and the longitude λ, as follows, $$N=N_o+R(\phi-\phi_o)$$

here $E_o$ is a default value of the Easting,
and $\lambda_o$ is the longitude of the reference point,
wherein the Northing N and the Easting E functions determine and use accurate integrally specifying geographic locations and indoor locations within buildings.

3. The relational database stored in a device of claim 2, wherein,
the geodetic latitude φ, the longitude λ, and the floor within a building included in the location attribute are the geodetic latitude φ, the longitude λ, and the floor within a building which the owner of the data subjectively recognizes as the location attribute of the data.

4. The relational database stored in a device of claim 2, wherein,
the digital contents include photos, drawings, illustrations, cartoons, animations, videos, music files, audio files, poetries, novels, essays, historical or cultural commentaries, menu boards, catalogs, news articles, reviews, blueprints, and technical documents.

5. The relational database stored in a device of claim 2, wherein,
the database is a relational or non-relational database for data in which the Northing corresponding integer I, the Easting corresponding integer J, and selectively the integer F representing a floor in a building are all the same.

6. A relational database stored in a device, having character strings to which location attributes are assigned as data, wherein,
the location attribute includes a geodetic latitude φ, a longitude λ, and selectively a floor within a building,
the relational database includes a Northing corresponding integer I and an Easting corresponding integer J which are non-nullable fields,
and an integer F representing a floor within a building which is a nullable field,
the Northing corresponding integer I is an integer obtained by rounding off the Northing N having a unit of distance,
the Easting corresponding integer J is an integer obtained by rounding off the Easting E having a unit of distance,
the Northing is given as a monotonically increasing function of the geodetic latitude φ,
and the Easting is given as a monotonically increasing function of the longitude λ,
wherein,
the Northing N is given as a function of geodetic latitude φ as follows, $$N=N_o+R(\phi-\phi_o)$$

here $N_o$ is a default value of the Northing,
R is an average radius of the Earth,
$\phi_o$ is the geodetic latitude of a reference point,
the unit of angle is radian,
the Easting E is given as a function of geodetic latitude φ and longitude λ, as follows, $$E=E_o+(\lambda-\lambda_o)R\cos\phi$$

here $E_o$ is a default value of the Easting,
and $\lambda_o$ is the longitude of the reference point,
wherein the Northing N and the Easting E functions determine and use accurate integrally specifying geographic locations and indoor locations within buildings.

7. The relational database stored in a device of claim 6, wherein,
the geodetic latitude φ, the longitude λ, and the floor within a building included in the location attribute are the geodetic latitude φ, the longitude λ, and the floor within a building which the owner of the data subjectively recognizes as the location attribute of the data.

8. The relational database stored in a device of claim 6, wherein,
the character strings to which location attributes are assigned include names, place names, trade names, nicknames, addresses, internet domains, email addresses, telephone numbers and Fax numbers.

9. The relational database stored in a device of claim 6, wherein, the character strings to which location attributes are assigned include a type of business as a common noun, a type of service, products, and services.

10. The relational database stored in a device of claim 6, wherein the device further comprising:

a processor; and a memory including instructions that, when executed by the processor, cause the processor to:

store, retrieve, modify, duplicate, and delete one or more records having non-nullable fields and nullable fields, wherein non-nullable fields include a Northing corresponding integer I and an Easting corresponding integer J, and nullable fields include an integer F corresponding to a floor in a building.

11. The relational database stored in a device of claim 2, wherein the device further comprising:

a processor; and a memory including instructions that, when executed by the processor, cause the processor to:

store, retrieve, modify, duplicate, and delete one or more records having non-nullable fields and nullable fields, wherein non-nullable fields include a Northing corresponding integer I and an Easting corresponding integer J, and nullable fields include an integer F corresponding to a floor in a building.

\* \* \* \* \*